United States Patent
Kornfield et al.

(10) Patent No.: US 8,834,742 B2
(45) Date of Patent: Sep. 16, 2014

(54) POLYMER-DOPED VERTICALLY-ALIGNED NEMATIC LIQUID CRYSTALS

(75) Inventors: Julia A. Kornfield, Pasadena, CA (US); Michael Wand, Boulder, CO (US); Zuleikha Kurji, Pasadena, CA (US)

(73) Assignees: California Institute of Technology, Pasadena, CA (US); LC Vision, LLC, Boulder, CO (US)

( * ) Notice: Subject to any disclaimer, the term of this patent is extended or adjusted under 35 U.S.C. 154(b) by 0 days.

(21) Appl. No.: 13/194,297

(22) Filed: Jul. 29, 2011

(65) Prior Publication Data

US 2012/0105791 A1    May 3, 2012

Related U.S. Application Data

(60) Provisional application No. 61/369,574, filed on Jul. 30, 2010.

(51) Int. Cl.

| C09K 19/34 | (2006.01) |
|---|---|
| C09K 19/30 | (2006.01) |
| C09K 19/38 | (2006.01) |
| C09K 19/54 | (2006.01) |
| C09K 19/12 | (2006.01) |
| C09K 19/40 | (2006.01) |

(52) U.S. Cl.
CPC ........... *C09K 19/406* (2013.01); *C09K 19/3842* (2013.01); *C09K 2019/3009* (2013.01); *C09K 2019/3016* (2013.01); *C09K 2019/3004* (2013.01); *C09K 2019/301* (2013.01); *C09K 19/3003* (2013.01)
USPC .............. 252/299.5; 252/299.61; 252/299.63; 252/299.66

(58) Field of Classification Search
USPC ................ 252/299.5, 299.61, 299.63, 299.66
See application file for complete search history.

(56) References Cited

U.S. PATENT DOCUMENTS

| 4,871,472 A | 10/1989 | Krause et al. |
|---|---|---|
| 4,896,292 A | 1/1990 | Eich et al. |
| 4,904,066 A | 2/1990 | Gray et al. |
| 5,138,010 A | 8/1992 | Keller et al. |
| 5,200,108 A | 4/1993 | Yuasa et al. |
| 5,313,320 A | 5/1994 | Kornfield et al. |
| 5,321,533 A | 6/1994 | Kumar |
| 5,321,534 A | 6/1994 | Takatoh et al. |
| 5,397,503 A | 3/1995 | Yuasa et al. |

(Continued)

FOREIGN PATENT DOCUMENTS

| EP | 0364538 | 5/1992 |
|---|---|---|
| EP | 0501409 | 9/1992 |

(Continued)

OTHER PUBLICATIONS

Ajlun, C, (2000) "Stamp-Sized Ferroelectric LCD Can Power 50-in. TV Screens" *Electronic Design* 48:26.

(Continued)

*Primary Examiner* — Shean C Wu
(74) *Attorney, Agent, or Firm* — Lathrop & Gage LLP

(57) ABSTRACT

A system having a vertically-aligned negative delta E nematic liquid crystal host material and a small amount of liquid crystal polymer is provided. The liquid crystal polymer improves the switching speed of a vertically aligned nematic system without sacrificing contrast or viewing angle.

6 Claims, 17 Drawing Sheets

(56) References Cited

U.S. PATENT DOCUMENTS

| | | | |
|---|---|---|---|
| 5,422,036 | A | 6/1995 | Kawakami et al. |
| 5,437,816 | A | 8/1995 | Endo et al. |
| 5,498,450 | A | 3/1996 | Akashi et al. |
| 5,540,858 | A | 7/1996 | Yoshinaga et al. |
| 5,635,106 | A | 6/1997 | Basturk et al. |
| 5,686,017 | A | 11/1997 | Kobayashi et al. |
| 5,812,227 | A | 9/1998 | Toshida et al. |
| 5,843,332 | A | 12/1998 | Takeuchi et al. |
| 6,128,056 | A | 10/2000 | Kubota et al. |
| 6,132,819 | A | 10/2000 | Ober et al. |
| 6,133,975 | A | 10/2000 | Li et al. |
| 6,157,425 | A | 12/2000 | Kuo et al. |
| 6,175,399 | B1 | 1/2001 | Mitsui et al. |
| 6,270,691 | B2 | 8/2001 | Park et al. |
| 6,452,650 | B1 | 9/2002 | Nakao et al. |
| 6,583,838 | B1 | 6/2003 | Hoke et al. |
| 6,821,455 | B2 | 11/2004 | Kornfield et al. |
| 7,008,675 | B2 | 3/2006 | Kornfield et al. |
| 7,179,509 | B2 | 2/2007 | Kornfield et al. |
| 2007/0026164 | A1 | 2/2007 | Murata et al. |
| 2007/0218216 | A1* | 9/2007 | Kato et al. ............ 428/1.1 |
| 2010/0015363 | A1 | 1/2010 | Chiang et al. |

FOREIGN PATENT DOCUMENTS

| | | |
|---|---|---|
| EP | 0562431 | 9/1993 |
| EP | 0703287 | 3/1996 |
| EP | 0903392 | 3/1999 |
| GB | 2 274 652 | 8/1994 |
| JP | 63301204 | 12/1988 |
| JP | 02116824 | 5/1990 |
| JP | 3229423 | 9/1994 |
| WO | WO 89/08633 | 9/1989 |
| WO | WO 94/23496 | 10/1994 |
| WO | WO 99/32576 | 7/1999 |
| WO | WO 01/77255 | 10/2001 |
| WO | WO 2010/88333 | 8/2010 |
| WO | WO 2012/16130 | 2/2012 |

OTHER PUBLICATIONS

Baek et al. (2009) "Fast Switching of Vertical Alignment Liquid Crystal Cells with Liquid Crystalline Polymer Networks," JP J Applied Physics 48:056507-1-056507-5.

Bremer et al. (2005) "1,1,6,7-Tetrafluoroindanes: improved liquid crystals for LCD-TV application," New J Chem 29:72-74.

Cerolaza et al. (2011) An Optical Method for Pretilt and Profile Determination in LCOS VAN Displays, J. Display Technol. 7:141-150.

David et al. (2008) "Facile, efficient Routes to Diverse Protected Thiols and to their Deprotection and Addition to Create Functional Polymers by Thiol-ene Coupling," Macromolecules 41(4):1151-1161.

Fujikake et al. (1999) "Rigid Formation of Aligned Polymer Fiber Network in Ferroelectric Liquid Crystal," *Jpn. J. Appl. Phys.* 38(1):5212-5213.

Hanaoka et al. (2004) "A new MVA-LCD by polymer sustained alignment technology," *Proc. SID*, 40.1:1200-1203.

Hardouin et al. 1992) "Small angle neutron scattering experiments on "side-on fixed" liquid crystal polysiloxanes," J. Phys. II France 2 (3):271-278.

Huang et al. (2007) "Effects of curing conditions on electrooptical properties of polymer-stabilized liquid crystal pi cells," *Jpn. J. Appl. Phys.* 46:5230-5232.

Huang et al. (2008) "Switching of Polymer-Stabilized Vertical Alignment Liquid Crystal Cell," Optics Express16(6):3859-3864.

Huang et al. (2009) "Switching of Polymer-Stabilized Vertical Alignment Liquid Crystal Pi Cell-Curing Voltage and Driving Scheme Effects," Japanese Journal of Applied Physics 48:020210-1-020210-3.

International Preliminary Report on Patentability, International Application No. PCT/US2010/022329, Aug. 2, 2011, 5 pages.

International Search Report, International Application No. PCT/US2010/022329, Nov. 16, 2010, 3 pages.

International Search Report, International Application No. PCT/US2011/045871, Mar. 23, 2012, 3 pages.

Kelly et al. (2000) "Liquid Crystal for Electro Optic Applications," in; *Handbook of Advanced Electronic and Photonic Materials and Devices*, CH. 1, Nalwa, H.S. Ed., VOl. 7: *Liquid Crystals, Display and Laser* Materials,Academic Press, pp. 1-66.

Kempe et al. (Mar. 2003) "Shear Alignment Behavior of Nematic Solutions Induced by Ultralong Side-Group Liquid Crystal Polymers," *Phys. Rev. Lett.* 90(11):115501.

Kempe et al. (2004) "Chain Anisotropy of Side-Group Liquid Crystalline Polymers in Nematic Solvents," Macromolecules 37:8730-8738.

Kempe et al. (Mar. 2004) "Self-Assembled Liquid-Crystalline Gels Designed from the Bottom Up," *Nature Materials* 3:177-182.

Kim (2005) "Short Pitch Cholesteric Electro-Optical Device Stabilized by nonunifirm Polymer Network," *Appl. Phys. Lett.* 86:161118.

Klasen et al. (2000) "New Liquid-Crystal Materials for active matrix displays with negative dielectric anisotropy and low rotational viscosity," *Jpn J Appl Phys* 39(11 B): L1180-1182.

S. H. Lee et al. (2009) "Emerging vertical-alignment LC technology using UV curable monomer," Journal of the SID 2009, 551.

Lee et al. (1994) "Fast Linear Electro-Optical Switching Properties of Polymer-Dispersed Ferroelectric Liquid Crystals," *Applied Physics Letters* 64(6)718-720.

E. Lueder, *Liquid Crystal Displays, Addressing Schemes and Electro-optical Effects* John Wiley and Sons, Singapore, 2001.

Marčelja, S. (1974) "Chain Ordering in Liquid Crystals. I. Even-Odd Effect" *J. Chem. Phys.* 60(9):3599.

Masahito et al. (1996) "Response mechanism of nematic liquid crystals using the in-plane switching mode," Appl. Phys. Lett. 69(5):623-625.

Mattoussi et al. (1987) "Nematic Solutions of Side Chain Nematic Polymers: A Viscoelastic Study," Molecular Crystals & Liquid Crystals 144(5):211-224.

Mattoussi et al. (1989) "Frank Elastic Constants and Rotational Viscosity for Nematic Solutions of Main-Chain Polymers," Journal de Physiqud 50(1):99-109.

McConnell et al. (1997) "Melting of Ordered Arrays and Shape Transitions in Highly Concentrated Diblock Copolymer Solutions," *Macromolecules* 30:435.

Murashige et al. (2007) "Polymer Alignment Behavior with Molecular Switching of Ferroelectric Liquid Crystal," *Jp. J. Appl. Phys.* 46(2):L37-L39.

Ono et al. (1999) "High-performance Photorefractivity in High- and Low-Molar-Mass Liquid Crystal Mixtures," J Applied Physics 85(5):2482-2487.

Palffy-Muhoray et al. (Mar. 2004) "Liquid-Crystal Gels Bridging the Experiment-Theory Gap," *Nature Materials* 4:139-140.

Park et al. (2006) "Influence of 4-Cyano4'-biphenylcarboxylic Acid on the Orientational Ordering of Cyanobiphenyl Liquid Crystals at Chemically Functionalized Surfaces," *J. Colloid and Interface Sciences* 304:459-473.

Reiffenrath et al. (1989) "New liquid-crystalline compounds with negative dielectric anisotropy," *Liq. Cryst.* 5(1):159-170.

Rieker et al. (Dec. 7, 1987) "'Chevron' Local Layer Structure in Surface-Stabilized Ferroelectric Smectic-C Cells," *Phys. Rev. Lett.* 59:2658-2661.

Shimada et al. (1991) "Electro-Optic Bistability of Ferroelectric Liquid Crystal Cell Prepared Using Obliquely Evaporated Sio Films," *Mol. Cryst. Liq. Cryst.* 201:133.

Sweta Dash, *iSuppli*. Jan. 29, 2010 [http://www.isuppli.com/Display-Materials-and-Systems/News/Pages/LCD-TV-Panel-Market-Returns-to-Growth-in-2010.aspx].

Takahashi et al. (2003) "Dynamic Local-Layer Response of Surface-Stabilized Ferroelectric Liquid Crystals to a High Electric Field by Time-Resolved X-Ray Microdiffraction," *Phys. Rev. E* 67:051706.

Verduzco et al. (2007) "Director Dynamics in Liquid-Crystal Physical Gels," Soft Matter 3(8):993-1002.

(56) References Cited

OTHER PUBLICATIONS

S. T. Wu and D. K. Yang, *Reflective Liquid Crystal Displays*, John Wiley and Sons, Singapore, 2001.

Xia et al. (2009) "Efficient Synthesis of Narrowly Dispersed Brush Copolymers and Study of Their Assemblies: The Importance of Side Chain Arrangement," *J. Am. Chem. Soc.* 131:18525-18532.

Yao et al. (1997) "Electrorheological Behavior of Side-Chain Liquid-Crystalline Polysiloxanes in Nematic Solvents," *Macromolecules* 30(19):5822-5831.

Zhao et al. (2006) "Conformation of Comb-Like Liquid Crystal Polymers in Isotropic Solution Probed by Small-Angle Neutron Scattering," *J. Polym.Sci. B Polym. Phys.* 44(17):2412-2424.

\* cited by examiner

POLYMER-DOPED VERTICALLY-ALIGNED NEMATIC LIQUID CRYSTALS

CROSS-REFERENCE TO RELATED APPLICATIONS

This application claims priority to U.S. provisional application Ser. No. 61/369,574, filed Jul. 30, 2010 which is incorporated by reference in its entirety.

STATEMENT REGARDING FEDERALLY SPONSORED RESEARCH OF DEVELOPMENT

This invention was made with government support under IIP0946085 awarded by the National Science Foundation. The government has certain rights in the invention.

BACKGROUND OF THE INVENTION

The present invention relates generally to liquid crystals, and more particularly to nematic liquid crystals.

The public's growing demand for the superior image quality provided by high definition televisions (HDTVs) has resulted in ongoing growth of HDTV sales. To compete in today's market, a display needs to meet three main criteria: high contrast, good viewing angle and fast response times. Vertically Aligned Nematic (VAN) Liquid Crystal Displays (LCDs) have inherently high contrast and, with some simple modifications, good viewing angle. Due to their excellent high contrast relative to twisted-nematic (TN) LC displays (familiar in laptop computers, for example), VAN-LCDs dominate the market in large-size LCD panels for high definition televisions (HDTVs). However, the very high contrast of VAN-LCDs comes at the expense of the response time of the display: a pixel in a current VAN display requires approximately 100 ms to switch (rise-time+fall-time), compared to less than 20 ms for a TN display.

Some attempts have been made to improve the switching speed of a VA display by adding a small amount of reactive monomer within the liquid crystal and polymerizing during processing. Although polymer-stabilized vertical-alignment (PS-VA) technology improves the switching speed in HD LCD, there are drawbacks to current PS-VA technology. Current PS-VA technology introduces a difficult irradiation step during processing to induce polymerization of the monomer, which requires precise control of the uniformity and the duration of UV irradiation. Also, the radical and ionic species created during UV radiation have long-term deleterious effects on the LCD (such as increasing the power consumption and reducing the display lifetime).

There is a need for vertically aligned nematic liquid crystal systems having faster response times without sacrificing contrast.

BRIEF SUMMARY OF THE INVENTION

Provided is a technology that significantly improves both the processing and device characteristics of vertically aligned nematic liquid crystal systems. The system described here generally uses polymers synthesized and purified outside of the display that are added at low concentration to the nematic liquid crystal that makes up the active medium of the LCD. The material comprising a small concentration of polymer dissolved in a liquid crystal is referred to as a polymer-doped LC (PD-LC). It was found that the PD-LC system described here can increase contrast (eliminating or reducing the problem of light leakage that plagues PS-VA technology, for example) and improve switching speed without introducing ionic and radical impurities produced during UV irradiation. By using polymer dopants that dissolve uniformly in the active medium of the display, in an aspect the system described here maintains the optical uniformity of the LC and avoids the polymerization-induced phase-separation that occurs during photopolymerization of monomers in LCs. Very low concentrations of polymer dopant are sufficient to produce improvements in the physical properties of VAN systems.

In an aspect, polymer-doped LCs which maintain the excellent dark state and high contrast that are the hallmarks of vertically aligned nematic liquid crystal displays and that improve one or more liquid crystal display properties including increasing the switching speed, enhancing the brightness, and improving the viewing angle of vertically-aligned nematic liquid crystal displays (VAN-LCDs) are provided. In an aspect, the polymer dopants provided confer these benefits without detrimental effects on the cell's threshold voltage or saturation voltage. In an aspect, the compositions provided are fundamentally different than existing monomer-doped in situ polymerized LCs used in PS-VA technology because the compositions provided eliminate exposure of the liquid crystal to UV light and its concomitant radical contamination. Devices free of radical contamination have increased display lifetimes in addition to their advantageous switching speeds and optical properties.

More specifically, provided is a system comprising a conventional vertically aligned nematic liquid crystal ("VAN") host material and a small amount of a liquid crystal polymer. "Liquid crystal polymer" is defined as a polymer that comprises at least one portion that includes a mesogen. In an embodiment, a "liquid crystal polymer" is a polymer having one or more mesogens attached thereto. The liquid crystal polymer does not need to be liquid crystalline in its pure state. As used herein, "mesogenic side group" or "mesogen" or M and other variations of the phrases is a group which can be useful to confer characteristics to the composition to allow the polymer to be soluble in the host and provide orientational coupling between the polymer and host. In an embodiment, a mesogen is a core from a liquid crystal composition. "Liquid crystal polymer", "dopant", "side group liquid crystal polymer" "polymer doped VAN" "polymer additive" and other variations of the phrases are used interchangeably herein in the contexts as provided.

The liquid crystal polymer is present in the VAN host in small amounts (between 0.01 and 5 wt % in embodiments). The nematic liquid crystal host and liquid crystal polymer together are a "nematic liquid crystal composition" as used herein. In an embodiment the nematic liquid crystal host has a negative delta epsilon as defined elsewhere herein.

Although applicant does not wish to be bound by theory, it is believed that the liquid crystal polymer is soluble in the VAN host and undergoes the change in orientation order along with the VAN host upon processing. The liquid crystal polymer can contain any polymer, spacer and mesogenic unit or other groups which produce the desired effect upon introduction into the VAN host. Some specific examples of the polymer, spacer and liquid crystal useful in the liquid crystal polymer are shown and described herein. In an aspect of the invention, the liquid crystal polymer is synthesized and then added to the VAN host.

In an aspect of the invention, the switching speed of a nematic liquid crystal composition described herein is as fast (within 5%) or faster than the switching speed of the VAN host without the liquid crystal polymer. In an embodiment, the optical rise time of a nematic liquid crystal composition described herein is approximately equal to (within 5%) or faster than the optical rise time of the VAN host without the liquid crystal polymer. In an embodiment, the optical fall time of a nematic liquid crystal composition described herein is approximately equal to (within 10%) or faster than the optical fall time of the VAN host without the liquid crystal polymer. In an aspect of the invention, the addition of the liquid crystal polymer to the VAN host improves the contrast of the mixture in a cell or device. In an aspect of the invention, response speed of devices containing the nematic liquid crystal compositions described herein is improved as compared to the response speed of devices which do not contain the liquid crystal polymer, as described herein. In an aspect of the invention, the nematic liquid crystal compositions described herein have one or more of the effects described herein. In an aspect of the invention, either or both of the rise time and fall time of devices containing the nematic liquid crystal compositions described herein is improved from 0% (i.e., no decrease in rise or fall time or both) up to more than one hundred percent, as compared to the rise and fall time of devices which do not contain the liquid crystal polymer, as described herein. In an embodiment, the rise time of devices containing the nematic liquid crystal compositions described herein is improved from 0% (i.e., no decrease in rise time) to an improvement of about 2× faster, as compared to the rise time of devices which do not contain the liquid crystal polymer, as described herein. In an embodiment, the fall time of devices containing the nematic liquid crystal compositions described herein is improved from 1% to about 50%, as compared to the fall time of devices which do not contain the liquid crystal polymer, as described herein.

The invention includes liquid crystal cells and devices comprising the nematic liquid crystal compositions of the invention including small and large area displays and devices such as camera viewfinders and home theaters. The preparation and uses of these cells and devices are well known to one of ordinary skill in the art.

In an embodiment, provided is a nematic liquid crystal composition, comprising: a negative delta epsilon liquid crystal host; and between 0.01 and 5 wt of a liquid crystal polymer wherein the liquid crystal polymer has the structure (FX1):

$$
\begin{array}{c}
PX; \\
| \\
W \\
| \\
M
\end{array}
\quad (FX1)
$$

wherein PX is a polymer backbone selected from

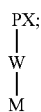

$[-(CH_2-CH-S)_n-]$, $[-(NH-CH-C(=O))_n-]$, $[-(-C(=O)-N-C(=O))_n-]$, $[-(Si(CH_3)-O)_n-]$, $[-(CH_2-CH(C(O)=O))_n-]$, $[-(CH_2-C(CH_3)(C(O)=O))_n-]$, $[-(CH_2CH)_n-]$, $[-(CH(CH_2CH_2))_n-]$ and $[-(CH_2-CH(CH_2CH_2))_n-]$ where, in each PX, n is independently an integer between 30 to 10000;

W is a straight-chain or branched hydrocarbon group spacer having between 1 to 40 carbon atoms, wherein one or more adjacent or nonadjacent $-CH_2-$ groups can be independently replaced with $-S-$, $-S(=O)-$, $-O-$, $-C(=O)-$, $-O-C(=O)-$, $-(Si-R^{40}R^{41})-$, $-[OSiR^{40}R^{41}]_d-$, $-[Si(R^{40}R^{41})O]_d-$, $-[Si(R^{40}R^{41})-(OSiR^{40}R^{41})_d]-$, $-OSiR^{40}R^{41}O-$, $-CF_2-$, and $-GeR^{40}R^{41}-$, where $R^{40}$ and $R^{41}$ are each independently a hydrogen or a C1-C5 straight chain or branched alkyl group wherein any hydrogen may be replaced with F, Cl, Br, $-CH_3$, $-OCF_3$, $-OCF_2H$, and $OCFH_2$; and wherein d is independently an integer from 1 to 6; and M is a mesogen.

In an embodiment, in the liquid crystal polymer, M is:

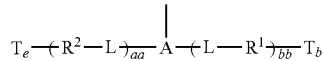

wherein b and e are independently 0 or 1; bb is an integer from 0 to 10; aa is an integer from 0 to 10; and each A, $R^1$ and $R^2$ is independently either a cycloalkane ring having from 3 to 8 carbons, an aromatic ring, or a fused two or three ring structure; where there may be from 1 to 6 cycloalkane rings and from 0 to 5 aromatic rings in M; each L is independently selected from a direct bond, $-O-$, $-O-C(=O)-$, $-C(=O)-O-$, $-C\equiv C-$, $-(CH_2)_u-$; where u is an integer from 1 to 10; wherein one or more ring carbon atoms in one or more of A, $R^1$ and $R^2$ may be replaced with $-N-$, $-S-$, and $-O-$; one or more hydrogens on any of A, $R^1$ and $R^2$ can be independently replaced with fluorine, chlorine, bromine, $-CF_3$, $-OCF_3$, $-OCF_2H$ and $-OCFH_2$; and wherein one or more hydrogen atoms in M may be independently replaced with replaced with fluorine, chlorine, bromine, $-CF_3$, $-OCF_3$, $-OCF_2H$ and $-OCFH_2$; and wherein each T is a terminating group independently selected from hydrogen, $-CN$, or a one- to fifteen-carbon alkyl, alkoxy or alkenyl chain wherein one or more hydrogen atoms may be replaced with fluorine and one or more $-CH_2-$ groups may be replaced with $-O-$ or $-O(C=O)-$. In an embodiment in any of the structures shown herein, including FX1, n in the polymer backbone is an integer from 30 to 49. In an embodiment each A, $R^1$ and $R^2$ is independently selected from:

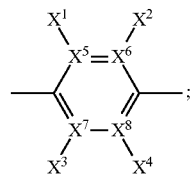

(FX20)

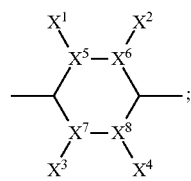

(FX21)

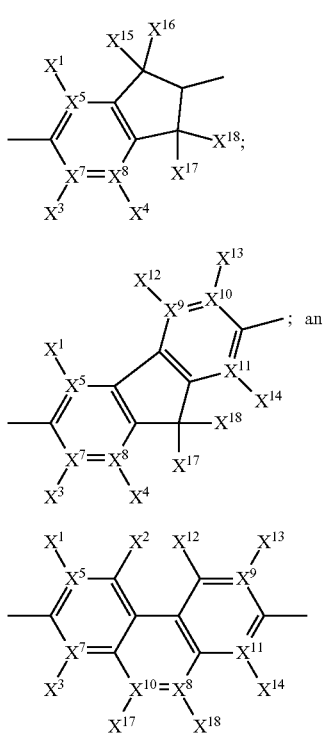

where each $X^5$, $X^6$, $X^7$, $X^8$, $X^9$, $X^{10}$ and $X^{11}$ can be independently replaced with —N—, —S— or —O—; each $X^1$, $X^2$, $X^3$, $X^4$, $X^{12}$, $X^{13}$, $X^{14}$, $X^{15}$, $X^{16}$, $X^{17}$, and $X^{18}$ is independently hydrogen, fluorine, chlorine, bromine, —OCF$_3$, —OCF$_2$H and —OCFH$_2$, or —CF$_3$. In an embodiment, in the structures shown herein, PX is independently one or more of the polymer backbone structures shown for FX1. In the structures shown herein, one of ordinary skill in the art will recognize that two adjacent —O— groups and two adjacent —S— groups would form unstable peroxide linkages and disulfide linkages and would not be preferred. In an embodiment of the invention, there are not two adjacent oxygen or two adjacent sulfur atoms present in the compositions described here.

In embodiments, a mesogen may be present at any location in the overall polymer. In an embodiment, a mesogen is present in the polymer backbone. This embodiment is also called a main chain liquid crystal polymer. In embodiment, a mesogen is present as a side chain on the polymer backbone. This embodiment is also called a side group liquid crystal polymer. In any embodiment there may or may not be a spacer present between the polymer backbone and the mesogen. In an embodiment, a mesogen may be present both in the polymer backbone and as a side chain on the polymer backbone. In an embodiment, the liquid crystal polymer is a copolymer having one or more repeating groups which may be different. In an embodiment, the liquid crystal polymer is a mixed main chain/side group polymer, where there is a first mesogen in a first composition polymer backbone and a second mesogen which can be the same or different as the first mesogen attached as a side group on a second composition polymer backbone which may be the same or different than the first composition polymer backbone. The mesogen and polymer can be attached at a terminal position of the mesogen group (and the resulting structure is called an end-on liquid crystal polymer), or the mesogen can be attached to the polymer at an internal position of the mesogen (and the resulting structure is called a side-on liquid crystal polymer). All combinations of locations of one or more mesogens relative to the polymer backbone, and the use of suitable spacers to attach the mesogen and spacer are included to the extent as if they were specifically listed. In an aspect, in the liquid crystal polymers, one or more of the variables PX, W and M may be arranged in any configuration to form the various embodiments including main chain liquid crystal polymer, side group liquid crystal polymer, mixed main chain/side group polymer, end-on liquid crystal polymer, side-on liquid crystal polymer and other possible configurations.

The liquid crystal host may be chosen for the particular purpose and physical characteristics desired, as known in the art. Any suitable liquid crystal host, including any negative delta epsilon liquid crystal host may be used. In an embodiment of the nematic liquid crystal composition, the negative delta epsilon liquid crystal host is selected from commercially available hosts including: MLC6608, MLC6886, and mixtures thereof. The primary chemical structures that are used in state-of-the-art VAN LCs are bicyclohexyl difluoro and cyclohexyl biphenyl difluoro, therefore, the polymers tested in MLC6886 are designed to be soluble in the LC hosts that are currently used in VAN displays. VAN host mixtures are enhanced by viscosity lowering agents and components that enhance the negative delta epsilon, which will not adversely affect the present polymer dopants. In an embodiment, the negative delta epsilon liquid crystal host is selected from nematic liquid crystal compositions having bicyclohexyl difluoro alkoxyphenyl and cyclobiphenyldifluoro groups. In an embodiment, the negative delta epsilon liquid crystal host is selected from nematic liquid crystal compositions comprising compounds having 4'-alkylbicyclohexyl-2,3-difluoro-4-alkyloxyphenyl and 4'-cyclohexyl-2,3-difluoro-4-alkyloxyphenylbenzene groups.

In an embodiment of the nematic liquid crystal composition the liquid crystal host has a delta epsilon of less than 0 (also referred to as "negative delta epsilon"). In an embodiment of the nematic liquid crystal composition the liquid crystal polymer has a delta epsilon value of between about −0.5 and −10. In an embodiment of the nematic liquid crystal composition the liquid crystal polymer has a delta epsilon value of greater than 0. In an embodiment of the nematic liquid crystal composition the liquid crystal polymer has a delta epsilon value of less than 0.

In an embodiment of the liquid crystal polymer W is —(CR$^{15}$R$^{16}$)$_y$—, where y is an integer from 1 to 40; wherein R$^{15}$ and R$^{16}$ are each independently hydrogen or halogen; wherein any adjacent or nonadjacent —(CR$^{15}$R$^{16}$)— group can be independently replaced with —S—, —S(=O)—, —O—, —C(=O)—, —O—C(=O)—, —(Si—R$^{40}$R$^{41}$)—, —[OSiR$^{40}$R$^{41}$]$_d$—, —[Si(R$^{40}$R$^{41}$)O]$_d$—, —[Si(R$^{40}$R$^{41}$)—[OSiR$^{40}$R$^{41}$]$_d$]—, —OSiR$^{40}$R$^{41}$O—, —CF$_2$—, and —GeR$^{40}$R$^{41}$—, where R$^{40}$ and R$^{41}$ are each independently a hydrogen or a C1-C5 straight chain or branched alkyl group wherein any hydrogen can be replaced with fluorine, and wherein d is independently an integer from 1 to 6.

In an embodiment of the liquid crystal polymer W is —(CH$_2$)$_r$—[Si(CH$_3$)$_2$]$_m$—(CH$_2$)$_{nn}$—[Si(CH$_3$)$_2$]$_m$—(CH$_2$)$_r$—O—[(C=O)]$_z$—, wherein each r and nn is independently an integer from 0 to 6, each m is independently an integer from 0 to 6; and z is 0 or 1.

In an embodiment of the liquid crystal polymer W is selected from the following. The following structures are not intended to be an exhaustive list of possible structures, but merely to provide examples.

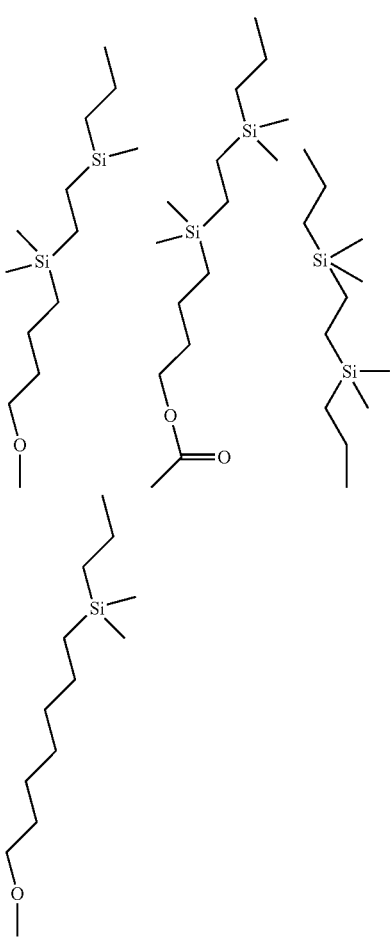

where the lines at the top of the structures shown indicate attachment to the rest of the liquid crystal polymer structure.

In the liquid crystal polymer, M can be any suitable structure that provides the desired function. In an embodiment of the liquid crystal polymer, M is a fused three ring structure having the formula:

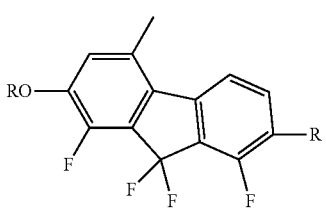

where each R is independently C1-C6 alkyl.

In an embodiment of the liquid crystal polymer, M has the structure

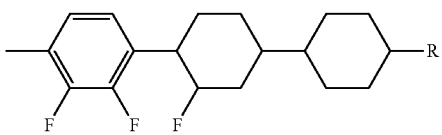

where R is a C1-C6 alkyl or alkoxy.

In an embodiment of the liquid crystal polymer, M has the structure

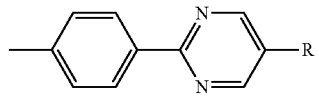

where R is a C1-C6 alkyl or alkoxy or is CN.

In separate embodiments of the liquid crystal polymer of the invention, M is selected from:

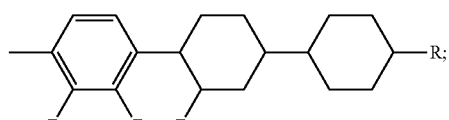

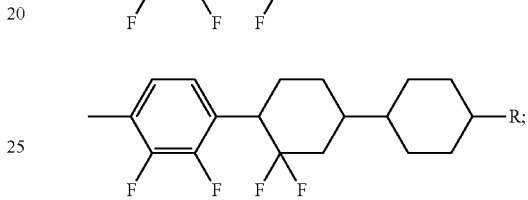

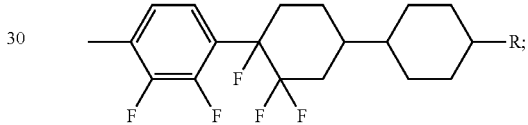

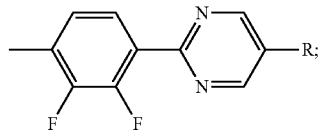

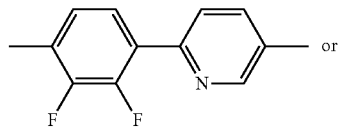

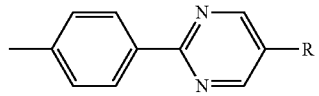

In an embodiment of the liquid crystal polymer M is selected from:

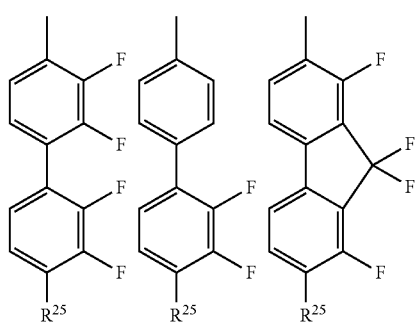

-continued

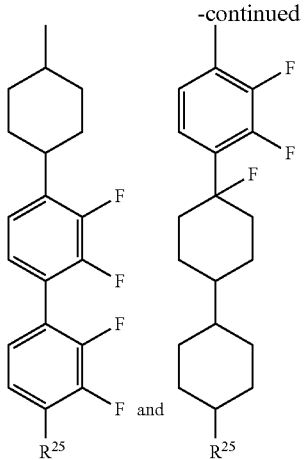 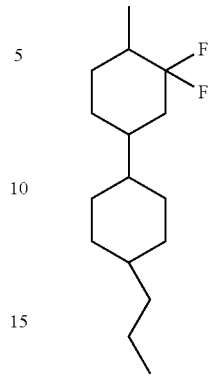

where $R^{25}$ is C1-C6 alkyl or C1-C6 alkoxy.

In an embodiment of the liquid crystal polymer mesogen M is selected from the following structures. The following structures are not intended to be an exhaustive list of possible structures, but merely to provide examples. Other examples are shown elsewhere herein.

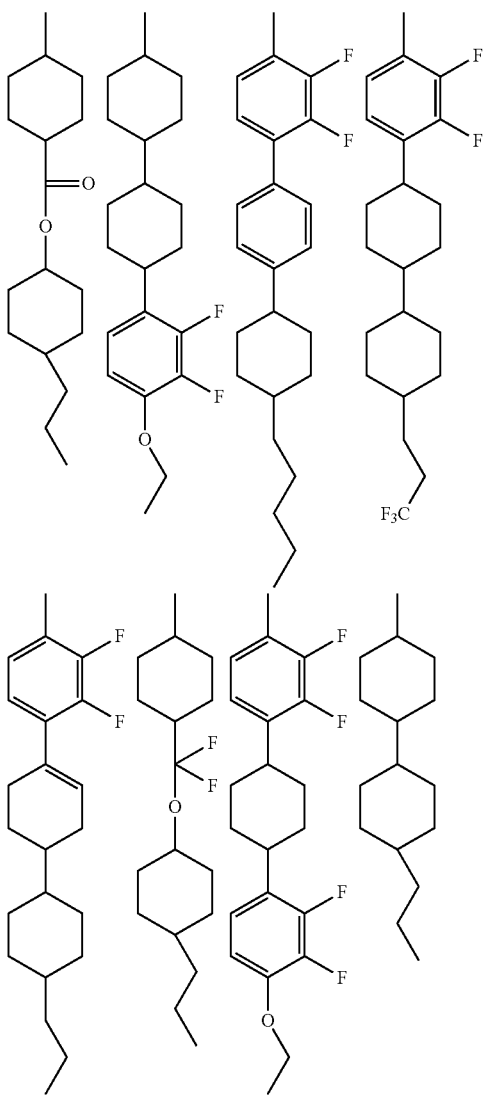

where the lines at the top of the structures shown indicate attachment to the rest of the liquid crystal polymer structure.

In embodiments, the liquid crystal polymer has one of the structures below where n is an integer from above 20 to 10,000. In embodiments, the liquid crystal polymer has one of the structures below where n is an integer from 30 to 10,000. In an embodiment, the polymer backbone has between 30 and 100 repeating units. In an embodiment, the polymer backbone has between 30 and 49 repeating units. In an embodiment, the polymer backbone has between 50 and 100 repeating units. In an embodiment, the polymer backbone has between 30 and 1,000 repeating units. In an embodiment, the polymer backbone has between 50 and 10,000 repeating units. The structures below are intended only as examples of the liquid crystal polymer that can be used in the methods, compositions and devices herein and are not limiting. Other examples of liquid crystal polymers are shown elsewhere herein.

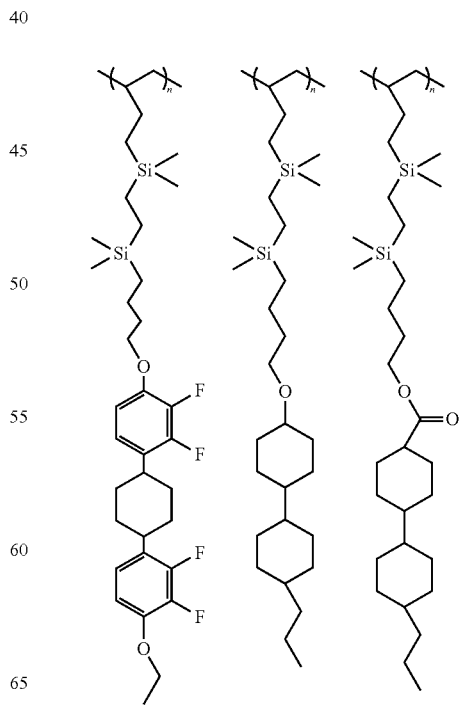

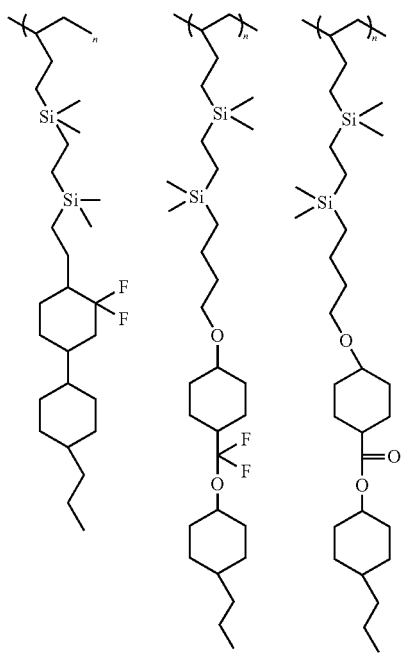

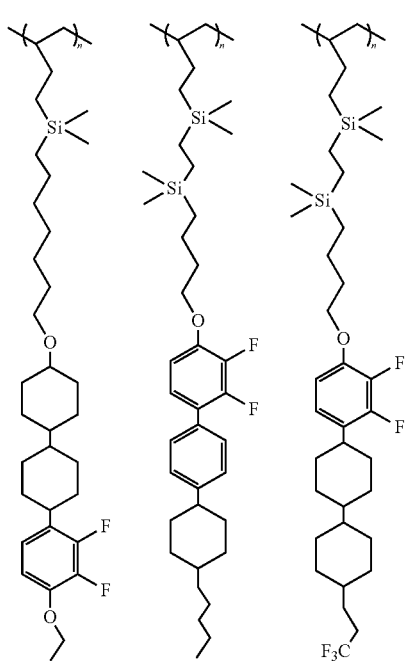

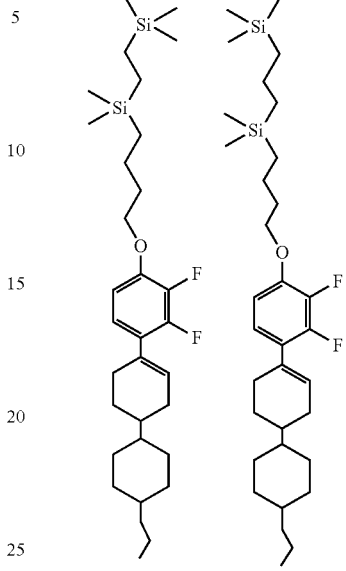

In an embodiment of the liquid crystal polymer PX is a polymer backbone having the formula:

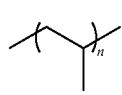

where n is an integer from 30 to 10,000. In an embodiment of the liquid crystal polymer PX is a polymer backbone having the formula:

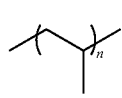

where n is an integer from 50 to 10,000. In an embodiment of the liquid crystal polymer PX is a polymer backbone having the formula:

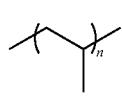

where n is an integer from 30 to 49. In an embodiment of the liquid crystal polymer PX is a polymer backbone having the formula:

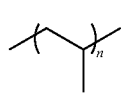

where n is an integer from 30 to 50. All intermediate ranges and individual values of all variables and ranges are intended to be included to the fullest extent, including specific inclusion and exclusion in a claim.

In an embodiment, in the liquid crystal polymer, PX is a polymer backbone having the formula: [—(CH$_2$—CH—S)$_n$—], where n is an integer from 50 to 10,000. In an embodiment, in the liquid crystal polymer, PX is a polymer backbone having the formula: [—(NH—CH—C(=O))$_n$—], where n is an integer from 50 to 10,000. In an embodiment, in the liquid crystal polymer, PX is a polymer backbone having the formula: [—(—C(=O)—N—C(=O))$_n$—] where n is an integer from 50 to 10,000. In an embodiment, in the liquid crystal polymer, PX is a polymer backbone having the formula: [—(Si(CH$_3$)—O)$_n$—], where n is an integer from 50 to 10,000. In an embodiment, in the liquid crystal polymer, PX is a polymer backbone having the formula: [—(CH$_2$—CH(C(O)=O)$_n$—], where n is an integer from 50 to 10,000. In an embodiment, in the liquid crystal polymer, PX is a polymer backbone having the formula: [—(CH$_2$—C(CH$_3$)(C(O)=O)$_n$—] where n is an integer from 50 to 10,000. In an embodiment, in the liquid crystal polymer, PX is a polymer backbone having the formula: [—(CH$_2$—CH(CH$_2$CH$_2$))$_n$—] where n is an integer from 50 to 10,000. In an embodiment, in the liquid crystal polymer, PX is a polymer backbone having the formula: [—(CH$_2$CH)$_n$—], where n is an integer from 50 to 10,000. In an embodiment, in the liquid crystal polymer, PX is a polymer backbone having the formula: [—(CH(CH$_2$CH$_2$))—$_n$], where n is an integer from 50 to 10,000.

In an embodiment, in any of the possibilities for PX, n is an integer from 100 to 5,000. In an embodiment, in any of the possibilities for PX, n is an integer from 500 to 1,000. In an embodiment, in any of the possibilities for PX, n is an integer from 30 to 49.

In an embodiment, one or more polystyrene end groups are chemically bound to the liquid crystal polymer. In an embodiment, no polystyrene end groups are chemically bound to the liquid crystal polymer.

In an embodiment, provided is a nematic liquid crystal composition, comprising: a nematic liquid crystal host; and between 0.01 and 5 wt % of a liquid crystal polymer, wherein the liquid crystal polymer has the structure (FX11):

wherein PX is a polymer backbone; W is a spacer; M is a mesogen, EG is a polystyrene end group, and each i is independently 0 or 1. In FX11, PX, W and M take the definitions as they appear elsewhere herein. In this embodiment, one or more polystyrene end group polymers are included in the liquid crystal polymer. In separate embodiments of formula (FX11), each i is 0. In separate embodiments of formula (FX11), one i is 1 and one i is 0. In separate embodiments of formula (FX11), each i is 1.

In an embodiment, provided is a nematic liquid crystal composition, comprising: a nematic liquid crystal host; and between 0.01 and 5 wt % of a liquid crystal polymer, wherein the liquid crystal polymer has the structure (FX11A):

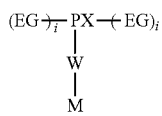

where the variables are defined as above.

Also provided is a nematic liquid crystal composition, wherein the liquid crystal polymer has the structure (FX12):

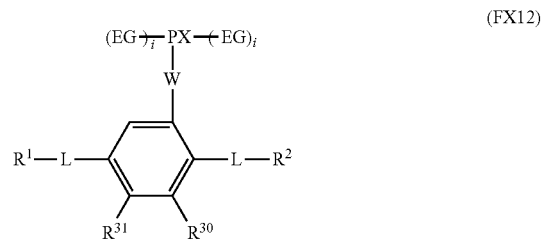

each i is 0 or 1;
each EG is

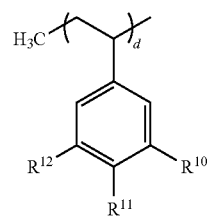

where d is independently an integer from 100 to 1000 and each $R^{10}$, $R^{11}$ and $R^{12}$ is independently hydrogen, halogen or —CN;
PX is

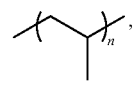

[—(CH$_2$—CH—S)$_n$—], [—(NH—CH—C(=O))$_n$—], [—(—C(=O)—N—C(=O))$_n$—], [—(Si(CH$_3$)—O)$_n$—], [—(CH$_2$—CH(C(O)=O)$_n$—], [—(CH$_2$—C(CH$_3$)(C(O)=O)$_n$—], [—(CH$_2$CH)$_n$—], [—(CH(CH$_2$CH$_2$))—$_n$] or [—(CH$_2$—CH(CH$_2$CH$_2$))$_n$—] where, in each PX, n is independently an integer between 50 to 10000; W is —(O)$_b$—(CR$^{13}$R$^{14}$)$_x$—(O)$_b$—FX—(O)$_b$—(CR$^{15}$R$^{16}$)$_y$—(O)$_b$—, where x and y are each independently integers from 0 to 20;
FX is a spacer selected from —S—, —S(=O)—, —O—, —C(=O)—,

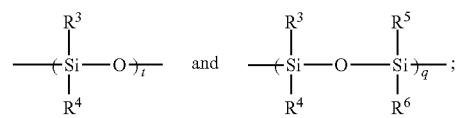

where q is an integer from 0 to 10;
t is an integer from 1 to 10; each b is independently 0 or 1; and $R^3$, $R^4$, $R^5$ and $R^6$ are each independently selected from optionally substituted $C_1$-$C_6$ alkyl, where the optional substituents are one or more halogens; $R^{13}$, $R^{14}$, $R^{15}$ and $R^{16}$ are each independently hydrogen or halogen; each L is independently selected from: —O—C(=O)—, —C(=O)—O—, —C=C—, —C≡C—, —(CH$_2$)$_u$—; and a single bond; where u is an integer from 1 to 10;

$R^1$ and $R^2$ are each independently selected from:

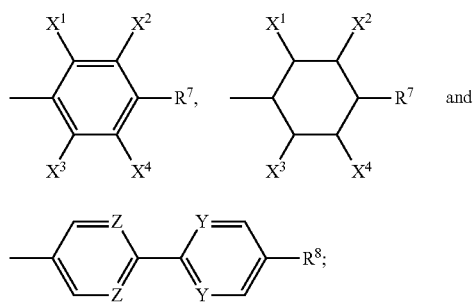

where $X^1$, $X^2$, $X^3$ and $X^4$ are independently hydrogen, halogen, methoxy, $C_1$-$C_3$ alkyl or —CN; where (a) each Z and each Y is CH, or (b) each Z is N and each Y is CH, or (c) each Y is N and each Z is CH;

$R^7$ and $R^8$ are each independently hydrogen, halogen, and —(O)$_v$—(CH$_2$)$_p$—CH$_3$ where p is an integer from 0 to 20 and v is 0 or 1.

Also provided in an embodiment is a nematic liquid crystal composition described herein, wherein the liquid crystal polymer has the structure (FX12A):

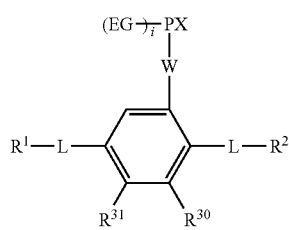

where i is 1 and the variables are as defined for Formula FX12 and where $R^{30}$ and $R^{31}$ are each independently hydrogen or halogen.

In the liquid crystal polymer, the polymer backbone PX can be any suitable polymer unit as described herein. As an embodiment of each formula described herein, provided is an aspect wherein in the liquid crystal polymer of the nematic liquid crystal composition, PX is a polymer backbone having the structure:

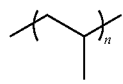

where n is an integer from 50 to 10,000.

Also provided is a nematic liquid crystal composition as described herein wherein the liquid crystal polymer has the structure (FX13):

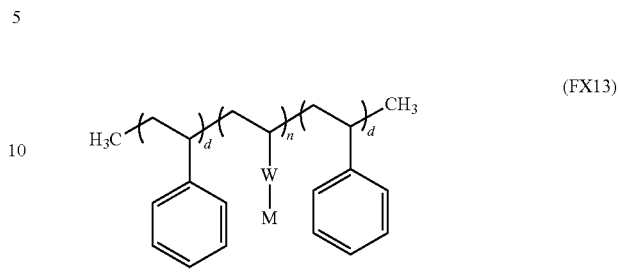

where each d is independently an integer from 100 to 1000; and n is an integer from 50 to 10,000 and the other variables are as defined for formula (FX1).

Also provided in an embodiment is a nematic liquid crystal composition as described herein wherein the liquid crystal polymer has the structure (FX14):

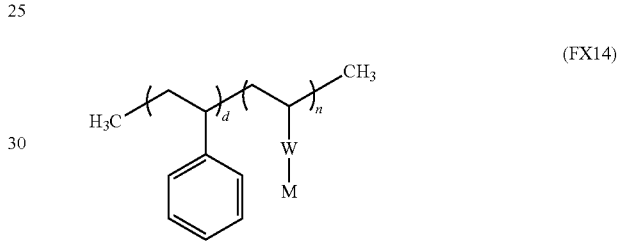

where d is an integer from 100 to 1000; and n is an integer from 50 to 10,000 and the other variables are as defined for formula (FX1).

In an aspect of the invention, provided is a liquid crystal polymer having the structure (FX14A):

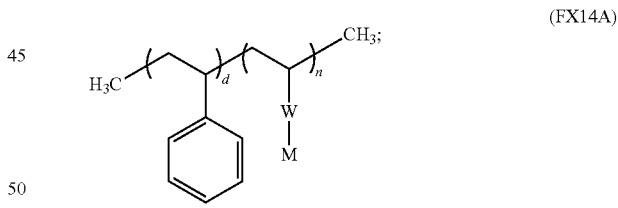

where d is an integer from 100 to 1000; and n is an integer from 50 to 10,000, and the other variables are as defined for formula (FX1).

In an aspect of the invention the liquid crystal polymer described herein is soluble in the nematic liquid crystal host at a temperature at which the nematic liquid crystal host is nematic. In an aspect of the invention, compounds having all combinations of the structures and all other components herein are intended to be described to the fullest extent, including to provide the ability to include or delete particular structures or components from the claims, for example. If any variable is not defined, it is understood that variable can take any definition that is synthetically possible and functions in the manner described herein.

In an embodiment the liquid crystal polymer has the structure
(Polymer 5)
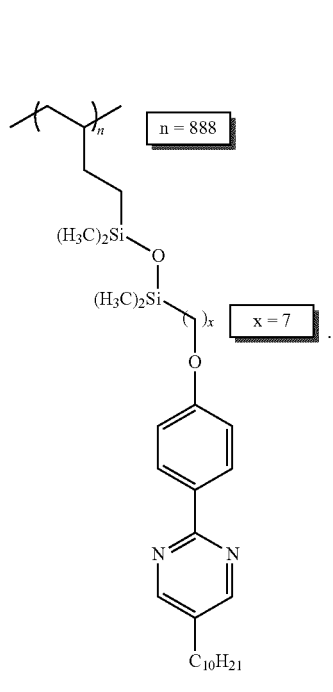
In an embodiment the liquid crystal polymer has the structure
(Polymer 5A)
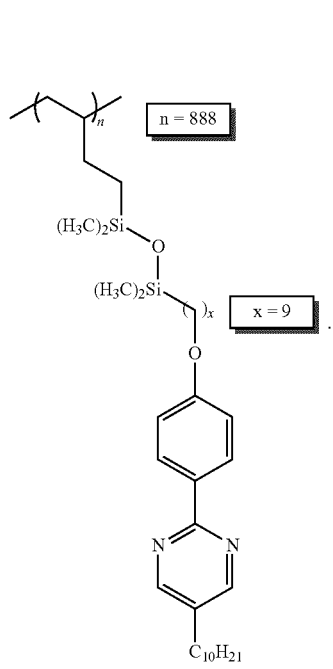
In an embodiment the liquid crystal polymer has the structure (Polymer 6):
(Polymer 6)
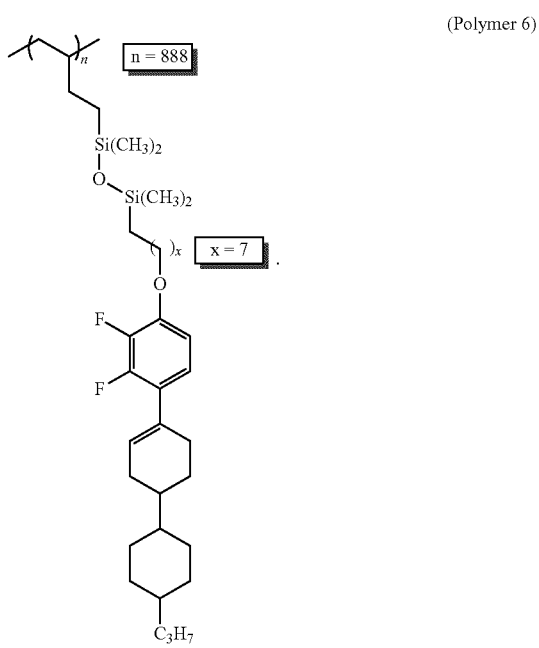
In an embodiment the liquid crystal polymer has the structure (Polymer 7):
(Polymer 7)
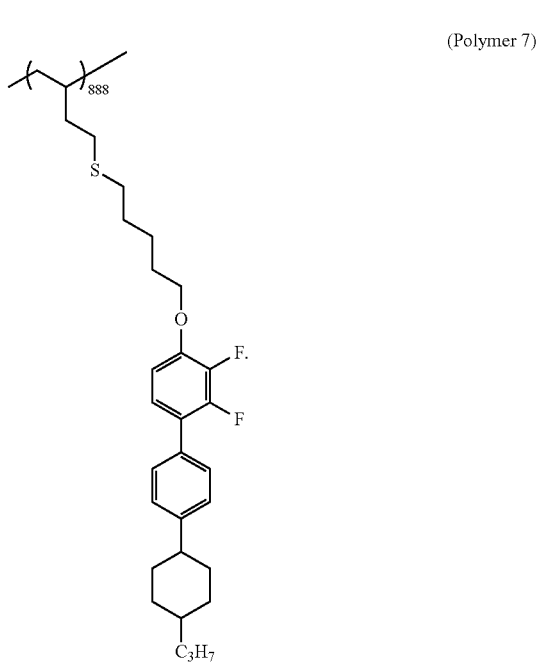

In an embodiment of the nematic liquid crystal composition the liquid crystal polymer has the structure (FX9), (FX10) or (FX9A):

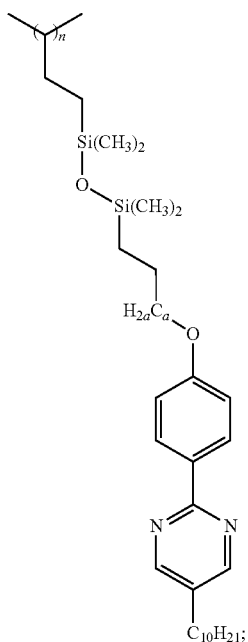

(FX9)

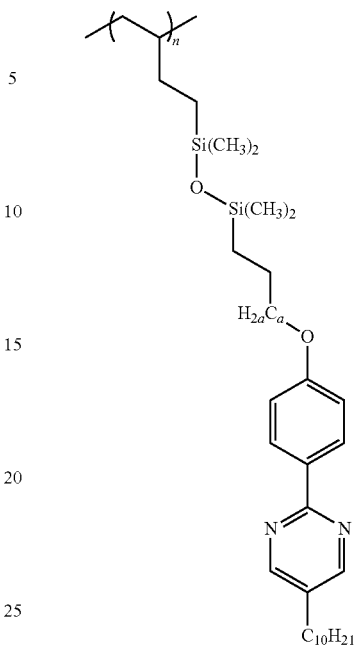

(FX9A)

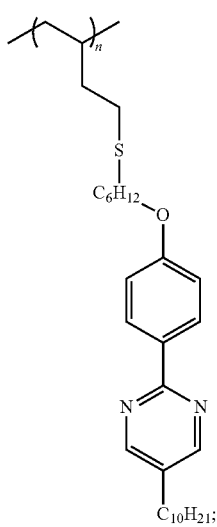

(FX10)

where n is an integer from 500 to 1,000 and a is an integer from 5 to 9.

In an embodiment of the nematic liquid crystal composition the liquid crystal polymer is soluble in the nematic liquid crystal host at a temperature at which the nematic liquid crystal host is nematic.

Also provided is an optical device comprising two opposing electrode surfaces which have a nematic liquid crystal composition described herein disposed therebetween. In an embodiment, the optical device has improved contrast as compared to an optical device containing no crystal polymer. In an embodiment, the optical device has improved switching speed as compared to an optical device containing no liquid crystal polymer. In an embodiment, the optical device has improved viewing-angle symmetry as compared to an optical device containing no liquid crystal polymer.

Also provided is a method of preparing a nematic liquid crystal composition, comprising: contacting a nematic liquid crystal host; and between 0.01 and 5 wt % of a liquid crystal polymer.

In an embodiment of the invention, the liquid crystal polymer is present in the nematic liquid crystal composition at a concentration below 1% by weight. In an embodiment of the invention, the liquid crystal polymer is present in the nematic liquid crystal composition at a concentration below 5% by weight. In an embodiment of the invention, the liquid crystal polymer is present in the nematic liquid crystal composition at a concentration below 0.1% by weight. In an embodiment of the invention, the liquid crystal polymer is present in the nematic liquid crystal composition at a concentration below 0.05% by weight. In an embodiment, n in the polymer backbone PX is an integer from 50 to 5,000. In an embodiment of the invention, the liquid crystal polymer has a molecular weight between 30,000 g/mol and 5,000,000 g/mol and all intermediate values and ranges therein. In an embodiment of the invention, the liquid crystal polymer has a molecular weight between 30,000 g/mol and 50,000 g/mol. In an embodiment of the invention, the liquid crystal polymer has a molecular weight between 1,000,000 g/mol and 3,000,000 g/mol.

The liquid crystal polymer used in the liquid crystal device can be either surface-active or bulk-active, or may have some combination of effects. The number of chains required to confer a surface-active effect is small as compared to a bulk-active effect. This allows use of concentrations from 0.1% down to 0.01 wt % polymer. Higher concentrations of dopants can also be used.

As used herein, when the liquid crystal polymer is "soluble" or "solvated" in the nematic liquid crystal host, this means that at least a portion of the liquid crystal polymer is solvated by the host. In an embodiment, the liquid crystal polymer is soluble in the nematic liquid crystal host. In an embodiment, the liquid crystal polymer is soluble in the nematic liquid crystal host at some temperatures and not at other temperatures. In an embodiment, the liquid crystal polymer is reversibly soluble in the host. As used herein, "soluble liquid crystal polymer" and other forms of the phrase means the liquid crystal polymer forms a homogeneous composition of host and liquid crystal polymer and there are not phase separated layers or portions thereof. In an aspect of the invention, the liquid crystal polymers of the invention are soluble liquid crystal polymers. At least a portion of the liquid crystal polymer is solvated by the host at least under some temperature and concentration conditions. In the invention, the association between the liquid crystal polymer and host is a physical association, not chemical bonding between the liquid crystal polymer and host. In an aspect of the invention where there are no end groups, there is no physical crosslinking between liquid crystal polymer groups. In an embodiment, there is physical crosslinking between liquid crystal polymer groups.

As used herein "core" refers to a central portion of a mesogen that contributes to important attributes (including but not limited to shape, size, polarizability, dipole magnitude and dipole orientation). In an embodiment, a mesogen M includes a core having one or more six membered aromatic or nonaromatic rings which can include one or more heteroatoms in the rings and one or more substituents, including alkyl, alkoxy and halogen and one or more tails, including the structures described herein and alkylsilane, perfluoroalkylsilane, and silylfluoro tails.

DETAILED DESCRIPTION OF THE INVENTION

Figure 1:
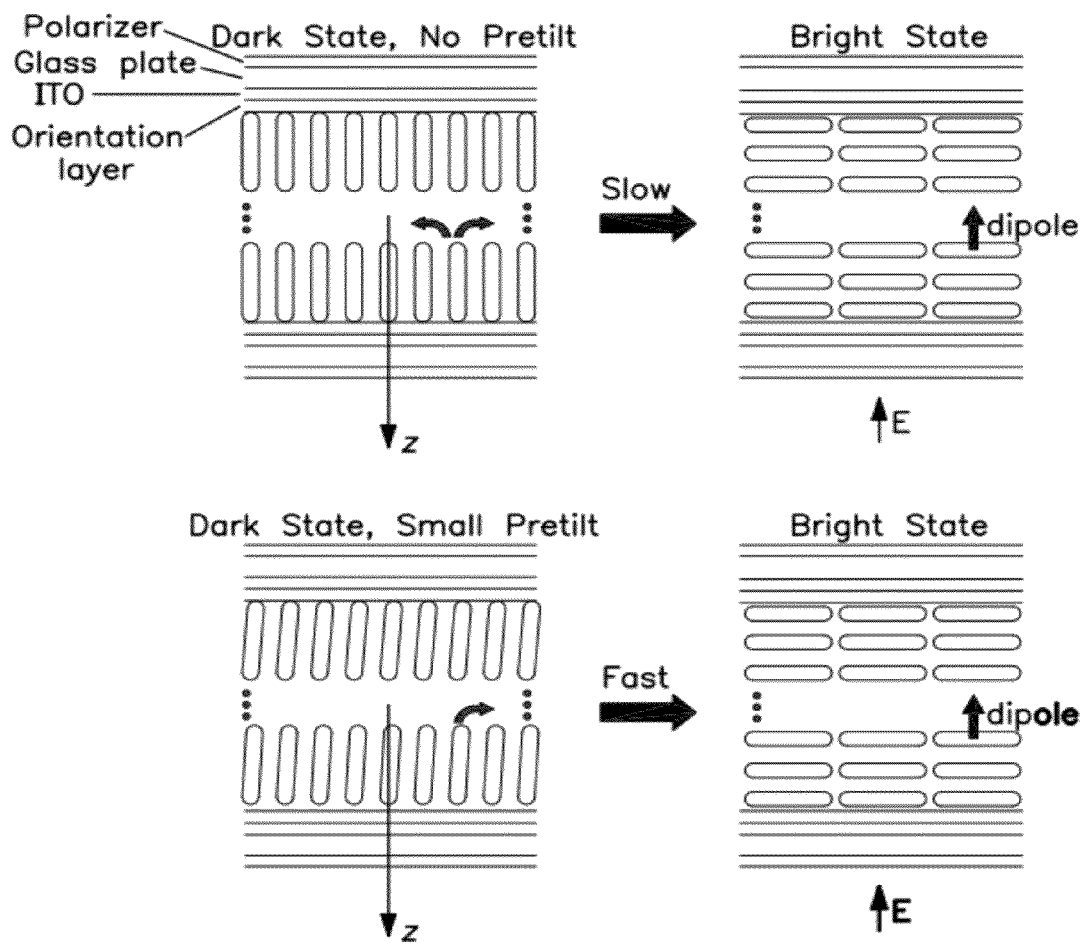
FIG. 1 shows that in a Vertically Aligned Nematic (VAN) cell with no applied field, the liquid crystal molecules (rod shaped) are oriented perpendicular to the plane of the glass plates, sandwiched between crossed polarizers that cause the cell to appear dark (left). When an electric field is applied, the liquid crystal rotates to maximize its dipole in the direction of the electric field, producing the bright state of the cell (right). With zero pretilt (top, left), the liquid crystals can rotate in any azimuthal direction, significantly lengthening the rise time. A slight pretilt (lower, left) dramatically improves the rise time—as observed with the polymer dopant described here.

Without wishing to be bound by any particular theory, there can be discussion herein of beliefs or understandings of underlying principles or mechanisms relating to the invention. It is recognized that regardless of the ultimate correctness of any explanation or hypothesis, an embodiment of the invention can nonetheless be operative, and useful.

In general, the terms and phrases used herein have their art-recognized meaning, which can be found by reference to standard texts, journal references and contexts known to those skilled in the art. The definitions are provided to clarify their specific use in the context of the invention.

As used throughout the present description, the expression "a group corresponding to" or a "group" an indicated species expressly includes a radical, including monovalent, divalent and polyvalent radicals for example, an aromatic or heterocyclic aromatic radical, of the groups listed provided in a covalently bonded configuration, optionally with one or more substituents, including but not limited to electron donating groups, electron withdrawing groups and/or other groups.

As used herein, "alkyl" groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms.

Alkyl groups include long alkyl groups having more than 10 carbon atoms, particularly those having 10-30 carbon atoms. An alkoxy group is an alkyl group that has been modified by linkage to oxygen and can be represented by the formula R—O and may also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—.

Aryl groups include groups having one or more 5- or 6-member aromatic or heteroaromatic rings. Heteroaryl groups are aryl groups having one or more heteroatoms (N, O or S) in the ring. Aryl groups can contain one or more fused aromatic rings. Heteroaromatic rings can include one or more N, O, or S atoms in the ring. Heteroaromatic rings can include those with one, two or three N, those with one or two O, and those with one or two S, or combinations of one or two or three N, O or S. Aryl groups are optionally substituted. Substituted aryl groups include among others those which are substituted with alkyl or alkenyl groups, which groups in turn can be optionally substituted. Specific aryl groups include phenyl groups, biphenyl groups, pyridinyl groups, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms.

Optional substitution of any group includes substitution with one or more of the following substituents: halogen, —CN groups, —$OCH_3$, —$CF_3$, —$CFH_2$, —$CF_2H$, —$CF_2CF_3$, —$CH_2CF_3$, $CH_3$, $NO_2$, $CH_2R$, $CH_2OR$, where R is a C1-C3 alkyl, and other substituents known in the art.

Deuterium can be substituted for any H in the polymer backbone or spacer or mesogenic side groups.

As used herein, the term "halo" or "halogen" refers to a halogen group such as a fluoro (—F), chloro (—Cl), bromo (—Br) or iodo (—I).

As is customary and well known in the art, hydrogen atoms in the formulas shown herein are not always explicitly shown.

It should be noted that as used herein and in the appended claims, the singular forms "a", "an", and "the" include plural reference unless the context clearly dictates otherwise. Thus, for example, reference to "an item" includes a plurality of such items and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

As to any of the groups described herein which contain one or more substituents, it is understood, that such groups do not contain any substitution or substitution patterns which are sterically impractical and/or synthetically non-feasible. In addition, the compounds of this invention include all stereochemical isomers arising from the substitution of these compounds.

The compounds of this invention may contain one or more chiral centers. Accordingly, this invention is intended to include racemic mixtures, diastereomers, enantiomers and mixture enriched in one or more stereoisomer. The scope of the invention as described and claimed encompasses the racemic forms of the compounds as well as the individual enantiomers and non-racemic mixtures thereof.

The compounds and formulas of the invention may be used in liquid crystal display devices as known in the art. Methods of preparing and using liquid crystal display devices, including preparation and use of cells is well known in the art.

The invention is further detailed in the Examples, which are offered by way of illustration and are not intended to limit the scope of the invention in any manner.

Instead of in situ polymerization, a polymer additive that is soluble in the VAN is used here. Specifically, a liquid crystal polymer (LCP), i.e., a polymer that includes a mesogen group and can undergo the change in orientational order along with the LC host (solvent) is used. For a chosen LC host, a mesogen group can be designed to confer solubility in the LC phase(s) using the methods described here. In nematic solvents, small quantities of polymer have a large effect on the switching speed.

Liquid crystal polymers with molecular weight ranging from 30,000 g/mol to 5,000,000 g/mol are particularly useful in separate embodiments. A shorter polymer gives rise to the desired effects but this would require more polymer, making the use less economical. The longer the polymer, the less soluble it is in the VAN host and the polymer may undergo phase separation. The optimal molecular weight depends upon variables that include the chemical structure of the mesogens and the composition of the VAN host.

In an embodiment, a liquid crystal polymer tested had a molecular weight of about 1.2 Million g/mol (a degree of polymerization of about 900 repeat units). In an embodiment, liquid crystal polymers described here have about 888 repeating units. In an embodiment, liquid crystal polymers described here have about 900 repeating units. In an embodiment, liquid crystal polymers described here have about 2000 repeating units. It is to be understood that when the number of repeating units is specified in a particular structure, the number shown can be replaced with another number and a compound having the resulting structure is intended to be included in the description to the same extent as if it were specifically drawn. For example, where a specific structure indicates 888 repeating units in a polymer backbone, there can be 900 or 2000 repeating units in that polymer backbone and all those resulting embodiments are intended to be included in this description.

In an aspect of the invention, portions of the liquid crystal polymer are not cross-linked with other portions of the liquid crystal polymer or other liquid crystal polymers. In an aspect of the invention, the polymer backbone is not a polyoxetane. In an aspect of the invention, the polymer backbone is polyethylene. In an aspect of the invention, the polymer backbone is polybutadiene. In an aspect of the invention, the composition of any portion of any liquid crystal polymer described herein can be combined with the composition of another portion of the liquid crystal polymer to form a different liquid crystal polymer which is intended to be disclosed individually to the extent as if it were shown explicitly, for the purpose of inclusion or exclusion in a claim. For example, any group provided herein as PX can be combined with any spacer W and any mesogen M described to form a liquid crystal polymer which is useful in the invention, even if the combination is not explicitly shown.

The materials and devices of the invention do not contain "microdomains" of polymer interspersed with liquid crystals. Rather, the materials and devices of the invention comprise liquid crystal with polymer solubilized by the liquid crystal. The liquid crystal polymer of the invention is compatible and at least substantially homogeneous with the liquid crystal host.

In the compounds and methods of the invention, the liquid crystal polymer is not polymerized after contact with the nematic liquid crystal host, but is polymerized before contact with the nematic liquid crystal host.

As used herein, "dissolve" or "soluble" when referring to the liquid crystal polymer of the invention and liquid crystal host means the liquid crystal polymer does not phase separate from the liquid crystal host. Therefore, the liquid crystal polymer can undergo the change in orientation order along with the liquid crystal host.

As used herein, "single bond" means that two groups are directly attached to each other. For example, when a ring is attached to a substituent with a single bond, there are no intervening groups between the ring and the substituent.

As used herein, the use of a line coming off of a substituent when used as a portion of a molecule is standard in the art and indicates that there is another substituent attached, not necessarily that there is a carbon unit terminating. For example, in the group

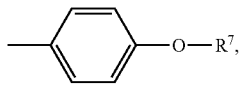

the line attached to the phenyl ring does not mean there is a terminal —CH$_3$ group attached or a —CH$_2$— linker unless those interpretations are consistent with the chemical usage, but rather the group is attached to another group in the molecule. In the group

the two lines terminating the repeating unit are intended to be a carbon unit (—CH$_3$ groups) and the line exiting the repeating unit vertically is intended to indicate attachment to another group. This usage is standard in the art.

In an embodiment of the invention, the liquid crystal polymers of the invention are not copolymers or block copolymers, and have only one polymeric backbone group, generally designated as "PX" in an embodiment. A repeating unit in a spacer group is not considered a polymer in the context of distinguishing the molecules here from copolymers or block copolymers.

1. Vertically Aligned Nematic (VAN) Technology

Vertically aligned (VA, also known as vertical alignment) displays have high contrast because the liquid crystal is almost completely vertically aligned (parallel to the path of the light, perpendicular to the glass plates) at zero voltage, giving the cell an excellent dark state under crossed polarizers (FIG. 1, left). More specifically, a VAN cell uses a special nematic liquid crystal, referred to as a "negative delta E" nematic (because the dielectric constant along the short axis of the liquid crystal molecule is larger than along the long axis). "Negative delta epsilon" generally refers to a material property (i.e., of a bulk material), usually describing a mixture of small molecules that forms a liquid crystal with negative dielectric anisotropy (i.e., that have 'delta epsilon' less than zero). As used herein, the term "negative delta epsilon" is used to also describe mesogenic groups that have a molecular dipole transverse to the long axis of the group.

"Delta E" and "delta epsilon" are used interchangeable herein and indicate the dielectric anisotropy.

When a voltage is applied (typically a 1 kHz sine wave), the liquid crystal molecules reorient such that their dipoles rotate toward the direction of the electric field (i.e., their molecular axes rotate toward being parallel to the glass plates), resulting in the bright state (FIG. 1, right, note arrows labeled "dipole" and "E").

Scheme 1 shows the chemical structures of some examples of mesogens useful in the invention. In some of the examples below, the electron withdrawing character of fluorine is used to create a transverse dipole by placing fluorine atoms asymmetrically on the rings that lie along the long-axis of the molecules.

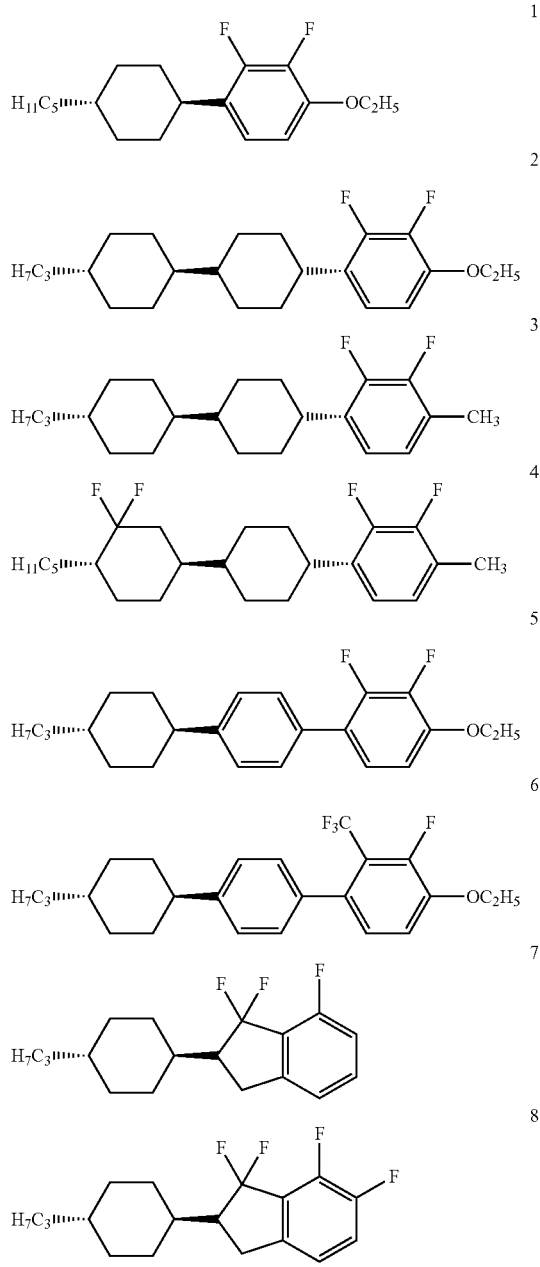

Scheme 1

On a molecular level, the key to VAN is the orientation of the dipole orthogonal to the long axis of the molecule. It is a delicate matter to incorporate such molecules in a liquid crystal, because these molecules tend to have high melting temperatures. For example, the structures shown in Scheme 1 have strongly negative $\Delta\varepsilon$ ranging from −2.7 for 3 to −8.6 for 8. However, all of them are crystalline solids at room temperature; their melting points range from 45° C. for 1 to 99° C. for 7. Furthermore, if the pure compound has a nematic phase, it tends to have high viscosity coefficients (i.e., slow response). Eutectic mixtures have been developed that maintain nematic order over a broad range of temperature near ambient conditions and compromise between having highly negative $\Delta\varepsilon$ and having low viscosity. It is important that any polymer dopants used dissolve in negative delta E nematic mixtures without slowing their switching response.

The transverse dipoles on the individual molecules give the nematic phase an unusually high polarizability in the plane orthogonal to the director. While VA nematics depend upon molecules that possess a transverse dipole, the nematic phase does not have a transverse dipole until the electric field is applied. In the absence of a field, the dipoles of the individual molecules are symmetrically distributed about the "director" (the direction of the average orientation of the long axis of the molecules). When an electric field is imposed in the plane orthogonal to the director, it breaks symmetry and the orientation distribution of transverse dipoles becomes biased along the direction of the applied field.

One of the challenges intrinsic to vertical alignment is that the usual electrode arrangement (on opposite sides of the liquid crystal) applies an electric field orthogonal to the cell (as shown in FIG. 1 by the arrow "E")—parallel to the director. If the director is perfectly homeotropically aligned, the applied field does not couple to the high polarizability plane of the negative delta E nematic (FIG. 1, top). Consequently, switching is slow.

Current approaches to improve the response time involve special alignment layers and complex patterns of electrodes in the display structure itself. Surface layers that orient the director slightly away from the cell normal (i.e., introduce a slight pretilt) improve switching speed by dictating a uniform "fall direction" (FIG. 1, bottom). However, the pretilt must be kept small to maintain the very dark "off state" that is a hallmark of VAN-LCDs. Often the pretilt is combined with complicated electrode patterning, nanofabricated protrusions, or complex and costly driving schemes to achieve acceptable response time. In addition to the added production cost required for these extra fabrication steps, the common side effect of these attempts is loss of contrast due to light leakage.

In prior methods to use polymers in VAN, the polymerization is performed in the LC cell: monomers are introduced into the active medium of the display and polymerized in situ, either on the surface or throughout the bulk by exposing the cell to ultraviolet (UV) light for a specific duration. The motivation for including this costly step traces back to a discovery in 2007: the switching speed of a VA display can be significantly improved by photopolymerizing a small amount of reactive monomer within the VAN liquid crystal cell. The polymer dopants described herein represents a major departure from previous polymer structures that sustain a pretilt angle in VAN LCDs.

2. Polymer-Doped VA Approach

In general, the technology described here uses liquid crystals (LCs) doped with liquid crystal polymers (LCPs). Liquid crystal polymers (LCPs) are flexible-chain polymers that are functionalized with mesogens. They exhibit unique properties that arise from the coupling of the orientational order inherent in the mesogen group to the flexible backbone of the polymer. When they are dissolved in a small-molecule LC, liquid crystal LCPs adopt an anisotropic conformation because the mesogen moieties couple locally to the director of the nematic solvent, leading to a synergistic ordering effect that has no counterpart in random coil polymers in conventional solvents. In contrast to in-situ polymerized gels, polymer dopants dissolve homogeneously in the liquid crystal, giving materials with exceptional optical uniformity. When the concentration of polymer is kept low, the switching speed of the LC remains rapid.

Figure 2:
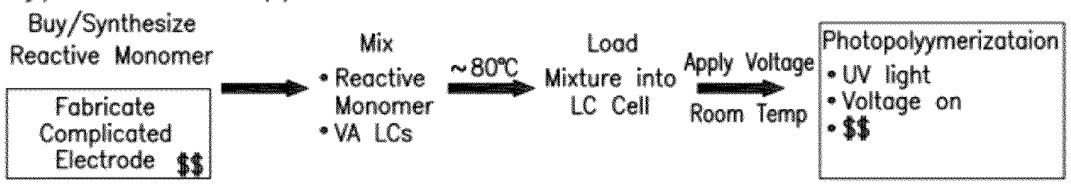
FIG. 2 illustrates the traditional polymer-stabilized VA LCD manufacture (top) involves costly electrode fabrication and expensive, time-consuming damaging UV irradiation that are avoided entirely in this approach using soluble polymers (bottom). The system described here has short processing times, in some examples as short as 10 minutes. The concentration of dopant and time used for the "controlled cooling step" can reduce the processing time further.
Figure 2:
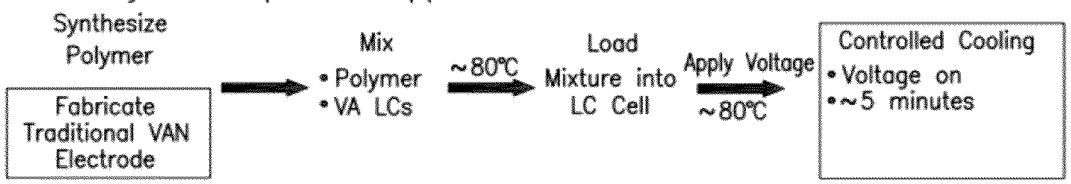

FIG. 2 compares the typical PS-VA approach with the polymer-doped VA approach described here. Instead of performing a radical step polymerization inside the display (FIG. 2, top), this approach uses LCPs synthesized and purified outside of the display that are added at low concentration to the VA nematic liquid crystal before it is loaded into the LCD (FIG. 2, bottom). As will be further described herein, the polymer dopants described here can dramatically improve switching speed without introducing ionic and radical impurities produced during UV irradiation. In addition, the polymer dopants described here can actually increase contrast. By using polymers that dissolve uniformly in the active medium of the display, the approach described here maintains the optical uniformity of the LC and avoids the polymerization-induced phase-separation that occurs during the in situ UV photopolymerization of monomers in LCs. Very low concentrations of polymers are sufficient: data shown here use 0.25% dopant, but as will be apparent to one of skill in the art by a review of the materials here, even lower concentrations or higher concentrations can be used.

3. Liquid Crystal Polymer Design

In order to show polymeric stabilization of the polymer dopants described here, including "negative delta E" liquid crystals (LCs with $\Delta\varepsilon<0$), several LCP homopolymers having various structures were chosen and synthesized having different molecular weights and linking groups of cyanobiphenyl side groups (Polymers 1, 2 and 3 in Scheme 2) as well as phenylpyrimidine side groups with different linking groups (Polymers 4 and 5 in Scheme 2) and 2,3 difluorophenyl bicyclohexylgroup attached with a siloxane linking group (Polymer 6 in Scheme 2) were synthesized and tested. A targeted selection of ABA coil-LCP-coil triblock copolymers were also synthesized and tested.

Mesogens and other components designed to improve solubility and to test the effect of their dielectric anisotropy were synthesized using polymer analogous chemistry. Polymer analogous chemistry using separately synthesized mesogens and identical polymer backbones enable a determination of the effect of mesogen structure by holding the polymer backbone length fixed. By selecting the mesogen structure, the miscibility of the LCP is controlled and the structure function relationship between the dielectric anisotropy and the nematic-polymer gel matrix was explored. The polymers synthesized allowed the effects of dipole placement, dipole strength, and linking (spacer) groups (i.e. siloxane vs. thiol) connecting the side group to the polymer backbone to be isolated.

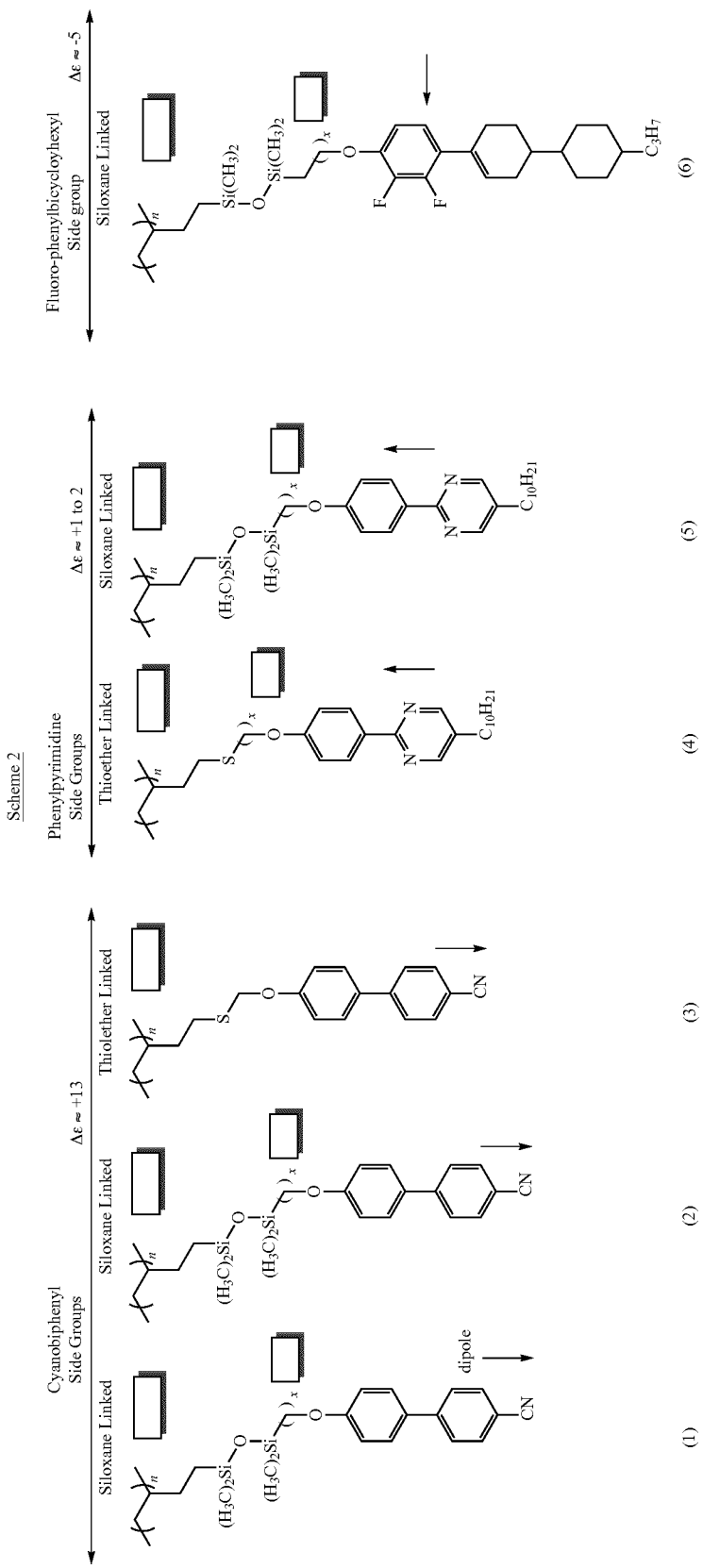

The cyanobiphenyl side groups (polymers 1, 2 and 3 in Scheme 2) have dielectric anisotropy (Δ∈) on the order of +13, while the phenylpyrimidine side groups (polymers 4 and 5 in Scheme 2) should have much smaller, though still positive dielectric dielectric anisotropies, approximately +1 or +2. The fluorinated phenyl bicyclohexyl side group, on the other hand, was designed to have a negative dielectric anisotropy (Δ∈≈−4).

Spacer length affects both the solubility of the polymer and the alignment of the pendant mesogens, so it is an important variable in tuning of the LCP dopants. Altering the alkyl spacer length involves the same chemical reactions, simply exchanging one of the starting materials. This modification is well-known and understood by one of ordinary skill in the art.

The mesogenic groups of both polymers 5 and 6 (Scheme 2) had alkyl spacers that were 7 or 8 carbons long, and were attached to the polymer backbone via siloxane linking groups. Polymer analogous chemistry was used to create polymers with exactly matched backbone length so that the effect of the side group could be determined definitively. Specifically, mesogenic groups are attached to the pendant vinyl groups of an anionically synthesized prepolymer, 1,2-polybutadiene, using platinum catalyzed hydrosilation.

The longer the polymer chain length of the LCP, the more potent its effect is expected to be on the alignment behavior of the LC solvent. Therefore a much longer polymer chain will confer the desired material property enhancements at a much smaller concentration of polymer. This will allow use of even less of the polymer additive per display screen, for example.

Based on the excellent characteristics of the LCP bearing 2,3-difluorophenyl bicyclohexyl side groups attached to a 107 kg/mol 1,2-polybutadiene prepolymer backbone (compound 6 in Scheme 2), the same side group can be used to synthesize a series of higher molecular weight polymers using art-known procedures.

Other examples of negative delta E LC fragments (in general mesogens and spacers) that can be attached to a polymer backbone using methods known in the art and described herein to form liquid crystal polymers are shown in Scheme 3. In this Scheme, R=terminal alkenyl or silyl alkyl or alkoxy tail having from 1 to 20 carbon atoms.

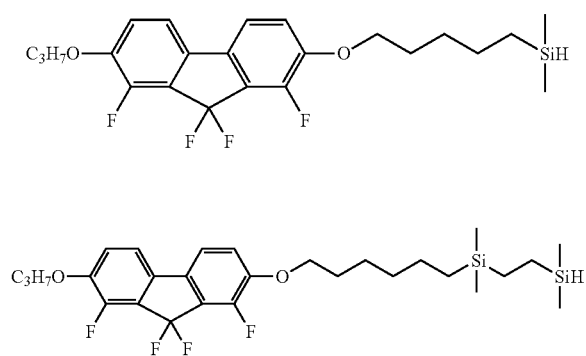

Scheme 3

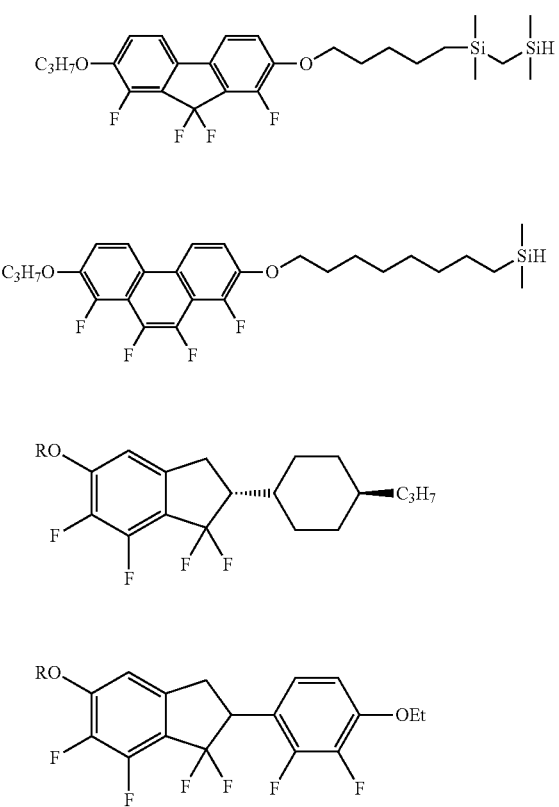

Table 1 shows the physical properties of the structures in Scheme 1 as stable nematic liquid crystals for use in formulating high negative delta E mixtures.

TABLE 1

| No. | Mesophases | $T_{NI}$, extr. | Δε | Δn | γI |
|---|---|---|---|---|---|
| 1 | C 49 N (12.9) I | 16.5 | −6.2 | 0.099 | 110 |
| 2 | C 79 $S_B$ (78) N 184.5 I | 174.4 | −5.9 | 0.096 | 413 |
| 3 | C 67 N 145.3 I | 139.0 | −2.7 | 0.095 | 218 |
| 4 | C 61 N 129.9 I | 96.4 | −4.6 | 0.087 | 549 |
| 5 | C 80 N 173.3 I | 187.7 | −5.9 | 0.156 | 233 |
| 6 | C 80 I | 44.0 | −7.3 | 0.133 | 637 |
| 7 | C 99 I | 18.1 | −7.1 | 0.086 | 136 |
| 8 | C 85 I | 49.4 | −8.6 | 0.085 | 142 |

Table 2 shows some exemplary mesogens useful in the compositions, methods and devices described here. As will be apparent by a review of the materials herein and using synthesis methods known in the art, the mesogens can be coupled or bonded to the polymer backbone and the spacer (if used) using conventional synthetic methods. In an example, one coupling method is to add the vinyl group or aldehyde group shown in the structures to tetramethyldisiloxane, or its diethylsilane counterpart and then to the polymer using the methods described herein or known to the art. Some of the groups listed (LCV20140, 20143 and 20167 for example) have positive delta E.

TABLE 2
| Item No. | Structure | Comments |
|---|---|---|
| LCV20142A | 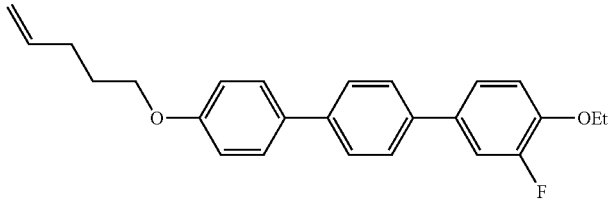 [SMILES: C=CCCCOc1ccc(-c2ccc(-c3ccc(OCC)c(F)c3)cc2)cc1] | |
| LCV20143 | 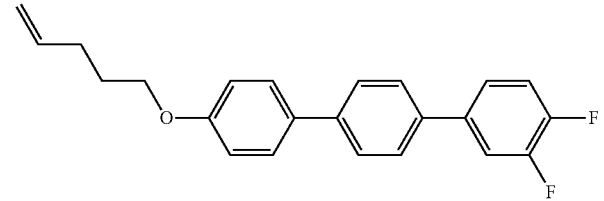 [SMILES: C=CCCCOc1ccc(-c2ccc(-c3ccc(F)c(F)c3)cc2)cc1] | |
| LCV20163 | 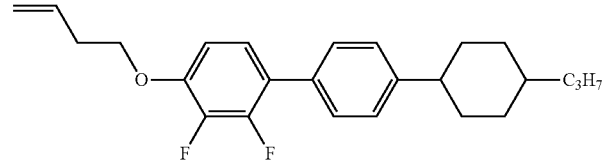 | Negative Δε<br>Only different from LCV20154 in alkyl spacer |
| LCV20154 | 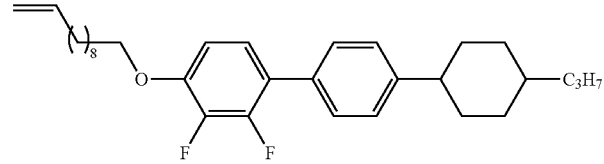 | Negative Δε<br>Only different from LCV20163 in alkyl spacer |
| LCV20138 | 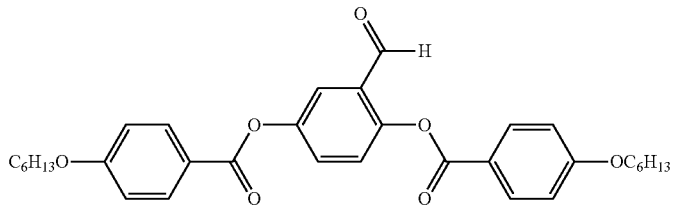 | Neutral Δε |
| LCV20140 | 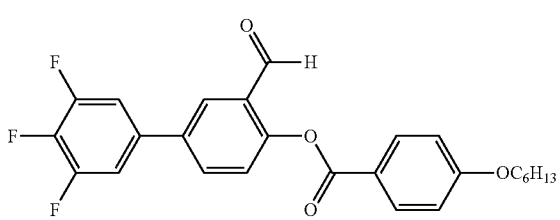 | Positive Δε |
| LCV20167 | 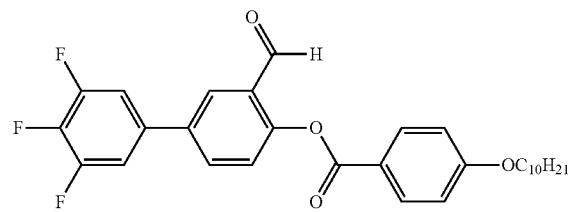 | Isolates for longer alkyl tail in side-on |

TABLE 2-continued

| Item No. | Structure | Comments |
|---|---|---|
| LCV20147 | | Negative Δε<br>Matched Set with<br>LCV20167 |
| LCV20168 | | Very Negative Δε |
| LCV20383 | | |
| | LCV20383<br>X 90 N 180 I | |
| LCV20385 | | |
| | LCV20385 X 102 N 177 I | |
| LCV20384 | | |
| | LCV20384<br>X 98 N 178 I | |
| LCV20142 | | Negative Δε |

Scheme 4 shows exemplary synthetic schemes to prepare silane, disilane and trisilane structures where ArO— in the synthetic schemes is the

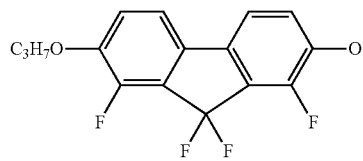

group shown. These silane structures can be attached to a polymer backbone using methods known in the art and described herein. The mesogen shown can be replaced with other mesogens, as known in the art.

Scheme 4

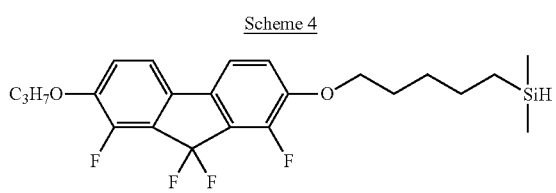

-continued

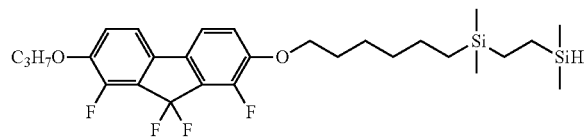

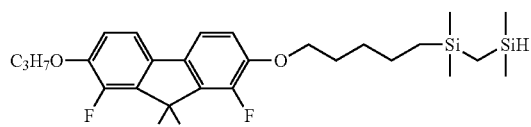

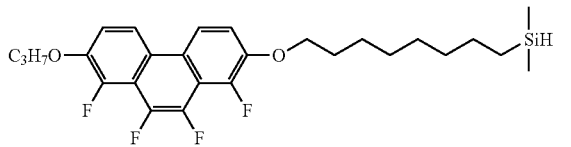

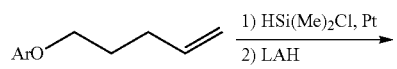

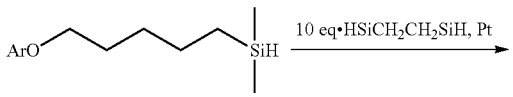

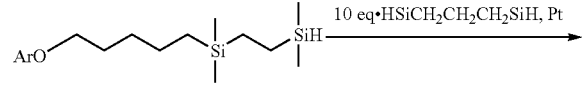

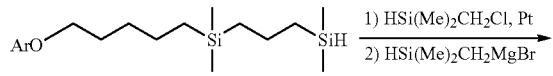

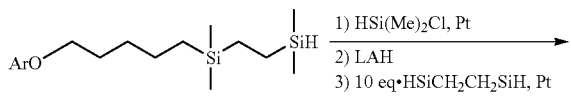

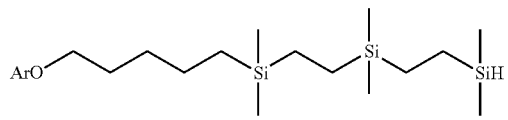

Scheme 5 shows mesogens designed to increase their orientational coupling to the small molecule VAN host by (top) increasing the length and rigidity of the mesogen's long axis and (bottom), increasing the transverse dipole of the mesogens. These groups are useful in the methods of the invention and can be attached to polymer backbones and other spacers as described here and known in the art. The number of repeating units in the groups shown below is any suitable number, for example an integer from 0 to 15.

Scheme 5

Rigid Side Groups

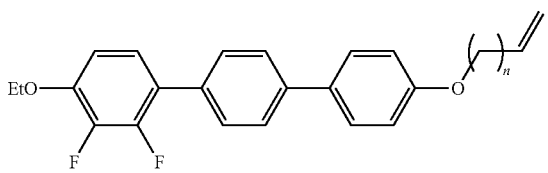

$\Delta\varepsilon = -6$

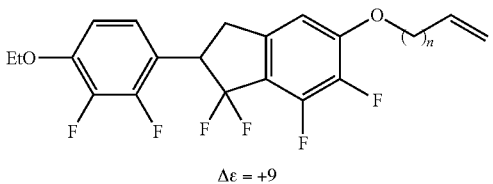

$\Delta\varepsilon = +9$

Very Strong Dielectric Anisotropy Side Groups

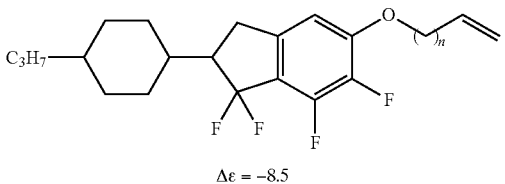

$\Delta\varepsilon = -8.5$

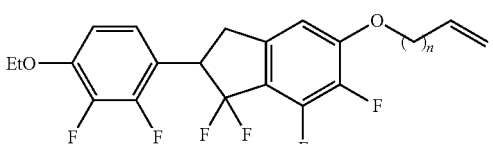

$\Delta\varepsilon = -13$

The fragments and molecules shown here can be attached to the polymer backbone and spacer using synthetic methods known in the art. Table 3 shows additional examples of liquid crystal polymers that can be used in the compositions, methods and devices described here. The structures in Table 3 show mesogens attached to specific linkers and specific polymer backbones. As will be apparent, the linkers and polymer backbones can have different structures and still function in the compositions, methods and devices described here. For example, the number of repeating units in the polymer may vary. All such modifications are intended to be included in the specification to the extent as if they were specifically listed.

TABLE 3
| Item No. | Structure | Comments |
|---|---|---|
| A | 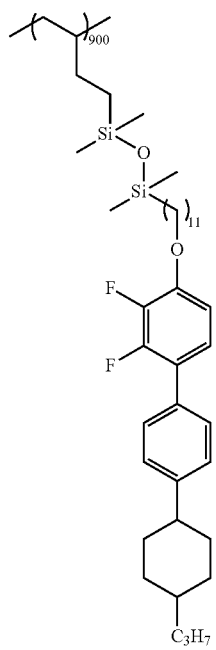 | Siloxane Linked<br>Negative Δε<br>From LCV20154 |
| B | 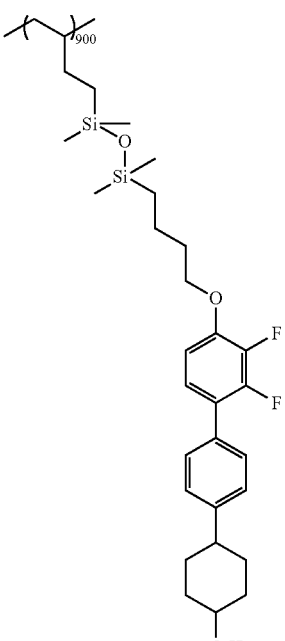 | Siloxane Linked<br>Negative Δε<br>From LCV20163 |

TABLE 3-continued
| Item No. | Structure | Comments |
|---|---|---|
| C | 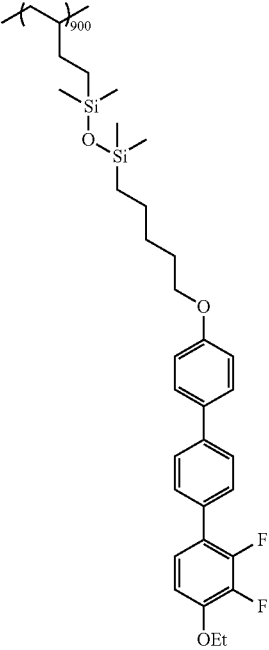 | Siloxane Linked Negative Δε |
| D | 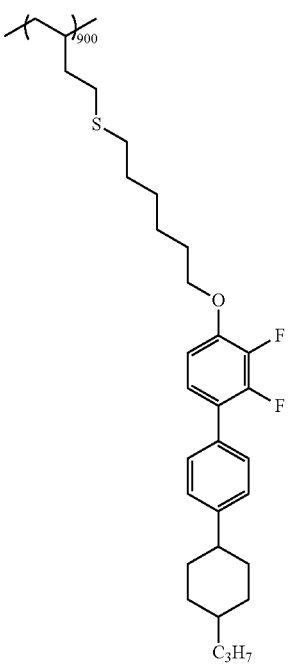 | Thioether Linked Negative Δε |

TABLE 3-continued
| Item No. | Structure | Comments |
|---|---|---|
| E | 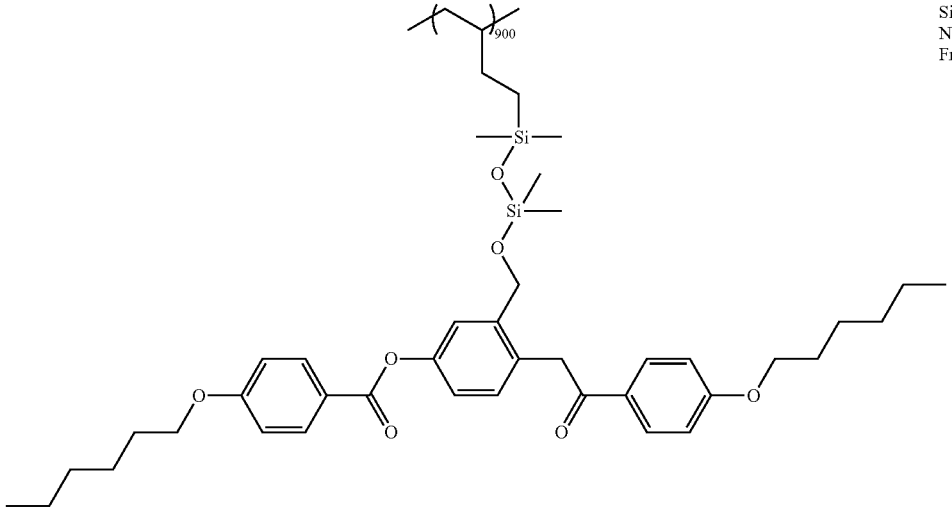 | Siloxane Linked<br>Neutral Δε<br>From LCV20138 |
| F | 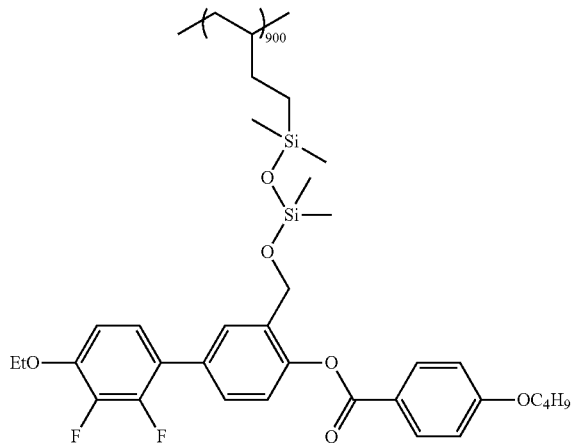 | Siloxane Linked<br>Negative Δε<br>From LCV20147 |

TABLE 3-continued
| Item No. | Structure | Comments |
|---|---|---|
| G | 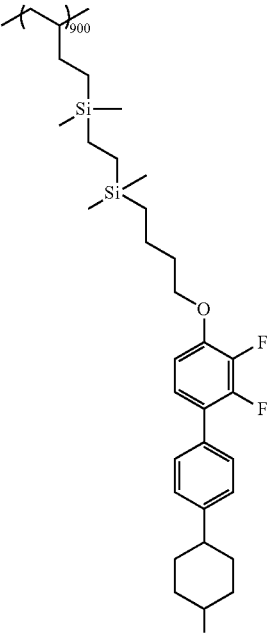 | Silane Linked<br>Negative Δε<br>From LCV20164 |
| H | 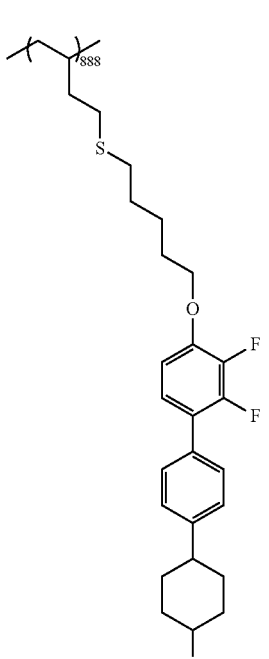 | LCV 20162<br>(Also Designated as Polymer 7) |

TABLE 3-continued

| Item No. | Structure | Comments |
|---|---|---|
| I | | Siloxane Linked Very Negative Δε From LCV20168 |
| J | | |

TABLE 3A
| Item No. | Structure |
|---|---|
| AA | 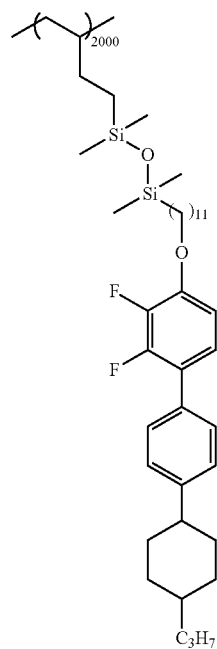 |
| BB | 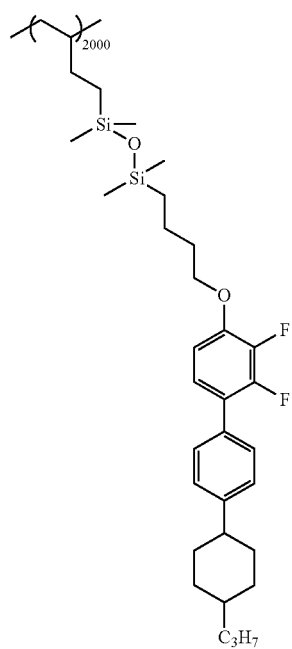 |

TABLE 3A-continued
| Item No. | Structure |
|---|---|
| CC | 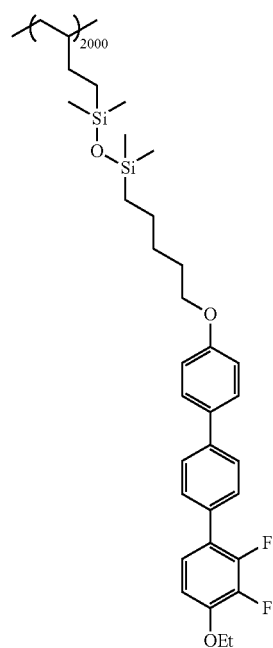 [SMILES: CCOc1ccc(-c2ccc(-c3ccc(OCCCCC[Si](C)(C)O[Si](C)(C)CCC(C)CC)cc3)cc2)c(F)c1F] |
| DD | 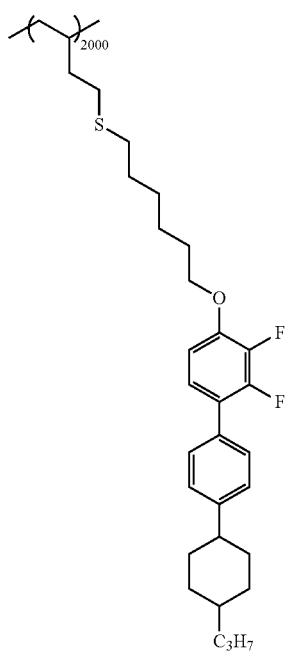 |

TABLE 3A-continued
| Item No. | Structure |
|---|---|
| EE | 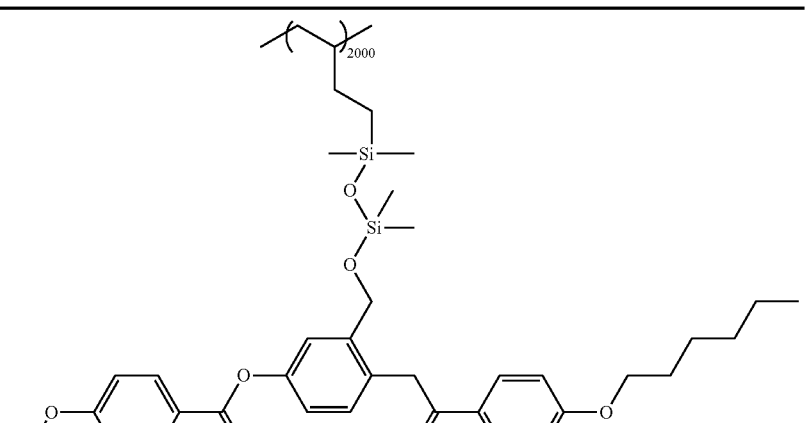 |
| FF | 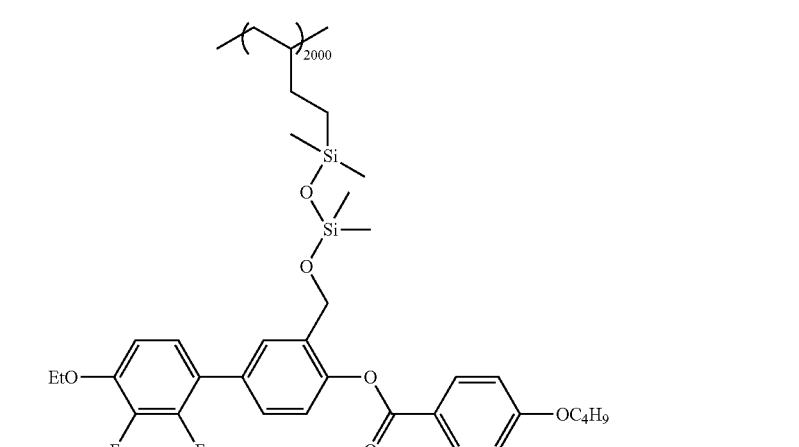 |
| GG | 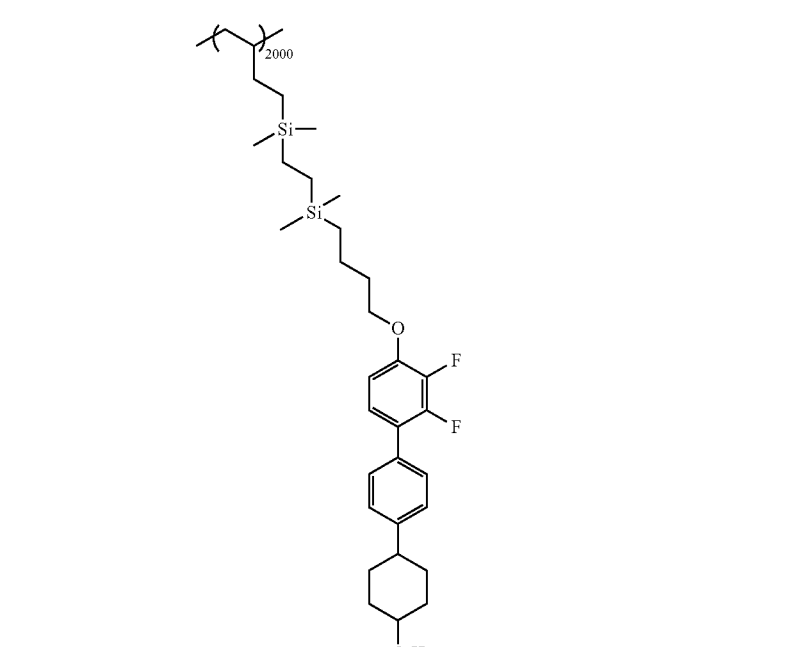 |

TABLE 3A-continued
| Item No. | Structure |
|---|---|
| HH | 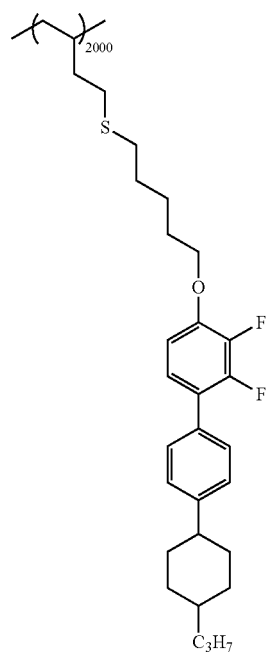 |
| II | 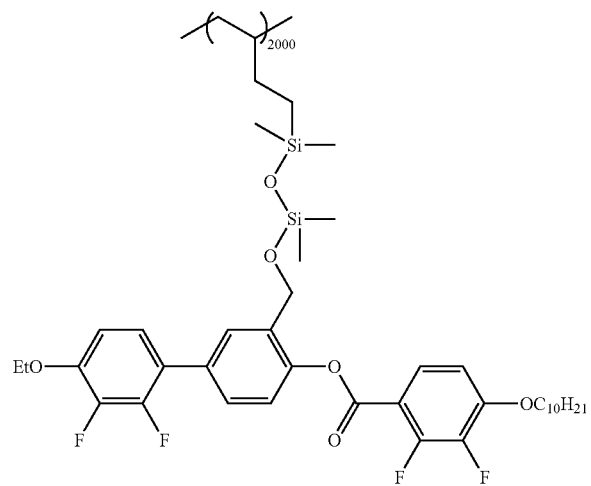 |

TABLE 3A-continued

| Item No. | Structure |
|---|---|
| JJ | (structure with polymer chain n = 2000, Si(CH₃)₂-O-Si(CH₃)₂, (CH₂)ₓ with x = 7, connected to difluorophenyl-cyclohexyl-cyclohexyl-C₃H₇) |

As will be understood by one of ordinary skill in the art, the actual number of repeating units in a polymer or oligomer is difficult to determine exactly. Therefore, when a particular number is presented for the number of repeating units, it is understood that all values ±10% are included, and other ranges as well as other values within the ranges specified herein.

Hosts

As will be apparent to one of ordinary skill in the art, any useful nematic liquid crystal host can be used in the methods of this invention. Some hosts include the following:

TABLE 4

Negative Delta Epsilon Nematic Liquid Crystal Host MX40076

| # | Compound | Concentration (wt %) |
|---|---|---|
| 1 | $C_2H_5$—cyclohexyl—phenyl—difluorophenyl—$OC_2H_5$ | 16 |
| 2 | $C_3H_7$—cyclohexyl—phenyl—difluorophenyl—$OC_2H_5$ | 13 |
| 3 | $C_5H_{11}$—cyclohexyl—phenyl—difluorophenyl—$OC_2H_5$ | 7 |
| 4 | $C_3H_7$—cyclohexyl—difluorophenyl—$OC_4H_9$ | 7 |

TABLE 4-continued

Negative Delta Epsilon Nematic Liquid Crystal Host MX40076

| # | Compound | Concentration (wt %) |
|---|---|---|
| 5 | 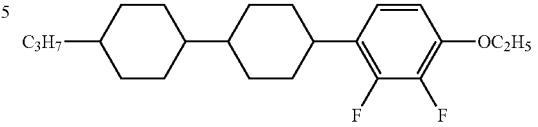 | 13 |
| 6 | 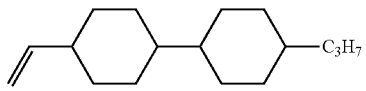 | 44 |

The phase diagram follows:
I 99 N<−20 X
Eperp=6.9
Epara=3.5
Delta E=−3.4

Negative delta E nematic LC mixtures are also commercially available, for example from Merck including those mixtures shown below.

TABLE 5

| ID | Tc clearing point ('C.) | Rot. Viscosity (mPas) | Birefringence Delta n | Delta E | K11 (pN) | K33 (pN) | Vth (V) | Appl. |
|---|---|---|---|---|---|---|---|---|
| MLC6608 | 90 | 186 | 0.0830 | −4.2 | 16.7 | 18.1 | 2.17 | |
| MLC6609 | 91.5 | 162 | 0.0777 | −3.7 | 17.2 | 17.9 | 2.33 | |
| MLC6610 | 79.5 | 148 | 0.0996 | −3.1 | 14.6 | 16.5 | — | |
| MLC6886 | 75 | 146 | 0.0899 | −3.8 | 13.8 | 14.8 | — | |
| MLC3006 | 75 | 104 | 0.0998 | −3.0 | — | — | — | TV |
| MLC3008 | 85 | 230 | 0.01001 | −4.9 | — | — | — | mobile |
| ZLI2806 | 101 | 270 | 0.0437 | −4.8 | — | — | 1.90 | |
| MLC7029 | 95 | 175 | 0.1265 | −3.6 | 16.1 | 15.0 | 2.14 | |

4. Synthesis Methods
Synthesis of Vinyl-Terminated Cyanobiphenyl Side Group for Siloxane Coupling A vinyl-terminated, cyanobiphenyl side group with a four carbon alkyl spacer was synthesized by standard ether chemistry as follows: 4-cyano-4'-hydroxybiphenyl (HCB) and a bromoalkene, 4-bromobut-1-enel, and oven-dried $Cs_2CO_3$ were dissolved in 40 mL dimethyl formamide and stirred at room temperature overnight. When the reaction was complete (as monitored by thin film chromatography), the reaction mixture extracted three times with dichloromethane and the combined organic extracts were washed with water, then dried with $MgSO_4$. The solvent was evaporated and the crude product was recrystallized in hot 95% ethanol, resulting in analytically pure white crystals of 4-cyano-4'-(3-butenoxy)-biphenyl (CBV4).

Siloxane Coupling and 1,2 Polybutadiene Functionalization of Cyanobiphenyl Side Group A siloxane linking group is added to the alkene-terminated cyanobiphenyl mesogens by hydrosilation as follows: A ten-fold excess of 1,1,3,3-tetramethyldisiloxane (TMDS), CBV4 and one drop of platinum catalyst (PC072 platinum divinyl complex in xylene) were dissolved in 20 mL anhydrous toluene, filled with dry argon gas and stirred at 50° C. for 1 day. When the reaction was complete as monitored by thin layer chromatography, the solvent and excess TMDS were evaporated at 80° C. under vacuum and the product (SiCB4) was purified by anhydrous column chromatography using 1:10 anhydrous ethyl acetate to anhydrous hexanes as the mobile phase.

This siloxane-linked mesogen (SiCB4) was then immediately attached to the pendant vinyl groups of 1,2-polybutadiene, also by platinum catalyzed hydrosilation. The following is a representative synthesis of this attachment to 1,2, polybutadiene: Polybutadiene a three-fold excess of freshly purified SiCB4 and one drop of platinum catalyst (PC085, platinum cyclovinyl complex in vinylmethylsiloxanes) were dissolved in 15 mL of anhydrous tetrahydrofuran (THE) under inert atmosphere and then heated at 50° C. for four days. When the reaction was complete, as monitored by $^1$H NMR, the catalyst was quenched by adding excess styrene and stirring overnight at 50° C. and the polymer (polymer 1, and 2) was then purified by evaporating all but the last 5 mL of solvent under vacuum, followed by repeated precipitation from THF solutions with cold methanol containing 10 ppm BHT, Before the final precipitation, a solution of approximately ten percent polymer in THF is passed through a 0.45 µm syringe filter, then concentrated and precipitated again. After this final precipitation the solid polymer is then dried to constant weight under vacuum at room temperature.

Synthesis of Vinyl-Terminated Phenyl Pyrimidine Side Group for Siloxane Coupling A vinyl-terminated phenyl pyrimidine side group was synthesized from 4-(5-decylpyrimidin-2-yl)phenol for siloxane coupling to 1,2 polybutadiene using standard ether chemistry as follows: 4-(5-decylpyrimidin-2-yl)phenol (1.93 grams, 6.15 mmols), a bromoalkene (7-bromohept-1-ene, 1.22 mL, 8 mmol) and oven-dried $Cs_2CO_3$ (2.56 grams, 8 mmol) were stirred at room temperature in 40 mL of dimethyl formamide overnight, resulting in near-quantitative conversion to the ether (Scheme 6), as monitored by thin layer chromatography. The reaction mixture was extracted three times with 50 mL of dichloromethane. The organic extracts were washed three times with water and dried with MgSO$_4$. The crude product was recrystallized in hot 95% ethanol, resulting in analytically pure white crystals of 5-decyl-2-(4-(hept-6-enyloxy)phenyl)pyrimidine, enyloxy)phenyl)pyrimidine, or C7PPC10V, (1.69 g, 66.0% overall yield).

Scheme 6. Williamson ether synthesis of end-on phenyl pyrimidine mesogenic side groups.

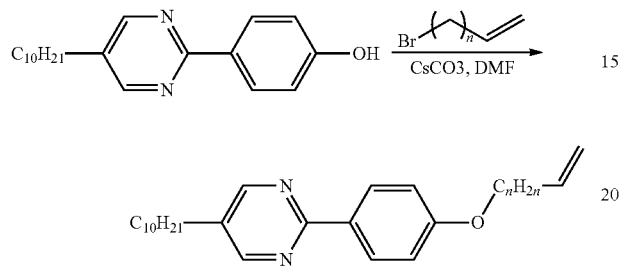

n = 5, 6, 8

Siloxane Coupling and 1,2 Polybutadiene Functionalization of Phenyl Pyrimidine Side Group A siloxane linking group is added to the alkene-terminated phenyl pyrimidine mesogens by hydrosilation (Scheme 7) as follows: A fivefold excess of 1,1,3,3-tetramethyldisiloxane (TMDS) (3 mL, 17 mmol), C7PPC10V (1.69 g, 3.25 mmol) and one drop of platinum catalyst (PC072 platinum divinyl complex in xylene) were dissolved in 20 mL anhydrous toluene, filled with dry argon gas and stirred at 50° C. for 2 days. This reaction was monitored by thin layer chromatography, and, when completed, the solvent and excess TMDS were evaporated at 80° C. under vacuum and the product (SiC7PPC10) was purified by anhydrous column chromatography.

Scheme 7. Siloxane coupling, first to vinyl-terminated mesogen, then to 1,2-polybutadiene. Note that in this Scheme the variable "m" is used to indicate the number of repeating units in the polymer backbone and the variable "n" is used to indicate the number of repeating methylene units in a chain of the spacer. In an example of liquid crystal polymers created using this method, m = 2000.

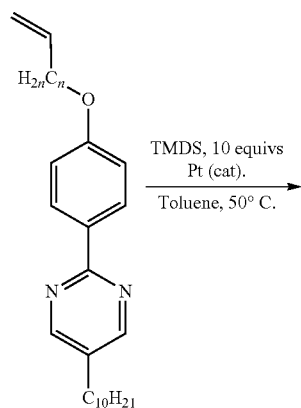

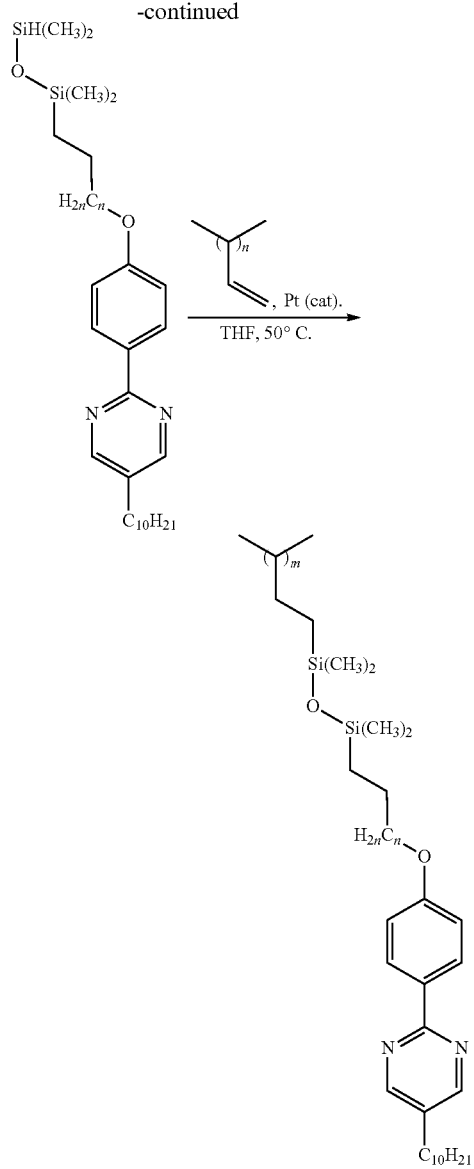

n = 5, Polymer: (5)
m = 2000

The siloxane-linked mesogen was then attached to the pendant vinyl groups of 1,2-polybutadiene, also by platinum catalyzed hydrosilation. 107 kg/mol Polybutadiene (0.035 g, 0.6 mmols) was dissolved in 10 mL of anhydrous tetrahydrofuran (THF) under inert atmosphere. A one-and-a-half-fold excess of freshly purified SiC7PPC10 and one drop of platinum catalyst (PC085, platinum cyclovinyl complex in vinylmethylsiloxanes) and the mixture was heated at 50° C. for four to six days. Reaction progress was monitored by $^1$H NMR. When the reaction was complete it was quenched with excess styrene and stirred at 50° C. overnight and the polymer (polymer 5) was then purified by evaporating all but the last 5 mL of solvent under vacuum, followed by repeated precipitation from THF solutions with cold methanol containing 10 ppm BHT, Before the final precipitation, a solution of approximately ten percent polymer in THF is passed through a 0.45 μm syringe filter, then concentrated and precipitated again. After this final precipitation the solid polymer is then dried to constant weight under vacuum at room temperature.

Synthesis of Benzoyl-Protected Thiols, for Thiol-Ene Coupling

Benzoyl-protected thiols were synthesized from 4-(5-decylpyrimidin-2-yl)phenol for thiol-ene coupling to 1,2 polybutadiene. 4-(5-decylpyrimidin-2-yl)phenol (1.89 grams, 6.05 mmols), 1-bromo-6-chloro-hexane (1.57 g, 8 mmol) and $CsCO_3$ (2.56 grams, 8 mmols) were stirred at room temperature in 40 mL of dimethyl formamide overnight, resulting in near-quantitative conversion of the ether (Scheme 8). The reaction mixture was extracted three times with 50 mL of dichlormethane. The organic extracts were washed three times with water and dried with $Mg_2SO_4$. The crude product was recrystallized in hot 95% ethanol, resulting in analytically pure white crystals (1.92 g; 76.56 overall yield) of 2(4-(5-cholohexyloxy)phenyl)-5-decylpyridine.

2(4-(5-cholohexyloxy)phenyl)-5-decylpyridine was then reacted with thiobenzoic acid (0.6 g, 4 mmol) and sodium bicarbonate (0.35 g, 4 mmol) and stirred 40° C. overnight (Scheme 8). The reaction mixture was extracted with ethyl acetate three times, washed three times with water, and dried with $Mg_2SO_4$. The crude pink solid was then recrystallized in hot 95% ethanol to give analytically pure pink needle-like crystals (2.2045, 85.1% yield).

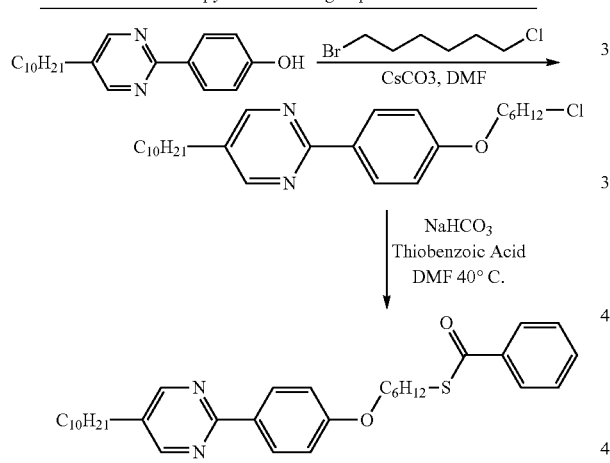

Scheme 8. The synthesis of the protected thiol mesogenic phenyl pyrimidine side group.

Thioester Cleavage and 1,2,-Polybutadiene Functionalization.

The thioesters in the benzoyl-protected thiols were cleaved and the resulting thiol terminated mesogens were coupled to 1,2 polybutadiene by radical initiated thiol-ene coupling. The thioester (1 g, 1.9 mmol) was first dissolved in 25-75 mL DMF with hydrazine monochloride (0.13 g, 1.9 mmol) and sodium acetate (0.13 g 1.9 mmol). The reaction mixture was purged with argon for 10 minutes and stirred for 6 hours at room temperature. The thiol product was extracted into 30 mL of chloroform, washed 3 times with water and transferred into a flask containing 1,2 PB (0.03 g, 0.6 mmol) and AIBN (50 mg), mmol) dissolved in 10 mL of chloroform. This mixture was then degassed in 2 freeze-pump-thaw cycles and then allowed to react at 55° C. for overnight. The final polymer product (4) was then purified by evaporating all but the last 5 mL of solvent under vacuum, followed by repeated precipitation from THF solutions with cold methanol containing 10 ppm BHT, then drying to constant weight under vacuum at room temperature.

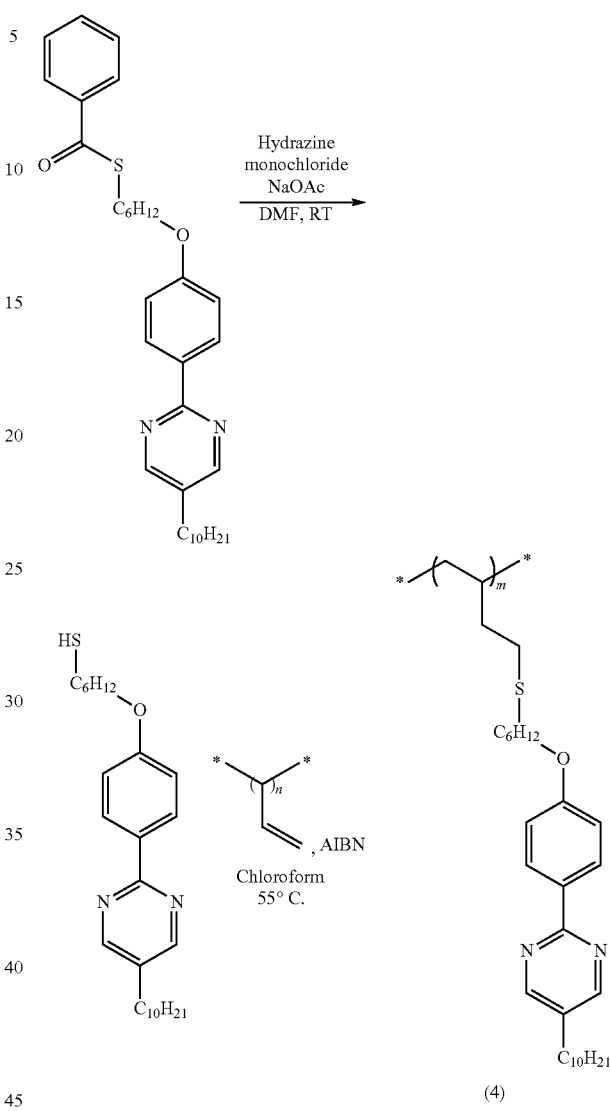

Scheme 9. Thioester cleavage into thiol, followed by direct, radical catalyzed thiol-ene coupling with 1,2-polybutadiene.

Siloxane Coupling and 1,2 Polybutadiene Functionalization of Fluorinated Bicyclohexyl Phenyl Side Groups The compound having structure 6 in Scheme 2 having a targeted side group designed both to increase the solubility of the polymer in the VA nematic host and to have a dipole direction and magnitude commensurate with that of the solvent was synthesized. The side group bicyclohexyl-2,3-difluorophenyl alkoxy was chosen since this group performs well in high resistivity, negative delta E NLCs used in high-end LCD HDTVs. Small molecule nematic LCs in this class typically have $\Delta\epsilon$ values of about −4.4.

This synthesis of the 4-(2,3-difluoro-4-(oct-7-en-1-yloxy)phenyl)-4-fluoro-4'-propyl-1,1'-bi(cyclohexane) side group was carried out by first attaching an alkene end group to 2,3-difluorophenol. (Scheme 10). This was then lithiated at −78 C with n-Butyl lithium to afford the aryl lithium, followed by Dropwise addition of the bicyclohexylketone. Due to competitive deprotonation of the allylic protons in the alkene side chain, it was critical to optimize conditions so that the formation of the desired aryl lithium salt was maximized, while competitive deprotonation of the allylic hydrogens on the alkene tail was avoided, which would lead to lower yields of the desired product. Attempted fluorination of the tertiary alcohol formed from the aryl lithium addition to the cyclohexyl ketone resulted in dehydration to the cyclohexene instead of the expected tertiary fluoride However, the 2,3-difluorophenylcylohexenyl LC that was produced still results in a useful LC alkene pendant that was then used in the next polymerization step.

catalyzed hydrosilation (Scheme 10). 107 kg/mol Polybutadiene (0.0086 g) was dissolved in 10 mL of anhydrous tetrahydrofuran (THF) under inert atmosphere with a three-fold excess of freshly purified siloxane terminated mesogen and one drop of platinum catalyst (PC085, platinum cyclovinyl complex in vinylmethylsiloxanes) and the heated at 50° C. for five days. Reaction progress was monitored by $^1$H NMR and when completed, the reaction was quenched with excess styrene and heated at 50° C. overnight.

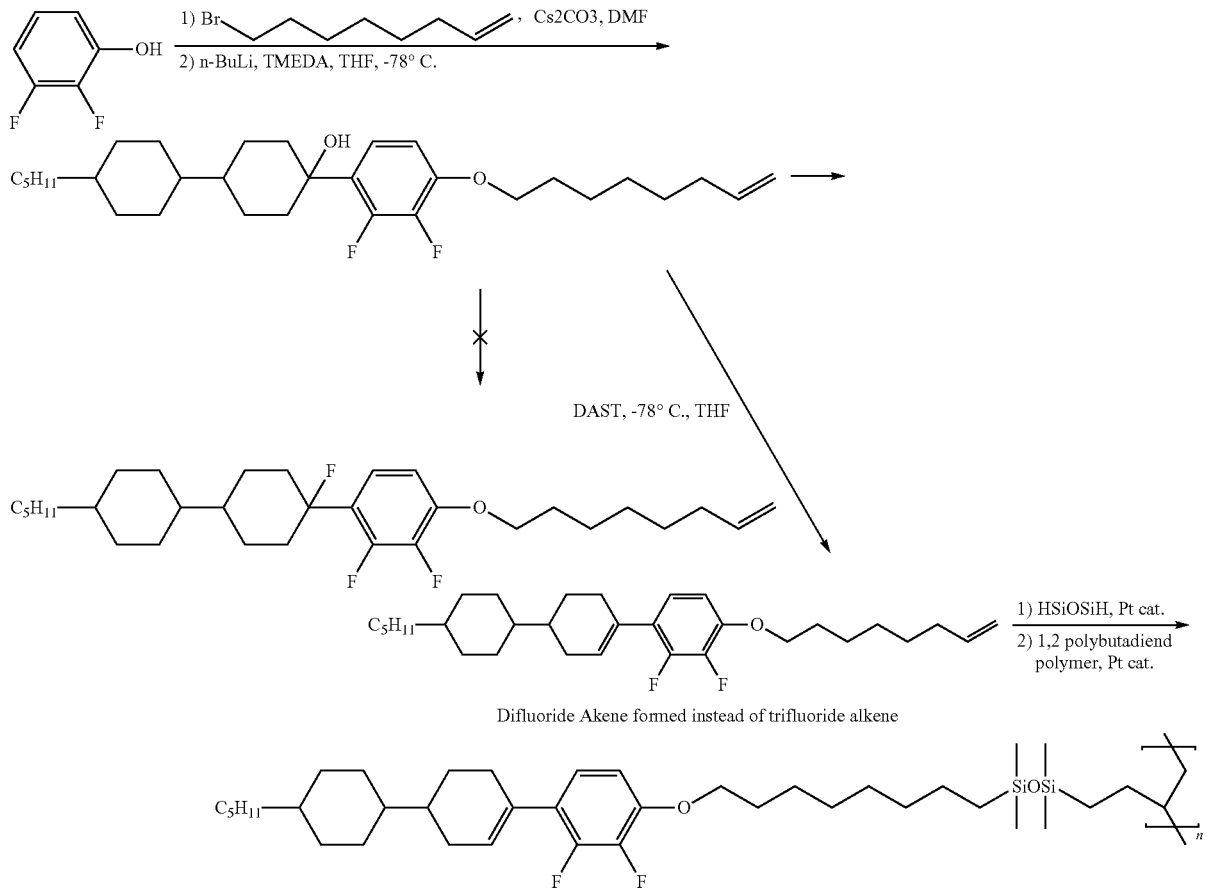

Difluoride Akene formed instead of trifluoride alkene

The LCP using this negative delta E group was prepared by platinum-catalyzed hydrosilation, first of the vinyl-terminated side group, with tetramethyldisiloxane and then another hydrosilation of the product of the first reaction with the pendant vinyl groups of the polybutadiene backbone (Scheme 10).

The side group (0.2441 g, 0.582 mmol) was dissolved in 20 mL anhydrous toluene along with a tenfold excess of 1,1,3,3-tetramethyldisiloxane (TMDS) (0.8 mL, 4.5 mmol, 8× excess) and one drop of platinum catalyst (PC072 platinum divinyl complex in xylene). This mixture was stirred at 50° C. for 4 days, and when completed (as monitored by thin layer chromatography), the solvent and excess TMDS are evaporated at 80° C. under vacuum and the product was purified by anhydrous column chromatography using anhydrous 10% ethyl acetate in hexanes as the mobile phase (0.261 g, 81% yield).

The siloxane-linked mesogen was then attached to the pendant vinyl groups of 1,2-polybutadiene, also by platinum The polymer (6) was purified by repeated precipitation in methanol (containing 10 ppm BHT), filtration through at 0.45 μm PTFE syringe filter, followed by solvent fractionations using a tetrahydrofuran-methanol mixture as the good solvent and methanol (containing 10 ppm BHT) as the poor solvent. The methanol was added at room temperature to a solution (approximately 0.5% polymer) of the polymer in the good solvent until the cloud point was reached. 5-15 mL of methanol was added and the cloudy solution which was then heated to 70° C. until it became clear, whereupon it was poured into an oven-hot, insulated separatory funnel and allowed to separate slowly, overnight, protected from air currents. The next day, viscous syrup (composed largely of high molecular weight polymer) sat at the bottom of the separatory funnel, and was easily drained off, precipitated with methanol, and dried in vacuum. The low molecular weight polymer remained in the dilute solution (above the high molecular weight fraction in the separatory funnel after cooling) and was recovered by evaporating the solvent, precipitating with methanol then drying in vacuum overnight. In the case of this polymer, two fractionations, in series, were needed to obtain suitable, un-crosslinked fractions.

One goal was to give the mesogen a strongly negative dielectric anisotropy by increasing the dipole transverse to the LC molecular axis. This allows the use of lower voltage to control surface pre-tilt in the LC cell. The addition of the third fluorine was expected to increase $|\Delta\epsilon|$ from 4.4 to approximately 5.5. In fact, measurement of the new monomer in a nematic host afforded an extrapolated value of $\Delta\epsilon=-5.2$, from a 20% concentration in a neutral nematic host.

Tetrafluoro and Hexafluoro Substituted LCs

Scheme 11 shows Synthesis of tetrafluoro and hexafluoro substituted LCs for attachment to polymer backbone. R is shown as a particular vinyl terminated alkyl chain but the chain length can vary.

Dimethylsilylethylenesilane Tail

In related experiments with polymers dissolved in non-VAN LCs hosts a small amount of phase separation can occur over the long term for some polymers. This may be due to the siloxane linker—the least soluble part of the polymer. Therefore, a synthetic route to change the linker not containing any Si—O bonds such as the methylsilane to the more soluble silane group, as well as the more soluble, and more stable, ethyl disilane group can be used. The synthesis of dimethylsilylethylenesilane tail, shown using a representative vinyl terminated side group: the side group used in Polymer (1) is provided in Scheme 12.

Scheme 11

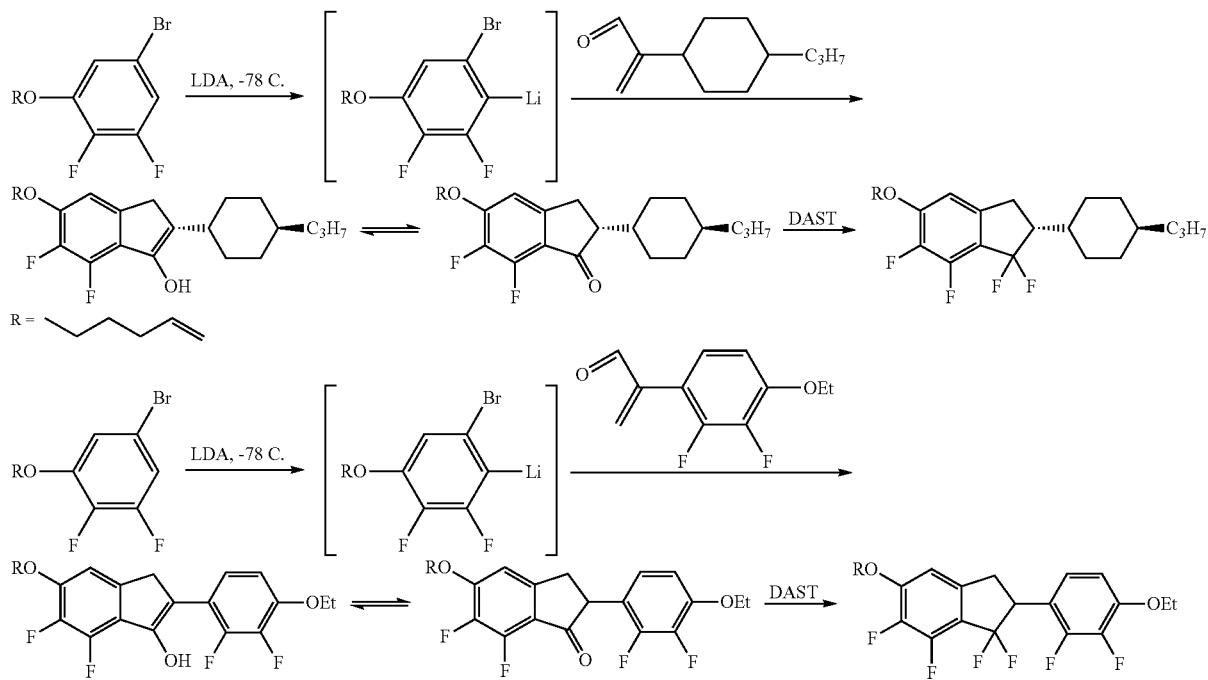

Scheme 12

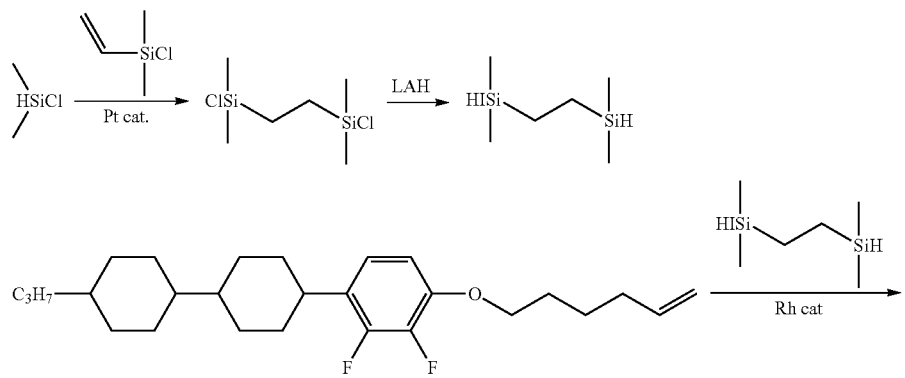

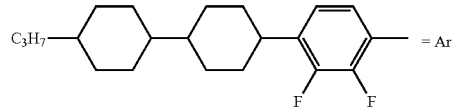
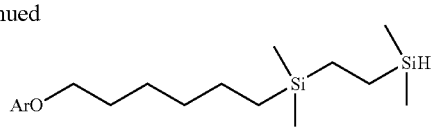

5. Cell Preparation and Characterization

Vertically aligned liquid crystal host MLC6608 and host LC MLC6886 ($T_{ni}$=75° C.; $\Delta n$=0.0899; $\Delta\varepsilon$=−3.8, $\gamma$=146 mPa s) were used for the VAN host materials. 4-cyano-4'-hydroxybiphenyl was purchased from TCI America and used as received. 4-(5-decylpyrimidin-2-yl)phenol was purchased. Other materials were synthesized as described above. Polybutadiene (98% 1,2 content) of size $1.07\times10^3$ g/mol and narrow molecular weight distribution (of polydispersity index 1.07) were synthesized. Platinum catalysts were obtained from United Chemical Technologies in Bristol, Pa. and used as received. Thioether linked polymer 3 was synthesized and used as received. All other reagents were obtained at 99% purity from Sigma Aldrich and used as received, unless stated otherwise.

$^1$H NMR spectra were obtained using an Inova 500 MHz NMR spectrometer, recorded in $CDCl_3$ and referenced to tetramethylsilane. Polymer molecular weight measurements were obtained by gel permeation chromatography in tetrahydrofuran (THF) at 25° C. eluting at 0.9 mL/min through four PLgel 10 μm analytical columns (Polymer Labs, $10^6$ to $10^3$ Å in pore size) connected to a Waters 410 differential refractometer detector ($\lambda$=930 nm). The molecular weight measurements were analyzed based on calibrations using polystyrene standards.

Solutions of desired concentration (for example 0.01, 0.1, 0.25, 0.5 and 1.0 weight percent) of LCP homopolymers in negative delta E nematic liquid crystal solvents were prepared by adding known masses of the polymers to known masses of the liquid crystal (either MLC6608, MLC6886). The polymers were dissolved into the host materials by repeated iterated heating to the isotropic phase followed by centrifugation and vortex mixing.

The liquid crystal polymers were tested in test cells with an area of 2 cm×2.5 cm and an approximate 4 μm thickness, with either rubbed or unrubbed alignment layers. The parameters for the particular tests were applied to the cell as standard in the art. The cells were manufactured by EHC, Japan, and possessed a homeotropic alignment layer to provide vertical aligned LCs upon filling and cooling of the sample.

The optical measurements were conducted using an Autronic-MELCHERS "Conocontrol" Conoscope. It automatically measures Luminance, Chromaticity, and Response time. Conoscopic instruments are based on the conoscopic method. With the conoscopic method the sample is located in the front focal plane of the optical system. A cone of elementary parallel light beams is transmitted, emitted or reflected by the sample. All light beams that originate from the measuring spot are collected simultaneously over a large solid angle by the optical system. The directional intensity distribution of the cone of elementary parallel light beams is transformed into a two-dimensional distribution of light intensity and color. This two-dimensional distribution of light intensity and color is called conoscopic figure. The conoscopic figure, is generated in the rear focal plane of the optical system. The intensity of each area element corresponds to the intensity of one elementary parallel beam with a specific direction of light propagation.

The light propagating parallel to the optical axis of the conoscopic receiver forms the center of the circular pattern, i.e. the conoscopic figure. Beams with constant angle of inclination ($\theta$) appear as concentric circles around the center. The radius of these circles is proportional to the angle of inclination ($\theta$). Each location in the conoscopic figure corresponds to exactly one direction of light propagation ($\theta$, $\phi$). A second optical system optionally projects the conoscopic figure on a two-dimensional CCD-detector array to evaluate the spatial intensity distribution. The spatial intensity distribution corresponds to the directional intensity distribution of the light emerging from the measuring spot on the sample.

6. Results

A. Solubility

The cyanobiphenyl liquid crystal polymer that tested were not soluble in the negative delta E hosts that used (commercially available MLC6608 and MLC6886) as model LCs for this experiment. On the other hand, the phenylpyrimidine LC polymers (4 and 5, Scheme 2) were soluble at 0.5% and lower concentration, thus easily soluble at the concentration of interest. It was also found that the negative delta E LC polymer, polymer 6, was easily soluble in the negative delta E hosts, likely due to the molecular compatibility of the side group and the VA LC host, possessing a bicyclohexy-2,3-difluorophenyl core. In addition, polymer LCV 20162 was also soluble at tested conditions, likely due to its cylohexyl-2,3-biphenyl core. However, LCV20161, which possessed a 2,3-difluoroterphenyl core, was not soluble at 0.25% concentration, probably due to the ridged, all aromatic 3-ring core.

B. Switching Speed

The effect of the LC polymer in the response of the VA hosts was examined using electro-optic switching conditions. The LC response time consists of rise and fall time. The rise time is measured when voltage is applied and the fall time is measured when voltage is released. Both response times need to be evaluated because they represent two different kinetic processes. One analogy is the stretch and release an elastic band. Different LC modes and various surface boundary conditions, of course, will have different response times.

Switching Speed Measured in Cell with Zero Pretilt

The optical rise times of the virgin VA nematic LC (no polymer dopant) relative to its counterparts doped with 0.25% of 5 and 6 (Scheme 2) show that the rise time is improved with the addition of both LC polymers. It should be noted that for this test, a simple 1 KHz 5V AC drive signal was used—in commercial VA displays, many other techniques (e.g., overdrive schemes coupled with lookup tables), are used to achieve more rapid rise time, so the reported rise times are much longer than would be observed in practice (i.e. reported in seconds rather than milliseconds). Polymer 5 decreases the rise time by more than four and half fold, while polymer 6 decreases the rise time by more than 8-fold. The fall times in an unrubbed cell appear to be less affected—decreasing slightly with the addition of polymer 5, and increasing slightly with the addition of polymer 6.

Polymer-doped VAN cells (0.25% by weight polymer) were cooled from the isotropic phase into the nematic phase under applied AC voltages of 12V, starting at 80° C. and cooling to 25° C. at 5° C./min. Their optical rise and fall times were measured and compared to that of the Pure VA in unrubbed cells. Preliminary experiments using unrubbed cells demonstrated that the polymer dopant did not interfere will filling cells and the polymer doped LCs retained high optical quality.

Switching Speed Measured in Cell with Small Pretilt (Rubbed Cell)

In a rubbed cell, under conditions more similar to industrial conditions, the optical rise times of the VA nematic LC doped with 0.25% of 6 (Scheme 2) is improved by nearly 2 fold, from 232 ms to 130 ms, by addition of the polymer dopant. In addition, the fall time is also improved, by nearly 2-fold, from 8.0-ms to 4.5 ms. Polymer 5 gave qualitatively similar improvements, but not as large as those observed for 6; therefore, pendant mesogens with negative dielectric anisotropy (like the VA nematic host) appear more promising for VAN dopant technology.

The dramatic decrease in rise time suggests that the LC polymers do, indeed, increase the pretilt of the LCs, while the decrease in the fall time suggests that the LC polymer is also providing an anchoring condition that induces the molecules to relax back faster.

C. Viewing Angle and Contrast

The effect of the LC polymer on the optical uniformity of the VAN cell was characterized using conoscopic measurements as a function of the applied AC voltage on the cell. Polymers 5 and 6 (Scheme 2) were dissolved at 0.25 wt % in the commercial VA nematic MLC6886 and loaded into 4 μm thick test cells bearing unrubbed alignment layers. Cells containing doped-VAN were subjected to controlled cooling from the isotropic phase (held for 2 minutes) to the nematic phase under application of an AC voltage at 1 kHz while the cell was cooled from 80° C. to 25° C. at 5° C./min. The effect of the magnitude of the imposed AC voltage during cooling showed that the optical quality improved when an AC voltage as low as 2V was applied (relative to a control processed without an applied field) and that the benefit increased as the "annealing voltage" was increased to 8V, with little further improvement when 12V was used. Results are shown for a doped-VA cell (containing 0.25 wt % Of 5) prepared by cooling under an 8V AC applied field.

Figure 3:
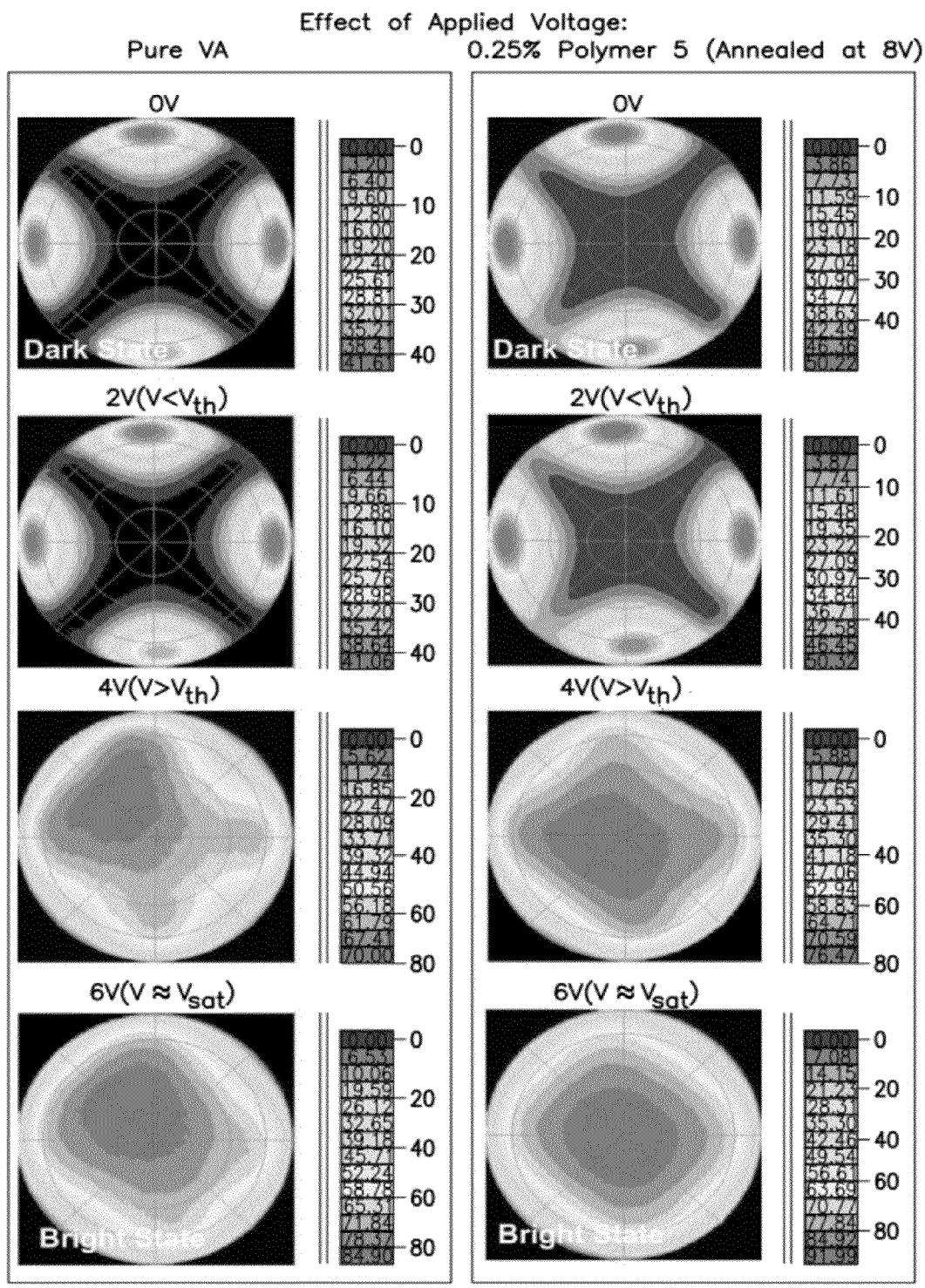
FIG. 3 shows conoscopic measurements of the pure VA liquid crystal (MLC6886) in the left-hand column, and 0.25 wt % Polymer 5 (LCV20137) in MLC6886 (annealed at 8V, then cooled at 5° C./min at 8V) in the right-hand column, measured in an unrubbed with 0V to 6V applied AC voltage at 1 kHz. The numbers in the right-hand columns represent brightness, units are $Cd/m^2$. When polymer is added, the threshold voltage remains between 2V and 4V, and at 4V the switching is more uniform and symmetrical than that of the pure VA liquid crystal.

Unlike many types of in situ polymer stabilized VAN cells, the polymer dopants described here did not decrease the contrast or optical uniformity of the cells (FIG. 3). Relative to a control cell prepared with pure VA (FIG. 3, left), the doped-VA cell (FIG. 3, right) shows equally good dark states (top).

Figure 16:
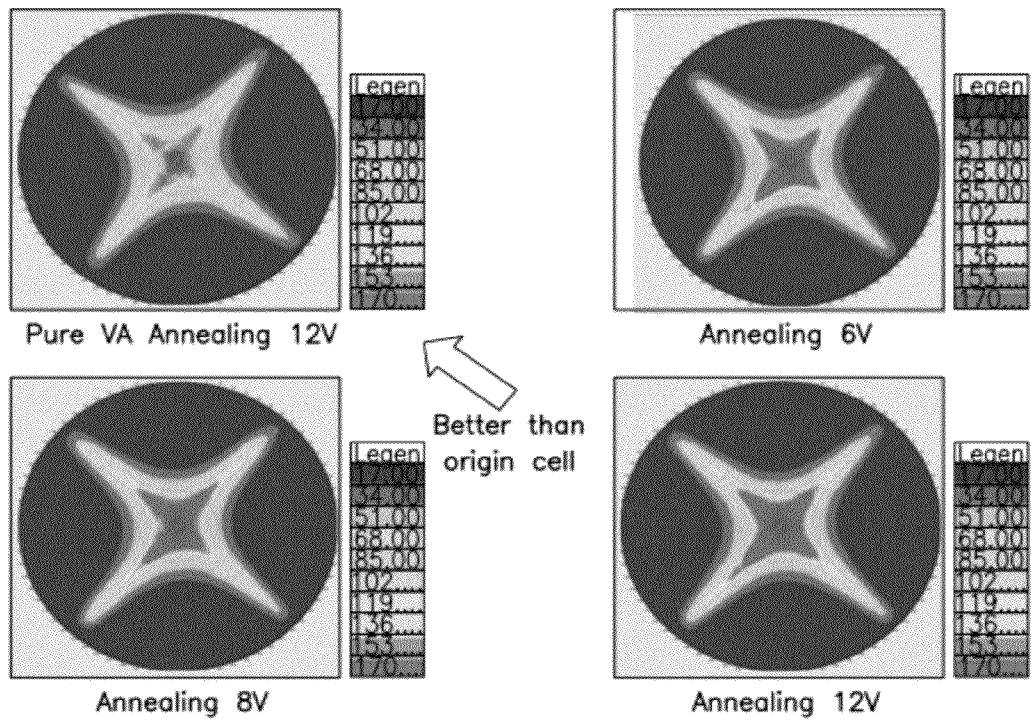
FIG. 16 shows Contrast ratio of LCV20141—0.25 wt % (without rubbing); Contrast ratio of LCV20141—0.25 wt % (with rubbing); Contrast ratio of LCV20141—0.1 wt % (without rubbing); Contrast ratio of LCV20141—0.1 wt % (with rubbing).
Figure 16:
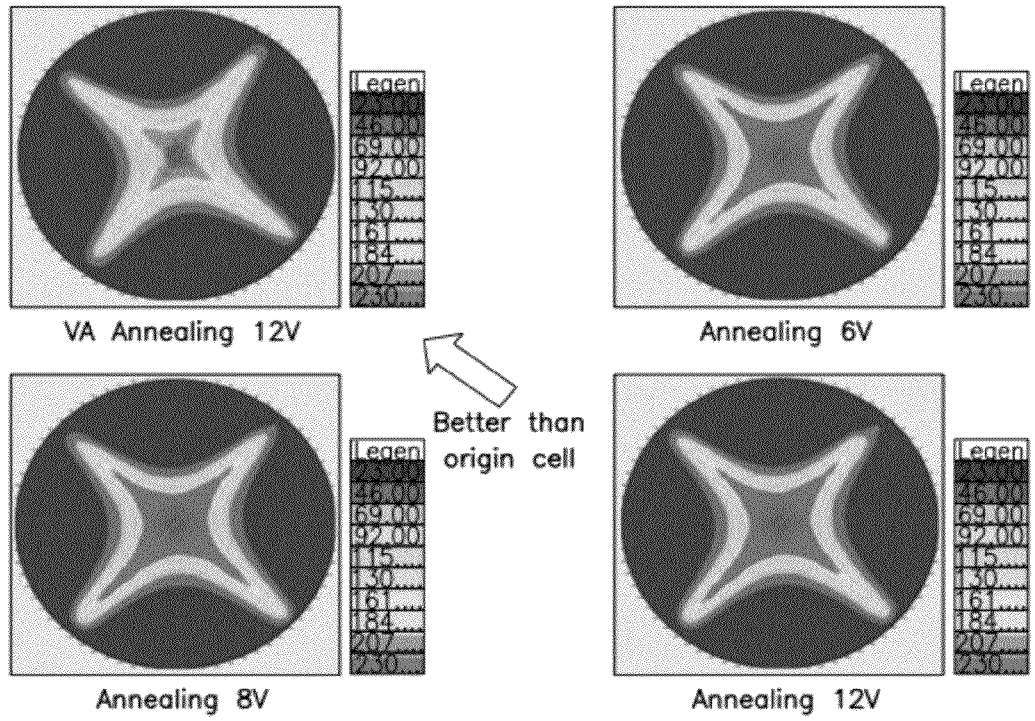
Figure 16:
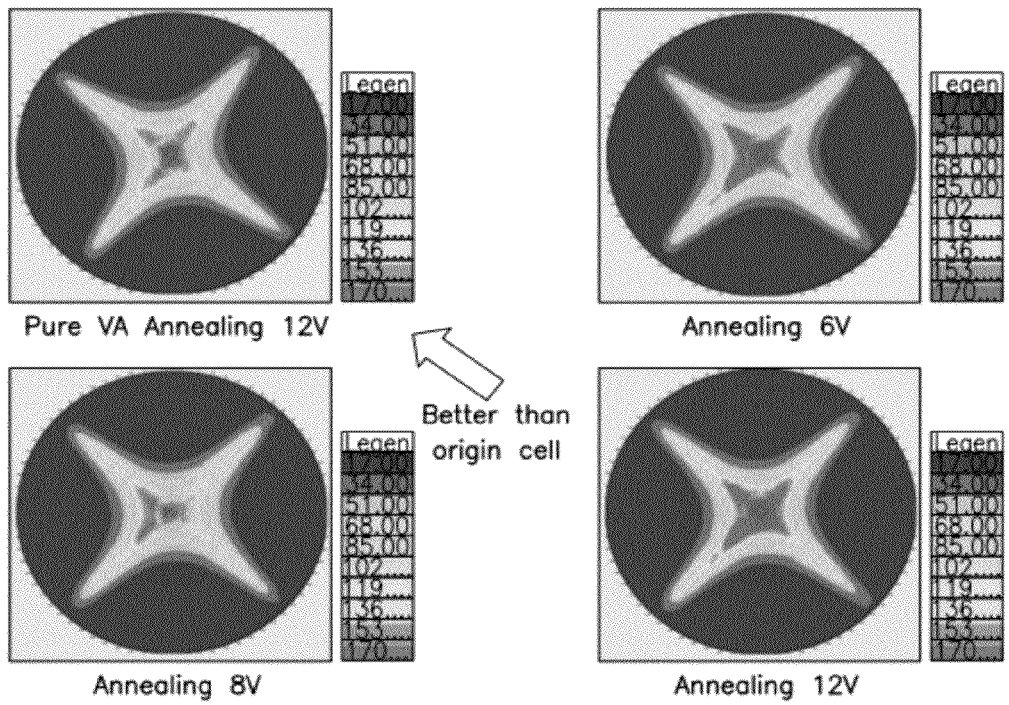
Figure 16:
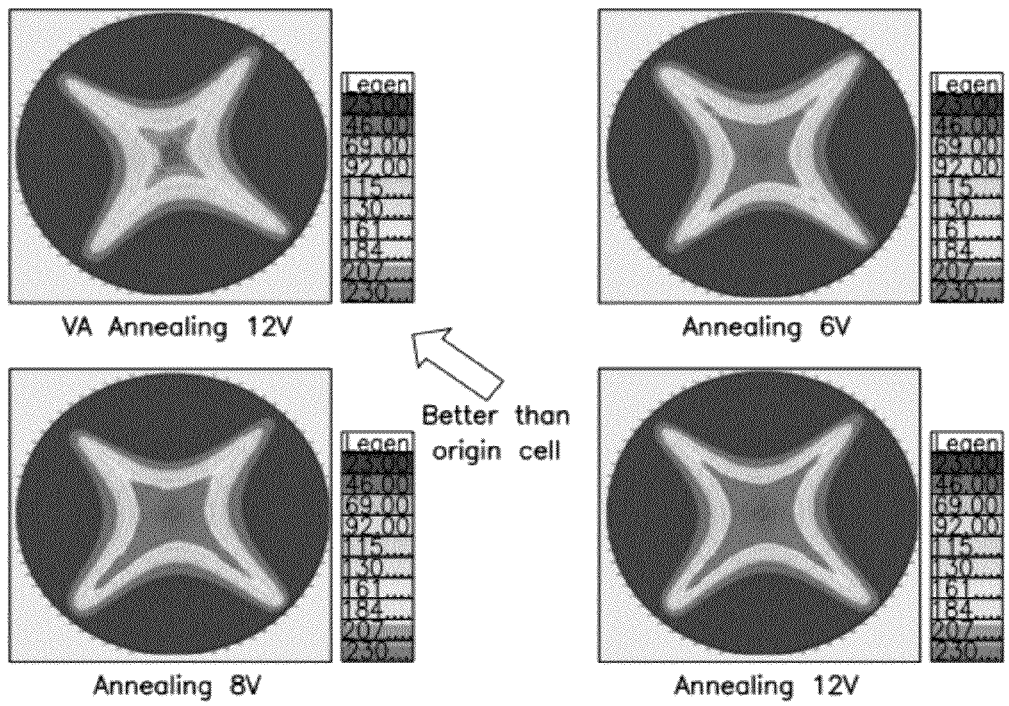

The bright state (FIG. 3, bottom) shows significantly better characteristics in the doped-VA cell. The brightness of the doped-VA cell is appreciably greater (92 vs. 85 Cd/m$^2$) than the pure VA cell. More strikingly, the dependence on viewing angle is much more symmetric for the doped-VA cell: out to viewing angles of 25° there is negligible reduction of intensity in any azimuthal direction (in contrast to the pure VA cell, which shows significant roll-off at as little as 5° off axis viewing, depending on the azimuthal orientation of the cell). The degree of improvement is quite remarkable for such a small amount of dopant. FIG. 16 shows additional data in a different cell.

Furthermore, the dopant improves viewing angle, brightness and contrast without significantly altering the threshold voltage or saturation voltage. The conoscopic figures of the bright states of both the pure VA and the doped-VA cells change very little upon further increase of the imposed voltage to 8V and 10V. Therefore 6V is very close to the saturation voltage in both cases. Similarly, note that the threshold voltage is greater than 2V (FIG. 3, second row is very similar to the dark state above it) and less than 4V (FIG. 3, third row is similar to the bright state below it) for both the pure VA and the doped-VA.

D. Elastic and Viscous Constants

Three concentrations of polymer dopant in negative delta E nematic hosts were evaluated for their effect on dielectric anisotropy and their elastic constants. The concentrations tested were: 0% (no dopant), 0.25%, and 0.5% polymer in the VA nematic host MLC6608 (Table 6). Quite remarkably, the polymer has no negative effect on the threshold voltage, and does not significantly change the dielectric anisotropy ($\Delta \in$) or the elastic constants. In fact, the viscosity is lowered slightly (by ~6.5%) at 0.5% weight percent polymer, indicating that there can be expected an improvement in LC response from this effect. Considering that addition of polymer often leads to a significant increase in viscosity and slowing of response, this result is quite important.

TABLE 6

Electric Spectroscopy Results for two concentrations of Polymer 5 in Pure VA host (MLC6608). The addition of polymer does not appear to detrimentally change any of these important properties.

| Properties | Pure VA | 0.25% Polymer 5 | 0.50% Polymer 5 |
|---|---|---|---|
| $V_{th}$ (V) | 2.40 | 2.40 | 2.40 |
| Δε | −3.47 | −3.51 | −3.53 |
| $K_{11}$ (pN) | 18.1 | 18.1 | 18.2 |
| $K_{33}$ (pN) | 29.3 | 28.8 | 28.6 |
| Viscosity (mPas) | 223 | 226 | 209 |

Table 7 shows property data for dopants LCV20141, LCV20117, and LCV20137 in MLC6886. The data indicates that for the negative delta E dopant 20141, 0.5 wt % has a lowering effect on viscosity and other parameters.

TABLE 7

| LC # | dopant | % conc. | Vth | Eperp | Epara | Delta E | K11 | K33 | K33/K11 | Y |
|---|---|---|---|---|---|---|---|---|---|---|
| MLC6886 | — | 0 | 2.4 | 3.6 | 6.51 | 2.91 | 15.1 | 21.4 | 1.42 | 143 |
| MX40033 | 20141 | 0.5 | 2.2 | 3.26 | 5.54 | 2.29 | 9.9 | 24.8 | 2.49 | 106 |
| MX40034 | 20141 | 0.25 | 2.4 | 3.58 | 6.33 | 2.75 | 14.4 | 21.3 | 1.48 | 129 |
| MX40035 | 20117 | 0.5 | 2.4 | 3.59 | 6.23 | 2.65 | 13.8 | 22.8 | 1.65 | 120 |
| MX40036 | 20117 | 0.25 | 2.5 | 3.58 | 6.28 | 2.70 | 15.0 | 20.4 | 1.36 | 125 |
| MX40039 | 20137 | 0.5 | 2.4 | 3.31 | 6.10 | 2.80 | 14.5 | 29.8 | 2.06 | 146 |
| MX40040 | 20137 | 0.25 | 2.6 | 3.54 | 6.64 | 3.11 | 18.7 | 24.6 | 1.32 | 152 |

The other dopants (LCV20117, and LCV20137) are positive delta E phenylpyrimidine dopants.

E. Voltage-Transmission Curves

Figure 4:
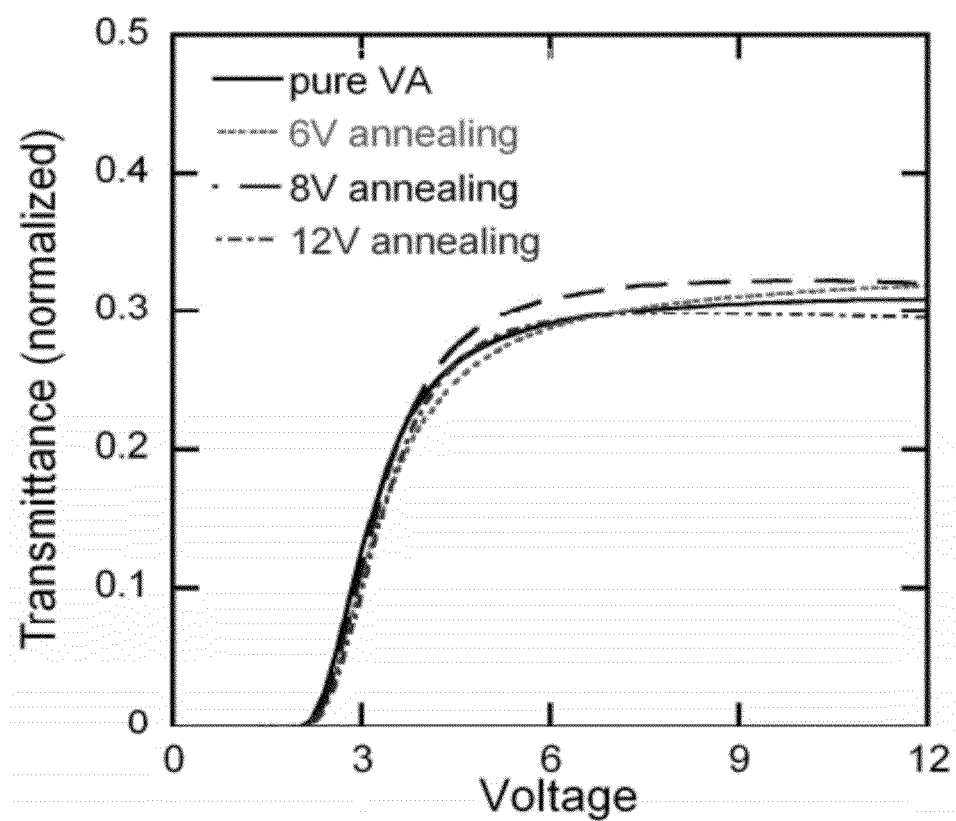
FIG. 4 shows the voltage-transmittance data for 0.25 wt % Polymer 5 (LCV21037) in an unrubbed cell.

FIG. 4 shows the voltage-transmission curve for 0.25 wt % LCV20137 (Polymer 5 in Scheme 2) in an unrubbed cell in commercial LC MLC6886. The voltage was held at 6V, 8V or 12V at 80° C. for 2 minutes, then cooled at 5° C./min, and the transmittance vs. voltage was recorded as the samples cooled. The $V_{th}$ for pure VA (no dopant), 6V, 8V and 12V annealing was all 2 V, indicating the addition of polymer does not increase the threshold voltage of the LC.

Figure 5:
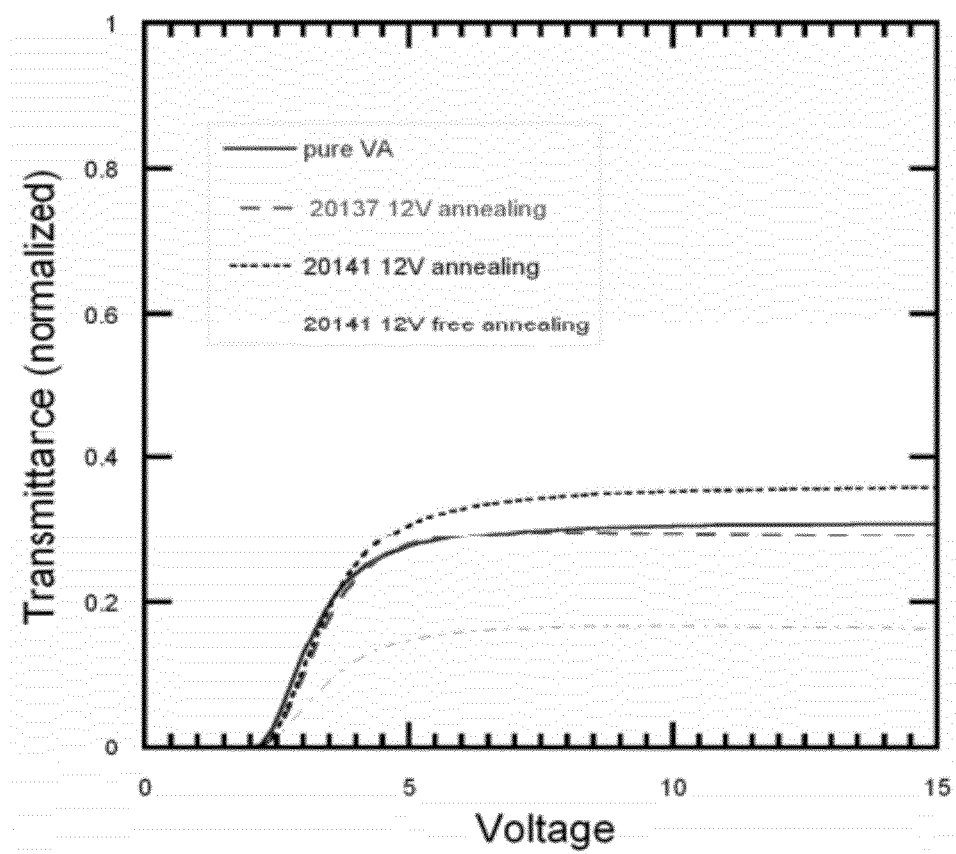
FIG. 5 shows the voltage-transmittance data for 0.25 wt % Polymer 5 (LCV21037) and 0.25 wt % Polymer 6 (LCV20141) in unrubbed cells.

FIG. 5 shows the voltage-transmission curve for 0.25 wt % of LCV 20137 and 0.25 wt % LCV20141 (Polymer 6 in Scheme 2) tested in unrubbed cells using the same procedure as above. The addition of LC polymer did not increase the threshold voltage of the LC. Addition of LCV20141 increases the transmittance slightly beyond that of the pure LC, only after slow annealing 5° C./min.

Figure 6:
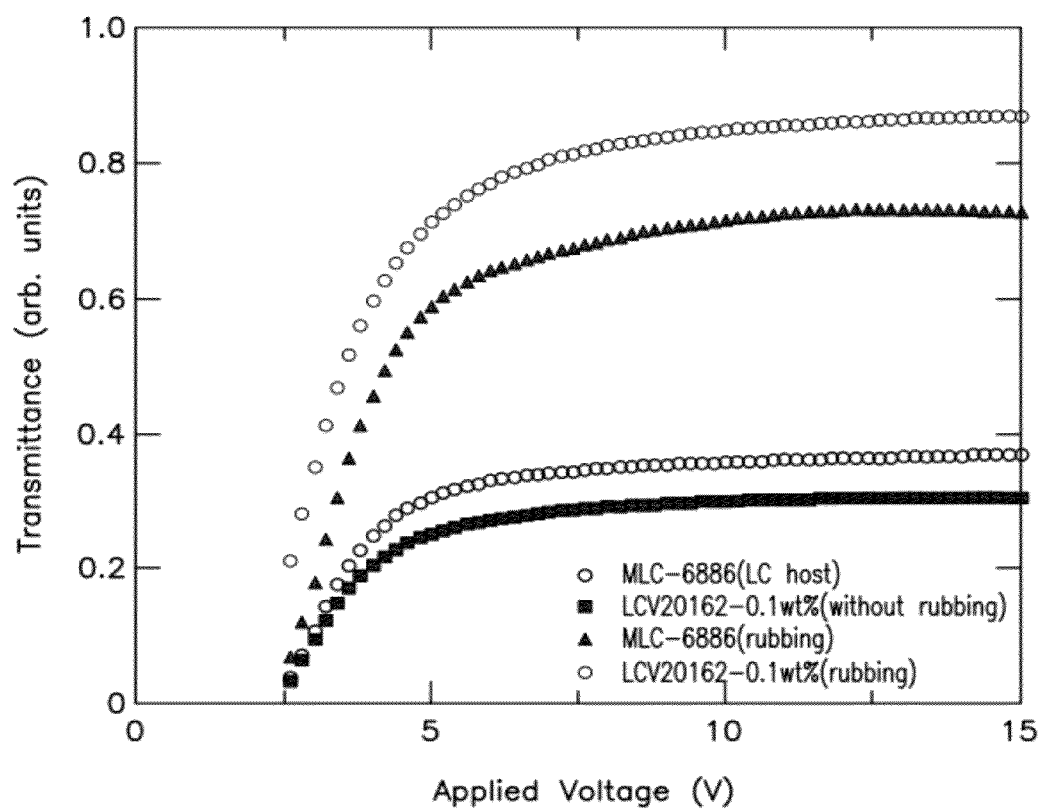
FIG. 6 shows the voltage-transmittance data for 0.1 wt % Polymer 7 (LCV20162) in rubbed and unrubbed cells.

FIG. 6 shows the voltage-transmission curve for 0.1 wt % LCV20162 (Polymer 7 in Table 2) in rubbed and unrubbed cells. The voltage was held at 12V AC 1000 Hz at 80° C. for 2 minutes, then cooled at 10° C./min, and the transmittance v. voltage was recorded as the samples cooled. Addition of the LC polymer does not increase the threshold voltage of the LC, and in fact, appears to decrease it in a rubbed cell. In both rubbed and unrubbed cells, addition of LCV20162 also appears to increase the transmittance beyond that of the pure LC even using the faster annealing.

Figure 7:
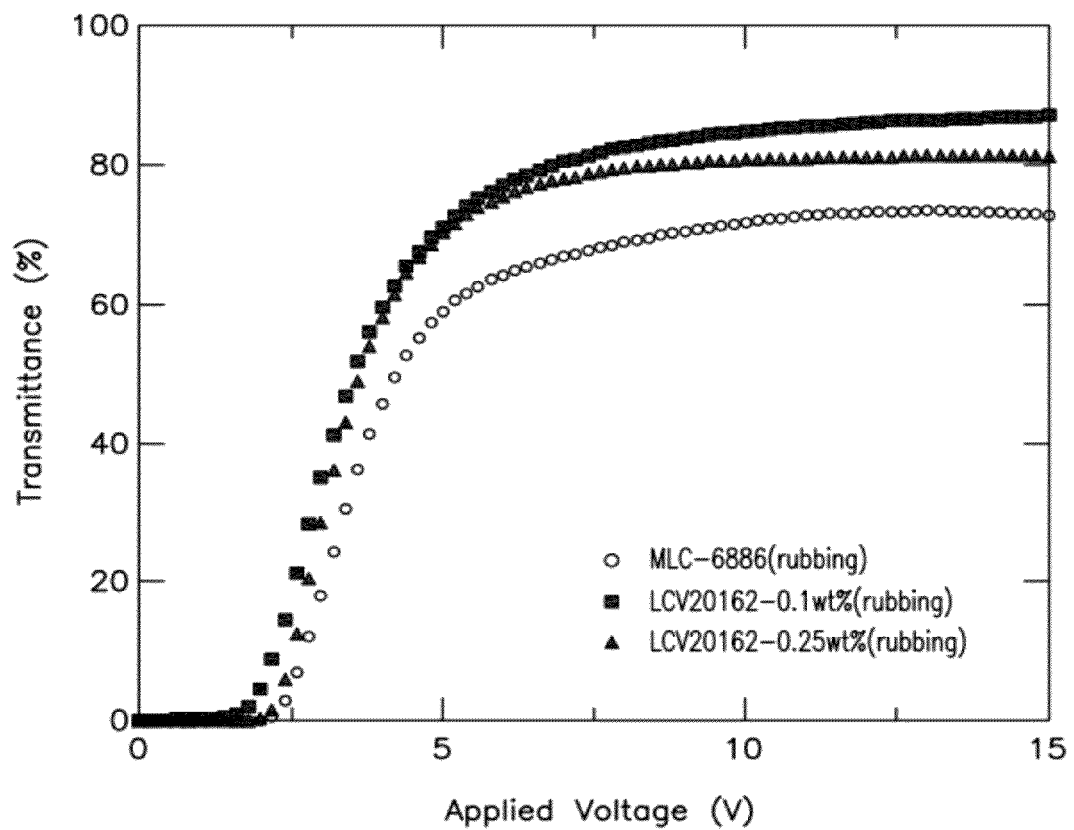
FIG. 7 shows the voltage-transmittance data for 0.1 wt % and 0.25 wt % Polymer 7 (LCV20162) in a rubbed cell.

FIG. 7 shows the voltage-transmission curve for 0.1 wt % LCV20162 and 0.25 wt % LCV 20162 in rubbed cells. The voltage was held at 12V AC 1000 Hz at 80° C. for 2 minutes, then cooled at 10° C./min, recording the transmittance v. voltage as the samples cooled. Addition of the LC polymer at either concentration does not increase the threshold voltage of the LC. Addition of 0.1 wt % LCV20162 also appears to increase the transmittance beyond the pure LC, while addition of 0.25 wt % does not.

Figure 13:
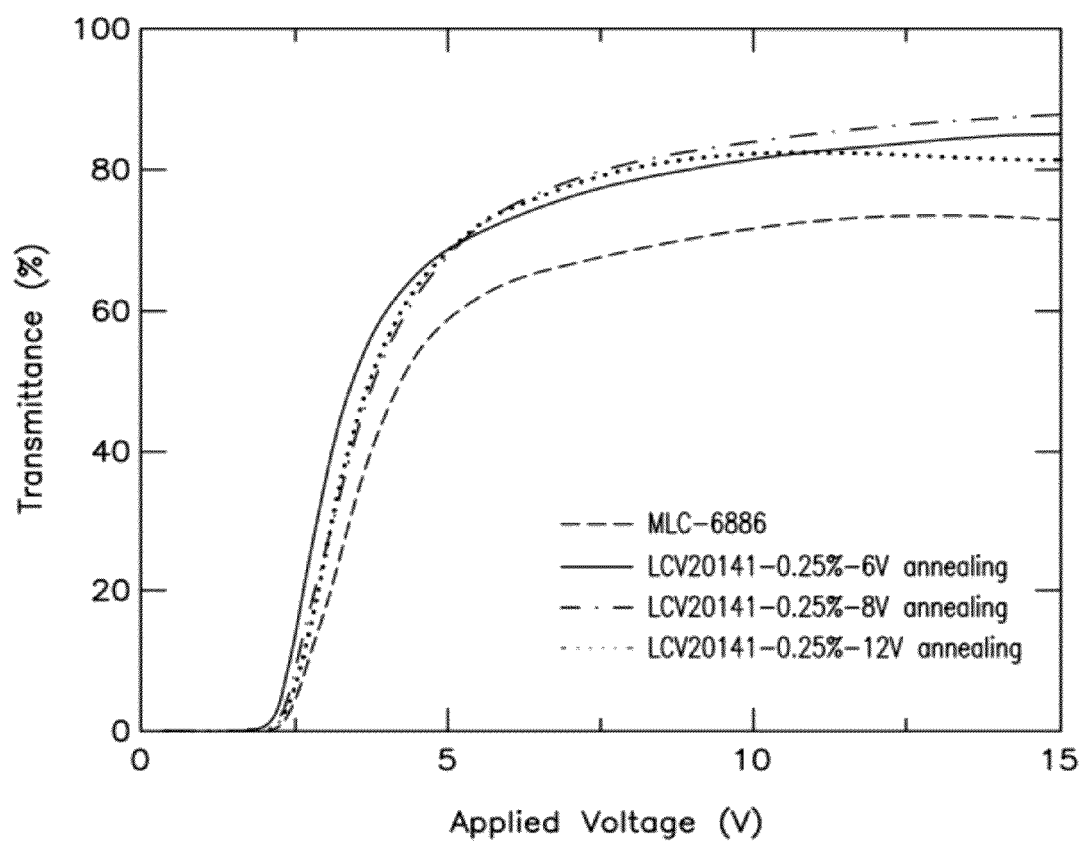
FIG. 13 shows the voltage-transmittance data for and 0.25 wt % LCV20141 in a rubbed cell in MLC6886.

FIG. 13 shows the voltage-transmission curve for 0.25 wt % MLC6886 in a rubbed cell. The procedure was as follows: the voltage was held at 12V at 80° C. for 2 mins, then cooled at 5° C./min, recording transmittance v. voltage as samples cool. In the NLC host the transition from I to N was 75° C. Annealing conditions were 6V, 8V and 12V.

Figure 14:
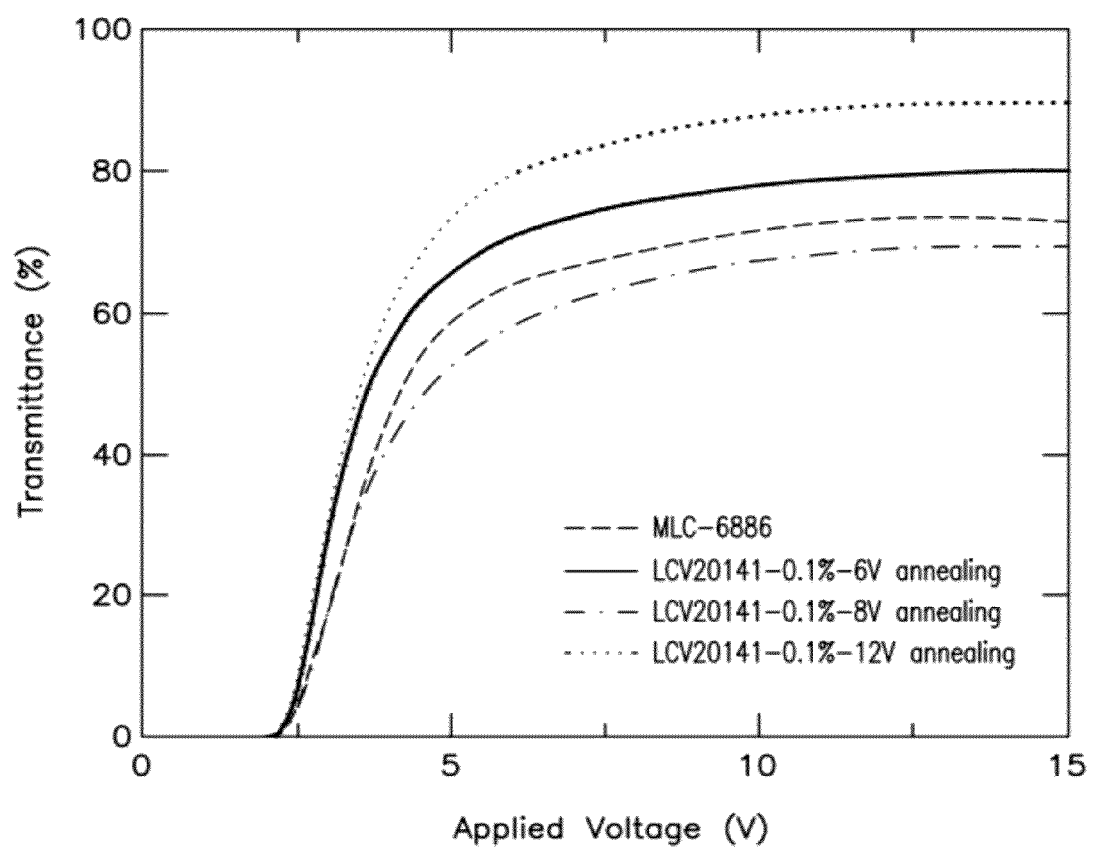
FIG. 14 shows the voltage-transmission curve for 0.1 wt % LCV20141 in MLC6886.

FIG. 14 shows the voltage-transmission curve for 0.1 wt % LCV20141 in MLC6886 in a rubbed cell. The procedure was as follows: the voltage was held at 12V at 80° C. for 2 mins, then cooled at 5° C./min, recording transmittance v. voltage as samples cool. Annealing conditions were 6V, 8V and 12V.

Figure 15:
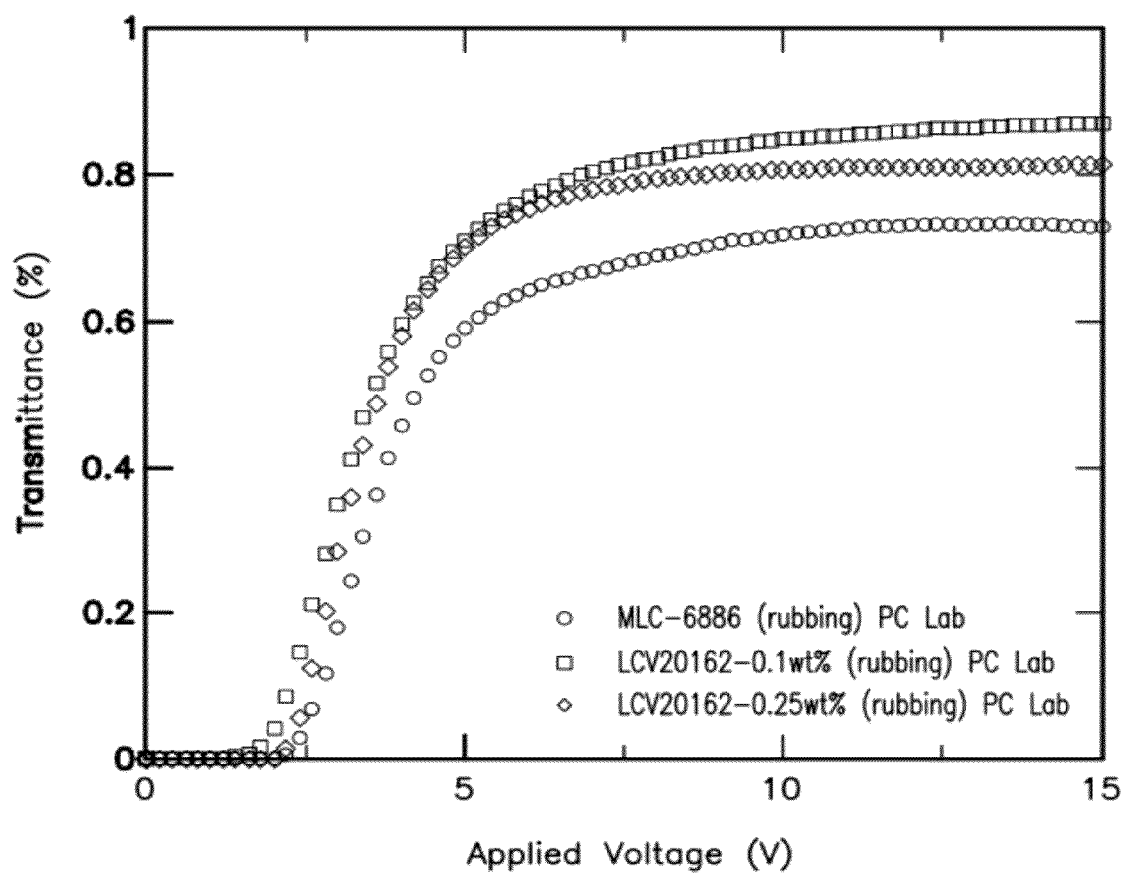
FIG. 15 shows the voltage-transmission curve for 0.1 wt % and 0.25 wt % LCV20162 in MLC6886.

FIG. 15 shows the voltage-transmission curve for 0.1 wt % and 0.25 wt % LCV20162 in MLC6886 in a rubbed cell. The procedure was as follows: the voltage was held at 12V at 80° C. for 2 mins, then cooled at 5° C./min, recording transmittance v. voltage as samples cool. Annealing conditions were 6V, 8V and 12V.

F. Rise Time/Fall Time Measurements

Figure 8:
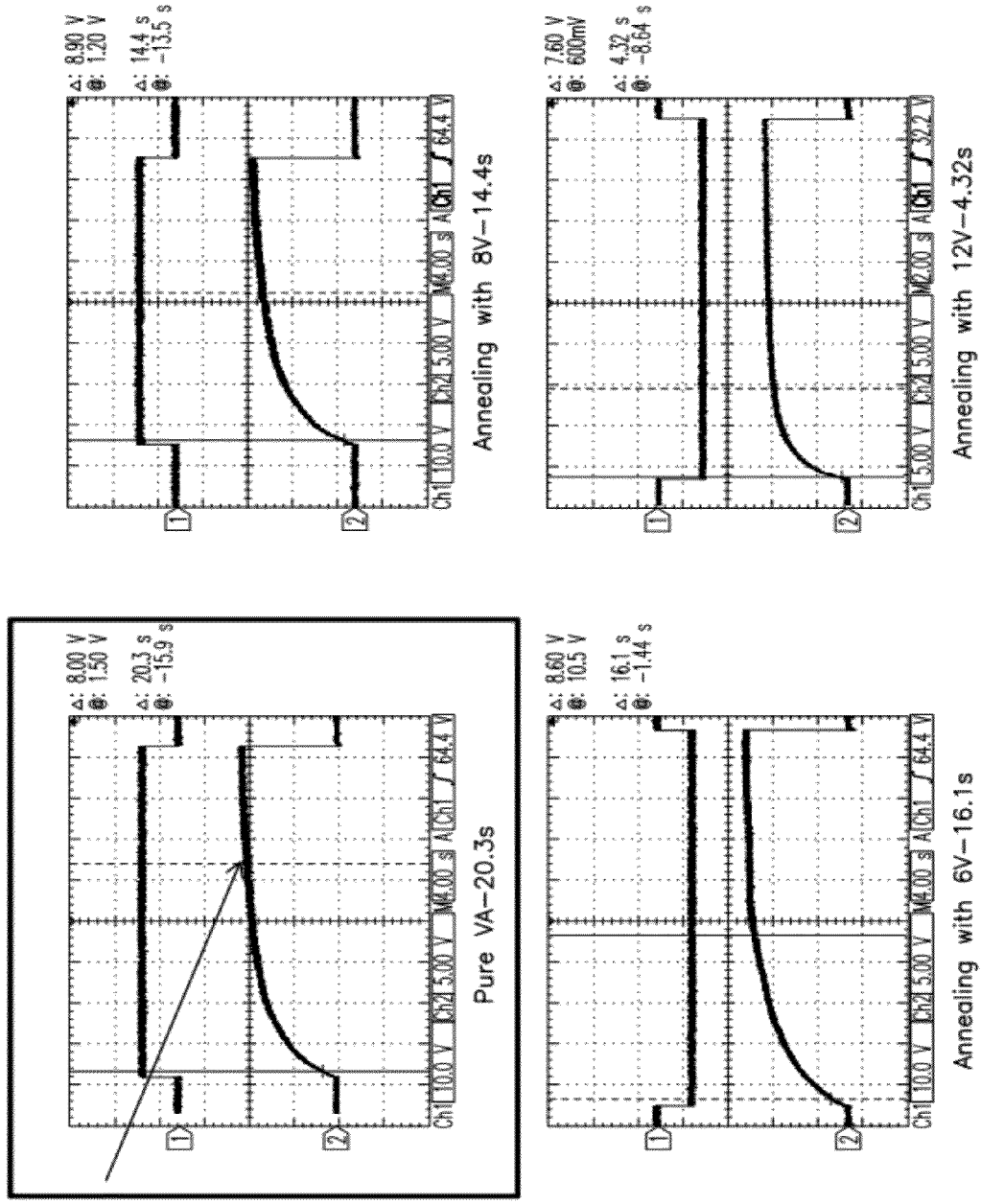
FIG. 8 shows the rise time data of pure VA liquid crystal MLC6886 and VA LC with 0.25 wt % Polymer 5 (LCV20137).

Rise time measurements were measured for pure VA LC v. LCV20137 in unrubbed cells. The host was MLC6886. The results are shown in FIG. 8. Addition of 0.25 wt % of this polymer (LCV20137) at all annealing conditions measured decreases the rise time. At 12V annealing condition, the rise time decreases by a factor of 4.

Figure 9:
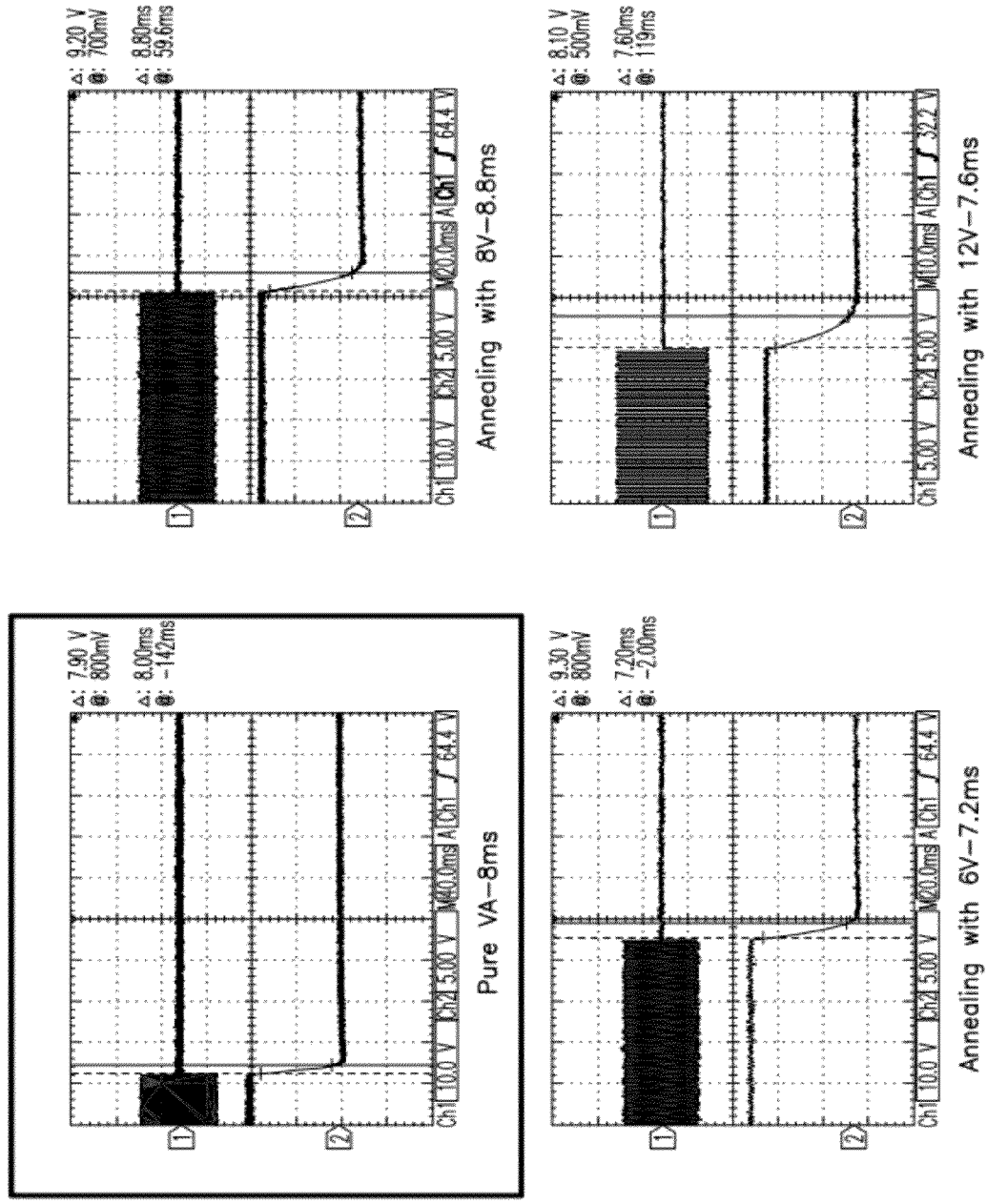
FIG. 9 shows the fall time data of pure VA liquid crystal MLC6886 and VA LC with 0.25 wt % Polymer 5 (LCV20137).

Fall time measurements were also measured for pure VA LC and VA LC with LCV20137 in unrubbed cells. The host was MLC6886. The results are shown in FIG. 9. Addition of 0.25 wt % of this polymer (LCV20137) at all annealing conditions measured results in no significant increase or decrease of the fall time.

Figure 10:
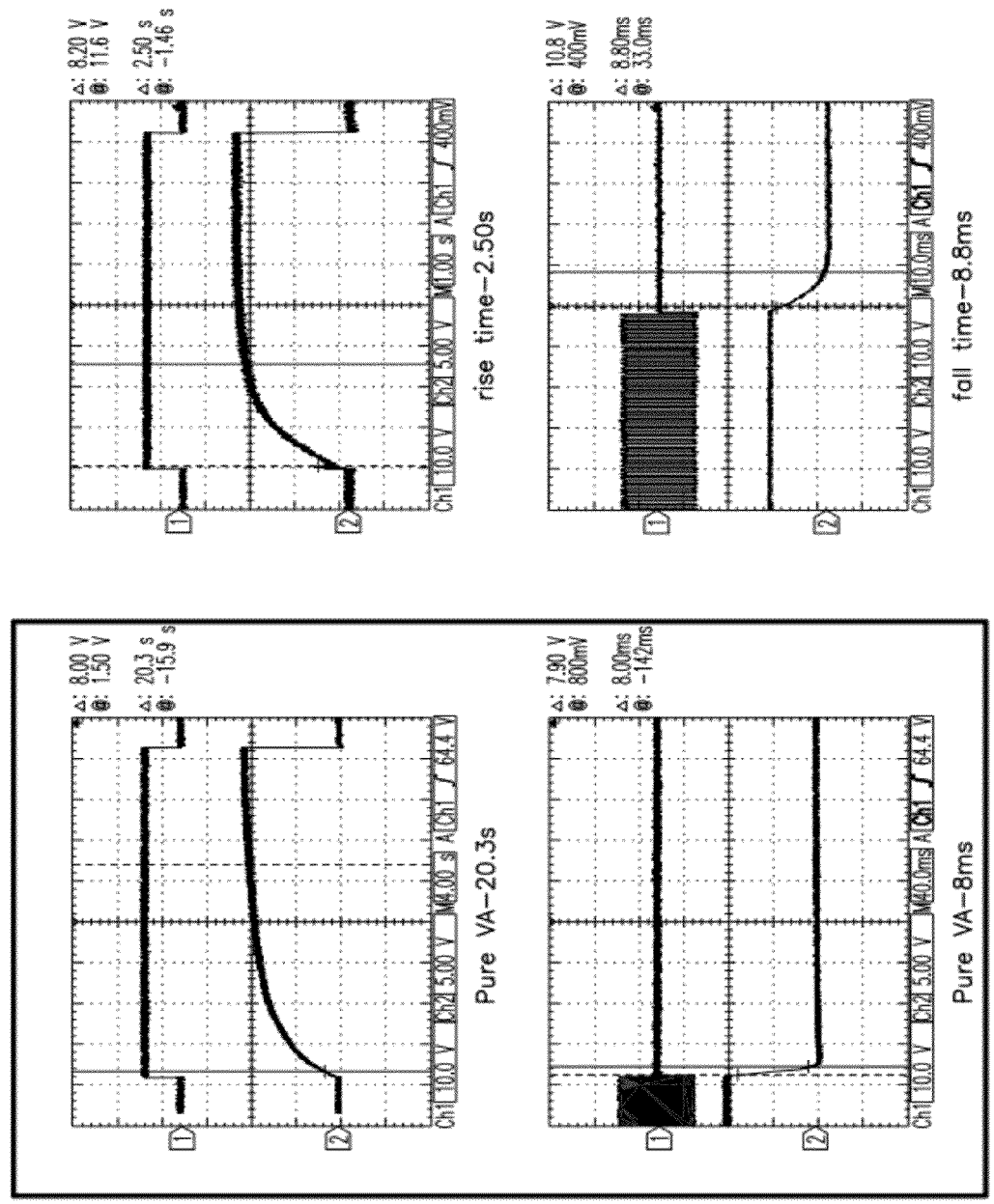
FIG. 10 shows the rise and fall time data of pure VA liquid crystal MLC6886 and VA liquid crystal with 0.25 wt % Polymer 6 (LCV20141).
Figure 11:
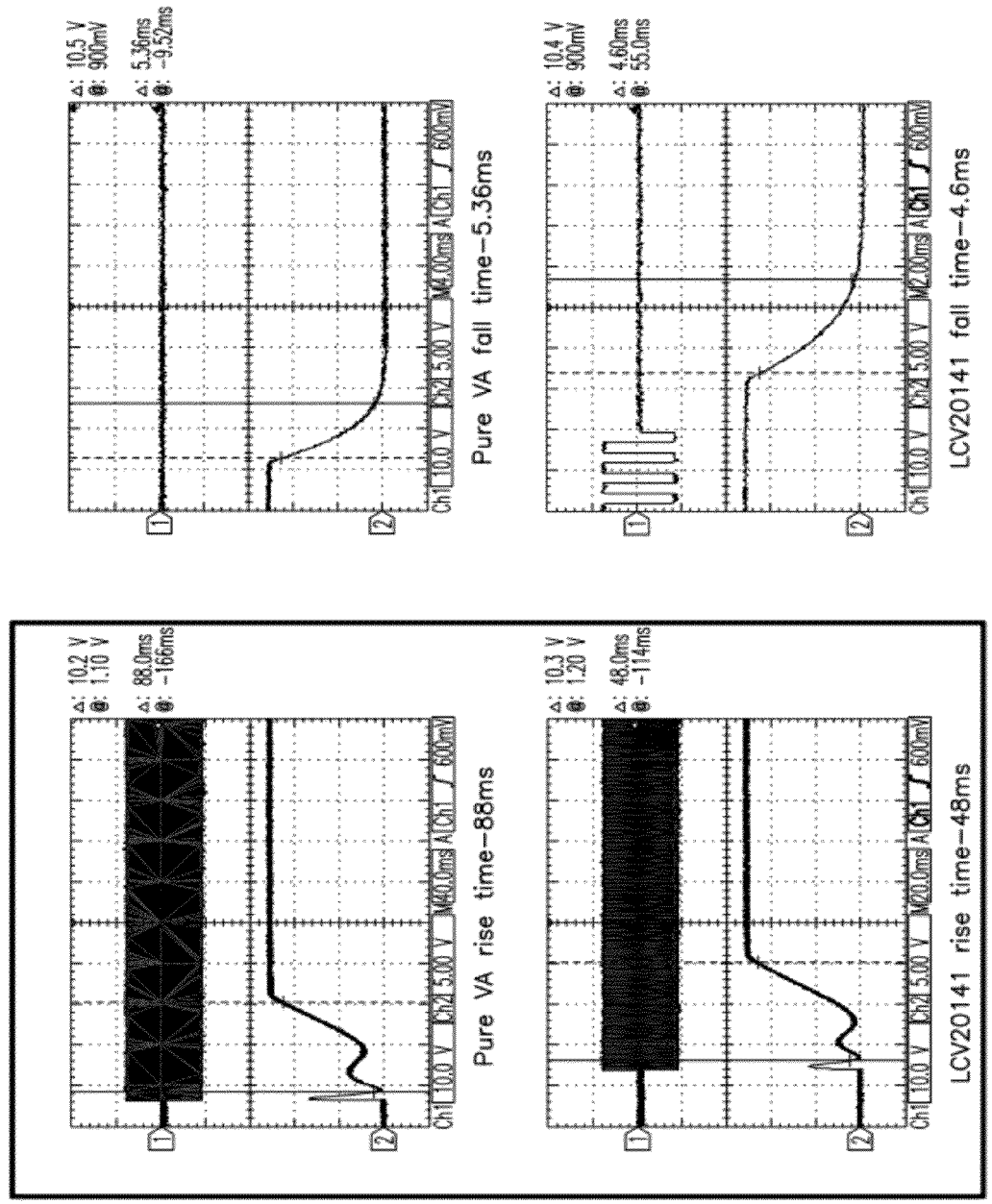
FIG. 11 shows the rise and fall time data of pure VA liquid crystal MLC6886 and VA liquid crystal with 0.25 wt % Polymer 6 (LCV20141).

Rise and fall time were measured for pure VA LC and VA LC with LCV20141 in unrubbed cells in host MLC6886. These results are shown in FIG. 10. Addition of 0.25 wt % of this polymer (LCV20141) at 12V annealing conditions measured results in a reduction in rise time and a small increase in fall time.

Rise and fall time were measured for pure VA LC and VA LC with LCV20141 in rubbed cells in host MLC6886. These results are shown in FIG. 1.1. Addition of 0.25 wt % of this polymer (LCV20141) at 12V annealing conditions measured results in a 45% reduction in rise time (88 ms to 48 ms) and a 14% reduction in fall time (5.4 ms to 4.6 ms).

Table 8 shows the summary of rise and fall times in rubbed cells.

| Material | Rise Time (ms) | Fall Time (ms) |
|---|---|---|
| Host (MLC6886) Rubbed Cell | 232 | 8 |
| 0.25% LCV20141 Rubbed Cell | 130 | 4.5 |
| 0.1% LCV20162 Rubbed Cell | 85.6 | 10 |
| 0.25% LCV20162 Rubbed Cell | 144 | 8 |

In rubbed cells the addition of 0.25 wt % or 0.1 wt % of any of the polymers results in decreased rise time. In some cases there was also a reduction in fall time, but in most cases fall time remains the same or does not increase. It is noted that in data described herein, the rise and fall times for samples may be different based on differences in how the cell is manufactured, buff strength, alignment layer thickness and other factors that can change this sensitive measurement.

Table 9 shows the response time measurements in rubbed cells.

| LC | Annealing Voltage | Rise time | Fall time |
|---|---|---|---|
| MLC-6886 (rubbed cell) | 12 | 232 ms | 8.0 ms |
| LCV20141 - 0.25 wt % (rubbed cell) | 12 | 130 ms | 4.5 ms |
| LCV20162-0.25 wt % (rubbed cell) | 12 | 144 ms | 8.0 ms |
| LCV20162 - 0.1 wt % (rubbed cell) | 12 | 86 ms | 10 ms |

G. Temperature Degradation

Figure 12:
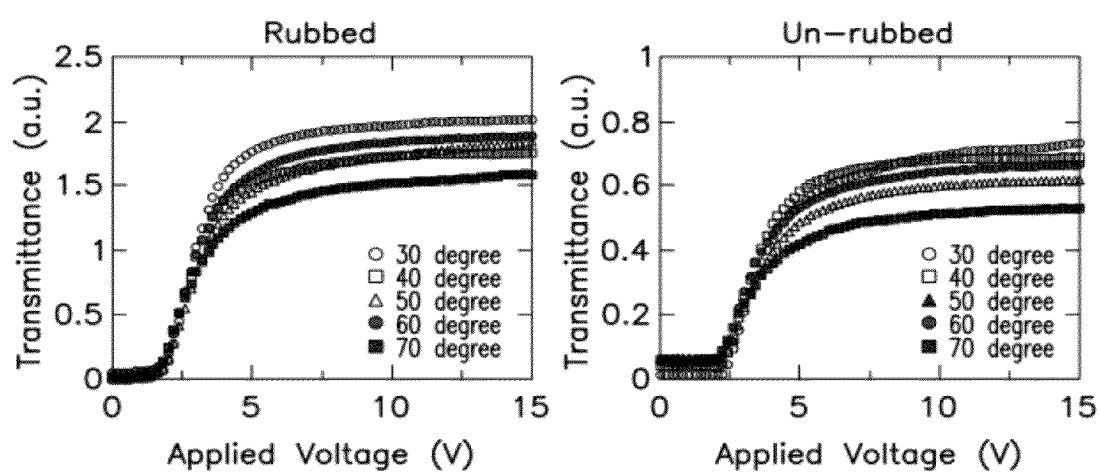
FIG. 12 shows temperature degradation data for 0.1 wt % Polymer 7 (LCV20162) in MLC6886 in rubbed and unrubbed cells.

FIG. 12 shows temperature degradation data for 0.1 wt % LCV20162 in rubbed and unrubbed cells. The results show that the material is stable up to 60° C.

H. Copolymers

The methods, devices and compositions described here can be used with copolymer polymer backbones. In this embodiment, there are two or more different repeating units forming the polymer backbone. As described elsewhere herein, mesogens can also be present in the polymer backbone with suitable linking groups, as is apparent to one of ordinary skill in the art. Some structures herein describe the use of a

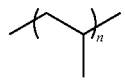

repeating unit. This repeating unit can be used in conjunction with other repeating units, such as polystyrene or others described herein and known in the art in the polymer liquid crystals described here.

Although applicant does not wish to be bound by theory, one possible mechanism that explains the advantageous effect for such a small amount of polymer is adsorption of the polymer(s) onto surface of the VAN cell. That being the case, it is obvious that modifying the polymer for good adsorption to the alignment layer on the surface of the VAN cell, either by end-functionalization or by using the LCP polymers as one block in a diblock or triblock tailored/designed copolymer could further enhance the performance of the VAN host. Polyimide with aliphatic tails ($C_8$-$C_{18}$ tail length), self-assembled monolayers (SAM) of octyldecyl silane, for example, and even pure glass have been used to promote homeotropic alignment in VAN cells, so end-groups or end-blocks can be either hydrophobic (in the case of the first two alignment conditions) or hydrophilic (in the case of a pure glass as an alignment layer). The following is a partial list of some of the useful end-block structures compatible with hydrophobic alignment layers where the * indicates there is a repeating unit of various length between the parenthesis. In some examples the * repeating unit is the same as described for variable "n" in conjunction with the

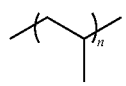

polymer backbone.

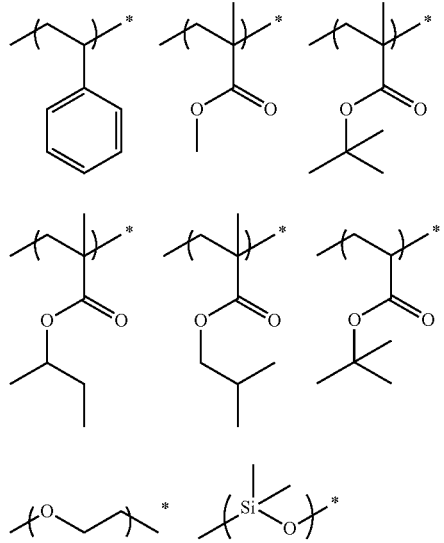

The following is a partial list of some useful end-block structures compatible with hydrophilic/polar alignment layers. In some examples the * repeating unit is the same as described for variable "n" in conjunction with the

polymer backbone.

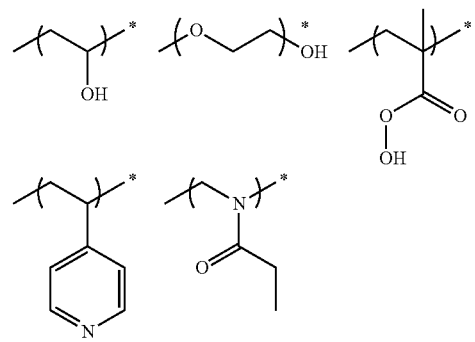

As is known in the art, other groups may be used. As will be apparent to one of ordinary skill in the art, the end-block and polymer blocks can be synthesized and attached to each other and to the remaining sections of the polymer liquid crystal using methods described here and known in the art.

The following structures in Scheme 13 below are examples of triblock copolymers synthesized and examined:

Scheme 13 Example Copolymers

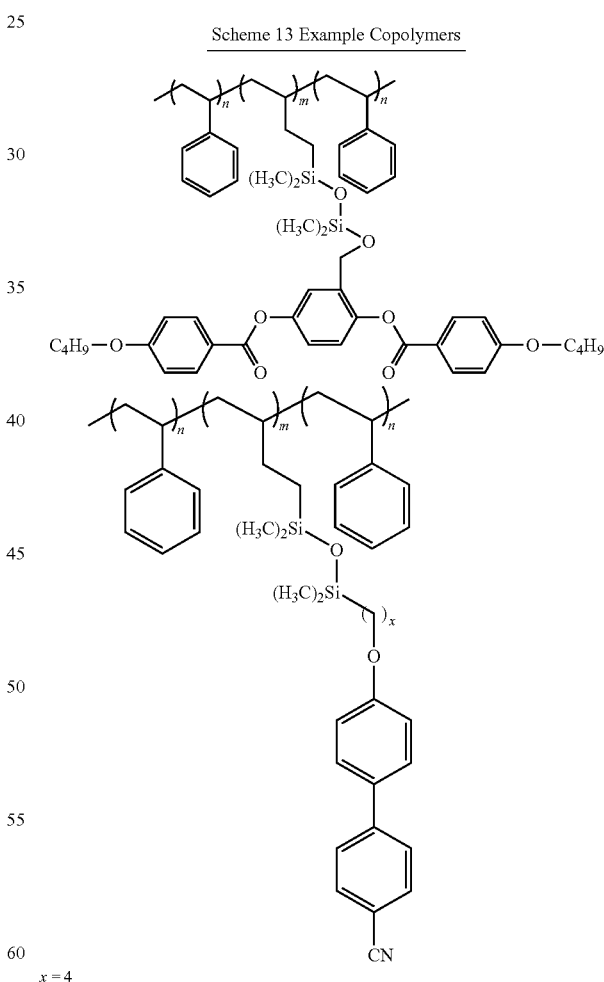

$x = 4$

The variable definitions are the same as described elsewhere herein.

These triblock structures have LC-phobic polystyrene blocks and LC-philic mesogens. The triblock structures were tested in ZLI2806, which is a commercially available negative delta epsilon nematic liquid crystal. Addition of triblock copolymers lowered the threshold voltage, as shown in Table 10.

TABLE 10

| Quantity | Neat ZLI2806 | 0.5% Side-on Triblock | 0.5% End-on Triblock |
|---|---|---|---|
| P | 5.53E+010Ω*cm | 1.04E+010Ω*cm | 5.28E+009Ω*cm |
| $V_{th}$ | 2.10VRMS | 2.00VRMS | 1.90VRMS |
| $\epsilon_\parallel$ | 3.31 | 3.71 | 4.43 |
| $\epsilon_\perp$ | 7.39 | 7.58 | 8.22 |
| $\Delta\epsilon$ | −4.08 | −3.87 | −3.79 |
| $K_{11}$[Direct] | 20.7pN | 13.4pN | 6.19pN |
| $K_{22}$[Est.] | 9.69pN | 8.34pN | 7.37pN |
| $K_{33}$[Calc.] | 16.5pN | 13.9pN | 12.2pN |
| $K_{33}/K_{11}$ | 0.8pN | 1.04 | 1.97 |

The structure below is an example of a diblock copolymer that is useful as the liquid crystal polymer in the compositions described here. As will be appreciated by one of ordinary skill in the art, other mesogens and spacers can be used, and different polymer chain lengths for each of the repeating units can be used. In addition, the structure below can be formed into a triblock by adding another polystyrene repeating block onto the polybutadiene group.

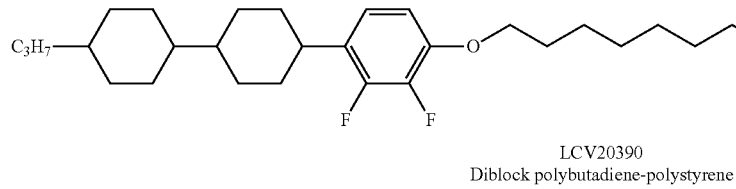
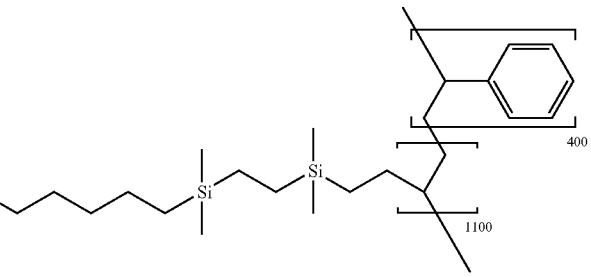

LCV20390
Diblock polybutadiene-polystyrene

7. VAN Devices

As is known in the art, the systems described here can be incorporated in VAN devices using methods described here and known in the art.

A. Processing Conditions

Three aspects used in processing VAN devices are examined: (i) the interplay of applied voltage and cooling rate in governing performance of polymer-doped VAN; (ii) the mechanism of "imprinting pretilt" in the presence of polymer dopant; and (iii) optimal methods for generating a uniform direction of pretilt over a large area display. The best effects on switching speed were found when the cell was exposed to an AC voltage of 8V or more during cooling. For the most part, the results were equally good for the two cooling rates examined (10° C./min and 5° C./min). Therefore, it is likely that even faster cooling rates are compatible with successful processing of polymer doped VAN—with obvious relevance to commercialization. In addition to the technological need for rapid display production, the molecular characteristics of the polymer (e.g., its size, which governs its rate of reorientation and diffusion) may influence the speed with which the desired pretilt can be introduced. In turn the effect of systematically varied molecular attributes and dopant concentration on the processing behavior will provide valuable information regarding the mechanism of the observed effects of LCP dopant. It has been demonstrated that dopant used in combination with rubbed alignment layers provides uniform pretilt over the small cells examined. This approach can be applied to larger cells. In addition, alternatives known in the art can be used (such as superimposing a small field in the plane of the cell during the cooling step).

B. Lifetime Measurements

The lifetime of the PD-VAN system is tested using methods known in the art, such as by subjecting the fabricated PD-VAN test cells at elevated temperature. By using accelerated lifetime measurement testing at elevated temperature, valuable data on the lifetime and performance of the PD-VAN LCD system can be determined. In one method, the physical properties (such as contrast, brightness, viewing angle, rise time and the fall time of the test cell) are tested at various time intervals, such as every 10 degrees, starting at room temperature, up to the clearing point of the liquid crystal mixture.

As known in the art, other experiments can be carried out to obtain useful information about the stability and performance of the system. Some of these experiments are described next. The specific details for carrying out these experiments is well within the skill of one of ordinary skill in the art. The critical temperature at which pre-tilt memory in the PD-VAN cell is lost for each polymer class can be determined, measuring contrast and rise times at each temperature, from RT to the clearing point, every 5 degrees. Image "Sticking" can be tested by writing a checker board image, followed by a black image. The temperature, at which the checkerboard image ghost remains, after switching to the black image, is defined as the "sticking point temperature." The durability of polymer-doped VAN cells can be tested under temperature cycling in an environmental test chamber. The maximum and minimum storage temperatures for each class of polymer additive can be determined by examining each test cell for optical defects after storage at the appropriate temperature for 36 hours. These experiments are useful to obtain information about the lifetime of the PD VAN system.

8. Summary

It was found that VAN electro-optic properties are improved using the following general classes of LC polymer dopants: (i) LC polymers with phenylpyrimidine-based side groups (Scheme 14, left) that have a small, though still positive dielectric anisotropy ($\Delta\epsilon\approx+1$ or $+2$), and (ii) LC polymers with 2,3-difluorophenyl-bicyclohexyl-based side groups (Scheme 14, right) that have a negative dielectric anisotropy ($\Delta\epsilon\approx-4$). The bicyclohexyl-2,3-difluorophenyl alkoxy unit was chosen because small molecule LCs with very similar structures (Scheme 2) perform well in the high resistivity, negative delta E NLCs used in high-end LCD HDTVs.

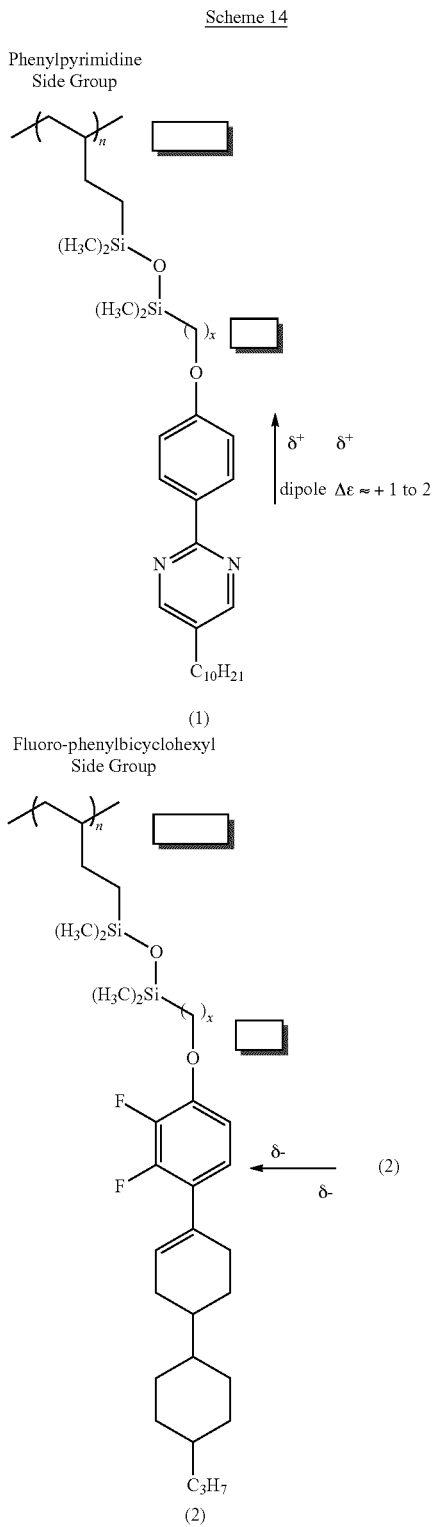

This research yielded important results that surpassed expectations. It was first demonstrated that LCPs, by choice of their mesogen, were easily soluble in negative delta E hosts. Then, using these polymer-doped VA solutions, it was discovered that addition of a small amount of LCP dopant, on the order of 0.25%, into the VA LC host can simultaneously confer three benefits: reduce the switching speed, increase the contrast and improve viewing-angle symmetry—without adversely affecting the threshold voltage, saturation voltage, or viscosity. Indeed, the optical rise times of the virgin (no dopant) VA nematic LC and its counterpart doped with 0.25% of Polymer (2) from Scheme 14 show that the rise time is improved dramatically, from 232 ms to 130 ms, by addition of the polymer dopant (see data). The fall time is also improved, from 8.0 ms to 4.5 ms (see data). LC Polymer (1) in Scheme 14 gave qualitatively similar improvements, but not as large as those observed for (2) in Scheme 14; therefore, pendant mesogens with negative dielectric anisotropy (like their VA nematic host) appear more promising for VAN dopant technology.

Although applicant does not wish to be bound by theory, the results provided here (including some results that are not shown) indicate that in general there is not a great deal of fall time differences between rubbed/un rubbed conditions. The fall times are all under 8~10 ms. The rubbed and un-rubbed cells did show large differences in the rise time. The rise times are almost 1000× different between rubbed and un-rubbed cells. These results show the advantages of a rubbed cell in orientation, pre-tilt angle, and surface anchoring energy. An advantage in any of the properties from the liquid crystal polymers described here is useful. The rubbed (also known as buffed) cell has advantages in all three properties. Some of the liquid crystal polymers provide an enhancement in the orientation and pre-tilt angle, making the doped polymer systems even faster in the rise time comparing to the pure VA cell without liquid crystal polymer. In addition, the contrast ratio of compositions including liquid crystal polymer is improved as compared to systems that do not contain liquid crystal polymer.

It should be noted that for the above test, a simple 1 KHz 5V AC drive signal was used; in real VA displays, many other techniques (e.g., overdrive schemes coupled with lookup tables), are used to achieve more rapid rise time, so the present rise times would yield much faster response in practice.

This dramatic decrease in rise time suggests that the LC polymers do, indeed, increase the pretilt of the LCs, while the decrease in the fall time suggests that the LC polymer is also providing an anchoring condition that induces the molecules to relax back faster.

An exciting discovery was made while comparing LCP homopolymers to coil-LCP-coil block copolymers. Although small concentrations of dissolved LCPs in a nematic LC are not expected to change the strength or direction of anchoring at the "orientation layer" (FIG. 1), it was discovered that the application of a moderate AC voltage (12V at 1 kHz) for a few minutes to a cell filled with LC polymer doped VAN during cooling from the isotropic to the nematic phase introduces a highly desirable pretilt relative to the z-axis, manifested by a substantial reduction of the rise time (the time for the transmitted intensity to reach 90% of the "bright state" value). In the absence of pretilt (FIG. 1, bottom left), the resting state of the cell (field off) affords very little coupling between the dipole of the LC and the applied field (molecules perfectly aligned along z experience no torque and the direction of the torque averages to zero, since there are as many molecules experiencing a torque to the left as to the right, for example). Even a small pretilt (compatible with very good extinction in the dark state) is sufficient to break symmetry, so there is a net torque acting on the director as soon as the field is applied (FIG. 1, bottom right). In addition, the field-treated polymer doped-LC decreases the fall time (the time for the transmitted intensity to relaxing back to 90% of the dark state), indicating that the strength of anchoring is increased by the polymer. These effects are not present in the LC alone, and occur even at very low LCP concentrations (for example 0.25 wt % as shown here)

The results described herein show that a small amount of LC polymer additive is useful for improving contrast and brightness, while reducing the rise time. The sign of the dielectric anisotropy of the mesogenic side groups affects the results: LC polymers bearing mesogens that have $\Delta\epsilon>0$ are good and mesogens that have $\Delta\epsilon<0$ are even better by all three display performance criteria—contrast, brightness, and rise time. Low concentrations perform very well, indicating that further dilution of the dopant in the VA host may improve performance further. The magnitude of the AC voltage applied while the cell is cooled through the isotropic-nematic transition is an important variable, with excellent performance being achieved with readily-accessible voltages (8-10V) under conditions that require only a few minutes.

LC Polymers are poised for rapid, widespread adoption in the VAN display industry. They provide a "drop in solution" for introducing a small pretilt that confers fast response without causing light leakage. The complex infrastructure for UV irradiation is not needed at all. The electrodes that are already part of the LCD can be used to apply the "annealing voltage" during the cooling step after filling the cell. The polymer dopant approach eliminates formation of the undesired by-products of UV irradiation (ions and radicals that increase power consumption and reduce the lifetime of a display). Furthermore, polymer dopants expand the range of small molecules that can incorporated in VAN mixtures to optimize their properties. Of special importance are components in nematic liquid crystal hosts that contain unsaturated bonds in their "tails." This structural motif is known to improve response time—the central unmet demand in VAN LCDs; however, unsaturated groups are destroyed by strong UV irradiation. The current process allows the use of alkenes in hosts, giving access to a greater range of viscosity lowering LC components to afford a lower viscosity and thus faster switching VA NLC mixture. Therefore, polymer dopants open the way to new VAN mixtures with lower viscosity (hence, faster rise time). Polymer dopants improve the quality of VAN displays in key areas, including speed, contrast and lifetime. At the same time, doped VA nematics will reduce production costs and bottlenecks associated with UV irradiation processing lines.

STATEMENT REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

All possible ionic forms of molecules described herein and salts thereof are intended to be included individually in the disclosure herein.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, reagents, synthetic methods, purification methods, analytical methods, assay methods, and devices other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims. Any composition or compound that is claimed and that is described in the literature with an enabling disclosure is not intended to be included in the claims and it is intended that specific support is provided to exclude a compound or class of compounds from the claims.

The disclosures of the publications listed herein including the publications listed below are herein incorporated by reference in their entireties.

REFERENCES

1. Display Search, September 2007.
2. Shimada, T.; Kimura, M.: Kobayashi, S.; "Electro-optic bistability of ferroelectric liquid crystal cell prepared using obliquely evaporated sio films," Mol. Cryst. Liq. Cryst. 1991, 201, 133.
3. Yumiko Takahashi, Atsuo Iids, Yoichi Takanishi, Toyokazu Ogasawara, Michi Nakata, Ken Ishikawa, and Hideo Takezoe, "Dynamic local-layer response of surface-stabilized ferroelectric liquid crystals to a high electric field by time-resolved x-ray microdiffraction," Phys. Rev. E 2003, 67, 051706.
4. Rieker, T. P.; Clark, N. A.; Smith, G. S.; Parmar, D. S.; Sirota, E. B.; Safinya, C. R. "Chevron local layer structure in surface-stabilized ferroelectric smectic-C cells," Phys. Rev. Lett. 1987, 59, 2658-61.
5. Ajlun, C, "Stamp-Sized Ferroelectric LCD Can Power 50-in. TV Screens" Electronic Design, 2000, 48, 26.
6. Murashige, T; Fujikake, H; Sata, H; Kikuchi, H; Kurita, T; Sato, F; "Polymer Alignment Behavior with Molecular Switching of Ferroelectric Liquid Crystal, J. J. Apl. Phys. 2007, 46, 2, L37-J39.
7. Lee, K; Soo, S- W; Lee, S- D; "Fast linear electro-optical switching properties of polymer-dispersed ferroelectric liquid crystals." Applied Physics Letters, 1994, 64, 6, pp. 718-720, XP000422877.
8. Fujikake, H; Aida, T; Yonal, J; Kikuchi, H; Kawakita, M; Takizawa, K; "Rigid formation of aligned polymer fiber network in Ferrolelectric Liquid Crystal." J. J. Apl. Phys. 1999, 38, 1, 5212-5213.
9. Kempe, M. D.; Scruggs, N. R.; Verduzco, R.; Lal, J.; Kornfield, J. A.; "Self-assembled liquid crystalling gels designed from the bottom up," Nature Materials, 2004, 3, 177.
10. Shimada, T.; Kimura, M.: Kobayashi, S.; "Electro-optic bistability of ferroelectric liquid crystal cell prepared using obliquely evaporated sio films," Mol. Cryst. Liq. Cryst. 1991, 201, 133.
11. McConnell, G. A.; Gast, A. P. "Melting of ordered arrays and shape transitions in highly concentrated diblock copolymer solutions," Macromolecules 1997, 30, 435.
12. Yumiko Takahashi, Atsuo Iida, Yoichi Takanishi, Toyokazu Ogasawara, Michi Nakata, Ken Ishikawa, and Hideo Takezoe, Dynamic local-layer response of surface-stabilized ferroelectric liquid crystals to a high electric field by time-resolved x-ray microdiffraction, Phys. Rev. E 2003, 67, 051706.
13. Kempe, M; Kornfield, J. A.; "Shear alignment behavior of nematic solutions induced by ultralong sidegroup liquid crystal polymers," Phys. Rev. Let. 2003, 90, 11.
14. Kempe, M. Rheology and dynamics of side-group liquid crystalline polymers in nematic solvents [Ph.D Thesis]. Pasadena: California Institute of Technology, 2003, Jun. 9; available from: http://etd.caltech.edu.clsproxy.library-.caltech.edu/etd/available/etd-07202003-103429/.
15. Zhao, Y.; Jamieson, A. M.; Olsen, B. G; et al., "Conformation of comb-like liquid crystal polymers in isotropic solution probed by small-angle neutron scattering: J. of Pol. Sci.: Part B: Polymer Physics 2006, 44, 17, 2412-2424.
16. Marčelja, S, "Chain ordering in liquid crystals. I. Even-odd effect" J. Chem. Phys. 1974, 60, 9, 3599.
17. David, R. L. A; Kornfield. J. A., "Facile, efficient routes to diverse protected thiols and to their deprotection and addition to create functional polymers by thiol-ene coupling," Macromolecules; 2008, 41, 4, 1151-1161.
18. Kempe, Nature Materials, 2004, 3, 177-182.
19. Palffy-Muhoray, Nature Materials, 2004, 3, 139-140.
20. Xia, JACS, 2009, 131, 18525-18532.
21. Lee, Appl. Phys. Lett, 1994, 64, 718

U.S. Pat. Nos. 6,821,455, 7,008,675, 7,179,509, 4,904,066, 5,313,320, 4,896,292, 5,422,036, 6,132,819, 6,583,838, 5,321,533, 6,133,975, 5,138,010, 5,397,503.

JP 02116824A

GB02274652A

PCT99/32576

Sweta Dash, *iSuppli*, Jan. 29 2010 [http://www.isuppli.com/Display-Materials-and-Systems/News/Pages/LCD-TV-Panel-Market-Returns-to-Growth-in-2010.aspx].

C- Y Huang, W- Y Jhuang and C- T Hsieh. *Optics Express,* 2008, 16, 7, 3859.

Cheng-Jung Chiang, Chih-Ho Chiu, Chung-Ching Hsieh, Chia-Hsuan Pai, Bo-Hsin Huang, Te-Sheng Chen (AU OPTRONICS CORPORATION). "Liquid Crystal Display Panel and Fabricating Method Thereof," U.S. patent Ser. No. 12/368,281, Feb. 9, 2009.

Sharp Kabushika Kaisha, "Polymer Enhancement of Liquid Crystal Display," U.S. patent Ser. No. 11/345,659, Feb. 2, 2006.

Display Search Feb. 22 2010.

E. Lueder, *Liquid Crystal Displays, Addressing Schemes and Electro-optical Effects* (John Wiley and Sons, Singapore, 2001).

S. T. Wu and D. K. Yang, *Reflective Liquid Crystal Displays* (John Wiley and Sons, Singapore, 2001).

M. Oh-E, K. Kondo, "Response mechanism of nematic liquid crystals using the in-plane switching mode," *Appl. Phys. Lett.* 2004, 69, L1603.

K. Hanaoka, Y. Nakanishi, Y. Inoue, S. Tanuma, Y. Koike, and K. Okamoto, "A new MVA-LCD by polymer sustained alignment technology," *Proc. SID,* 2004, 1200.

S. H. Lee, S. M. Kim, S- T Wu, Emerging vertical-alignment LC technology using UV curable monomer, *Journal of the SID* 2009, 551.

C. Y. Huang, R. X. Fung, and Y. G. Lin, "Effects of curing conditions on electrooptical properties of polymer-stabilized liquid crystal pi cells," *Jpn. J. Appl. Phys.* 2007, 46, 5230.

C. Y. Huang, R. X. Fung, and Y. G. Lin, "Effects of curing conditions on electrooptical properties of polymer-stabilized liquid crystal pi cells," *Jpn. J. Appl. Phys.* 2007, 46, 5230.

C-Y Huang, W- Y Jhuang and C- T Hsieh, p3859.

J. S. Park, C. H, Jang, M. L. Tingey, A. M. Lowe, N. L. Abbott, *J. Colloid and Interface Sciences*. 2006, 304.

F. Hardouin, N. Leroux, S. Mery, et al., *J. Phys. II France*, 1992, 2.

M. D. Kempe, J. A. Kornfield, and J. Lal, *Macromolecules*, 2004, 37, 8730.

V. Reiffenrath, J. Krause, H. J. Plach, and G. Weber, *Liq. Cryst.* 1989, 5, 159.

Difluorobenzene derivatives, EP 0364538 (1988); V Reiffenrath, J Krause, H J Plach, and G Weber, "New liquid-crystalline Compounds with negative dielectric anisotropy," *Liquid Crystals* 5, 159-170 (1989); M Klasen, M Bremer, and K Tarumi, "New LC Materials for active matrix displays with negative dielectric anisotropy and low rotational viscosity," *Jpn J Appl Phys* 39, L1180-1182 (2000).

M Bremer and L Lietzau, "1,1,6,7-Tetrafluoroindanes: improved liquid crystals for LCD-TV application," *New J Chem* 29, 72-74, (2005).

Merck 2008 publication, *Liquid crystals for LCD-TV applications*

WO2010/0088333

We claim:

1. A nematic liquid crystal composition, comprising:
a negative delta epsilon liquid crystal host; and between 0.01 and 5 wt % of a liquid crystal polymer wherein the liquid crystal polymer has the structure (FX1):

$$\begin{matrix} PX; \\ | \\ W \\ | \\ M \end{matrix} \quad \text{(FX1)}$$

wherein PX is a polymer backbone having the formula:

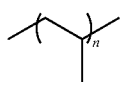

where n is an integer from 50 to 10,000;

W is a straight-chain or branched hydrocarbon group spacer having between 1 to 40 carbon atoms, wherein one or more adjacent or nonadjacent —CH$_2$— groups in the hydrocarbon group can be independently replaced with —S—, —S(=O)—, —O—, —C(=O)—, —O—C(=O)—, —(Si—R$^{40}$R$^{41}$)—, —[OSiR$^{40}$R$^{41}$]$_d$—, —[Si(R$^{40}$R$^{41}$)O]$_d$—, —[Si(R$^{40}$R$^{41}$)—(OSiR$^{40}$R$^{41}$)$_d$]—, —OSiR$^{40}$R$^{41}$O—, —CF$^2$—, and —GeR$^{40}$R$^{41}$—, where R$^{40}$ and R$^{41}$ are each independently a hydrogen or a C1-C5 straight chain or branched alkyl group wherein any hydrogen may be replaced with fluorine, and wherein d is independently an integer from 1 to 6; and M is a mesogen.

2. A nematic liquid crystal composition, comprising:
a negative delta epsilon liquid crystal host; and between 0.01 and 5 wt % of a liquid crystal polymer, wherein the liquid crystal polymer has the structure (Polymer 5), (Polymer 6), or (Polymer 7):

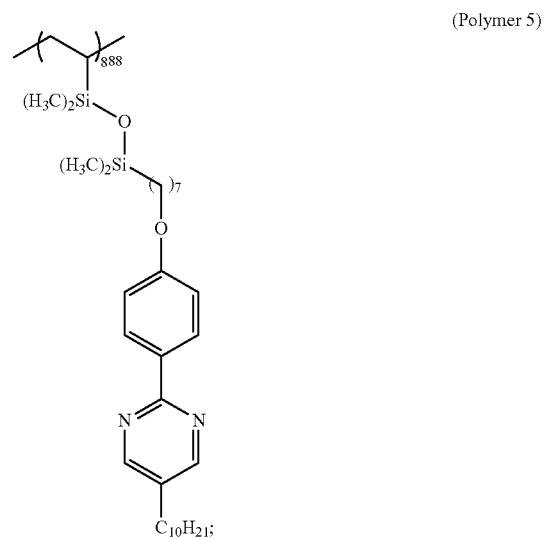

(Polymer 5)

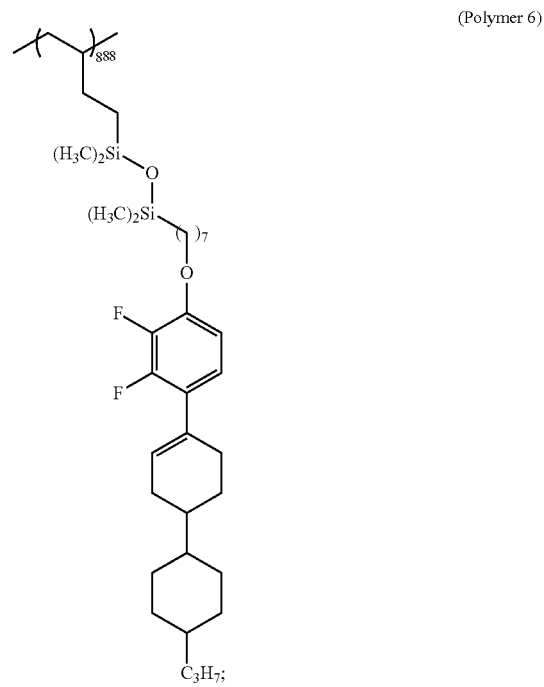

(Polymer 6)

-continued (Polymer 7)

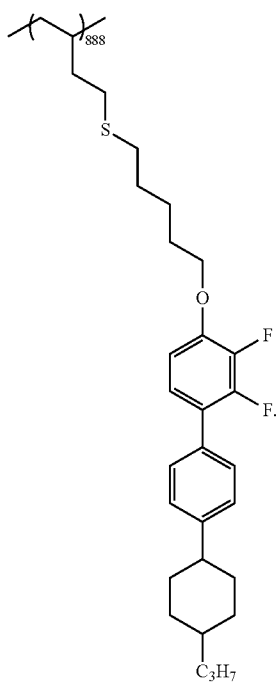

3. An optical device comprising:

two opposing electrode surfaces; and a nematic liquid crystal composition disposed therebetween;

wherein said nematic liquid crystal composition comprises:

a negative delta epsilon nematic liquid crystal host; and between 0.01 and 5 wt of a liquid crystal polymer, wherein the liquid crystal polymer has the structure (FX11):

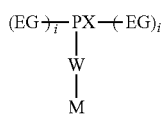

(FX11)

wherein PX is a polymer backbone; W is a thiol or siloxy-containing spacer; M is a mesogen, EG is a polystyrene end group, and each i is independently 0 or 1.

4. The optical device of claim 3, wherein each i is 0.

5. The optical device of claim 3, wherein one i is 1 and one i is 0.

6. A nematic liquid crystal composition, comprising:

a negative delta epsilon liquid crystal host; and between 0.01 and 5 wt % of a liquid crystal polymer wherein the liquid crystal polymer has the structure (FX1):

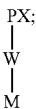

(FX1)

wherein PX is a polymer backbone having the formula:

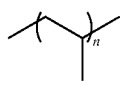

where n is an integer from 50 to 10,000 or the polymer backbone having the formula resulting from thiol-ene coupling of W-M to 1,2-polybutadiene;

W is $-(CR^{15}R^{16})_y-$, where y is an integer from 1 to 40; wherein $R^{15}$ and $R^{16}$ are each independently hydrogen or halogen;

wherein any adjacent or nonadjacent $-(CR^{15}R^{16})-$ group can be independently replaced with $-S-$, $-S(=O)-$, $-O-$, $-C(=O)-$, $-O-C(=O)-$, $-(Si-R^{40}R^{41})-$, $-[OSiR^{40}R^{41}]_d-$, $-[Si(R^{40}R^{41})O]_d-$, $-[Si(R^{40}R^{41})-[OSiR^{40}R^{41}]_d]-$, $-OSiR^{40}R^{41}O-$, and $-CF_2-$, where $R^{40}$ and $R^{41}$ are each independently a C1-C5 straight chain or branched alkyl group wherein any hydrogen can be replaced with fluorine, and wherein d is independently an integer from 1 to 6; and M is

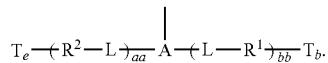

wherein b and e are independently 0 or 1; bb is an integer from 0 to 10; aa is an integer from 0 to 10; and each A, $R^1$ and $R^2$ is independently a cycloalkane ring having from 3 to 8 carbons, a cycloalkene ring having from 3 to 8 carbons, an aromatic ring, or a fused two or three ring structure; where there may be from 1 to 6 cycloalkane rings and from 0 to 5 aromatic rings in M;

each L is independently selected from a direct bond, $-O-$, $-O-C(=O)-$, $-C(=O)-O-$, $-C=C-$, $-C\equiv C-$, $-(CH_2)_u-$; where u is an integer from 1 to 10;

wherein one or more ring carbon atoms in one or more of A, $R^1$ and $R^2$ may be replaced with $-N-$, $-S-$, and $-O-$;

one or more hydrogens on any of A, $R^1$ and $R^2$ can be independently replaced with fluorine, chlorine, bromine, $-CF_3$, $-OCF_3$, $-OCF_2H$ and $-OCFH_2$; and wherein each T is a terminating group independently selected from hydrogen, $-CN$, or a one- to fifteen-carbon alkyl, alkoxy or alkenyl chain wherein one or more hydrogen atoms may be independently replaced with fluorine and one or more $-CH_2-$ groups may be independently replaced with $-O-$ or $-O(C=O)-$.

* * * * *